United States Patent
Pillar et al.

(10) Patent No.: US 6,882,917 B2
(45) Date of Patent: Apr. 19, 2005

(54) STEERING CONTROL SYSTEM AND METHOD

(75) Inventors: Duane R. Pillar, Oshkosh, WI (US); Jeffrey J. Miller, Oshkosh, WI (US); Catherine R. Linsmeier, Larsen, WI (US); Kevin W. Magners, Appleton, WI (US)

(73) Assignee: Oshkosh Truck Corporation, Oshkosh, WI (US)

(*) Notice: Subject to any disclaimer, the term of this patent is extended or adjusted under 35 U.S.C. 154(b) by 0 days.

(21) Appl. No.: 10/402,381

(22) Filed: Mar. 28, 2003

(65) Prior Publication Data

US 2004/0002794 A1 Jan. 1, 2004

Related U.S. Application Data

(63) Continuation-in-part of application No. 10/325,439, filed on Dec. 20, 2002, which is a continuation-in-part of application No. 09/927,946, filed on Aug. 10, 2001, which is a continuation-in-part of application No. 09/500,506, filed on Feb. 9, 2000, now Pat. No. 6,553,290, which is a continuation-in-part of application No. 09/384,393, filed on Aug. 27, 1999, now Pat. No. 6,421,593, which is a continuation-in-part of application No. 09/364,690, filed on Jul. 30, 1999, now abandoned.

(60) Provisional application No. 60/449,797, filed on Feb. 24, 2003, provisional application No. 60/388,451, filed on Jun. 13, 2002, provisional application No. 60/360,479, filed on Feb. 28, 2002, and provisional application No. 60/342,292, filed on Dec. 21, 2001.

(51) Int. Cl.[7] .............................................. B60R 22/00
(52) U.S. Cl. ......................... 701/48; 701/89; 180/65.3; 180/65.5
(58) Field of Search ............................... 701/1, 36, 22, 701/48, 89, 115; 180/65.3, 65.5, 65.6

(56) References Cited

U.S. PATENT DOCUMENTS 4,041,470 A  8/1977 Slane et al.

(Continued)

FOREIGN PATENT DOCUMENTS

| EP | 266704 | 5/1988 |
|---|---|---|
| EP | 504913 A1 | 9/1992 |
| EP | 791506 A2 | 8/1997 |
| EP | 564943 B1 | 10/1999 |
| EP | 1229636 A2 | 1/2002 |
| SE | 507046 C2 | 3/1998 |
| WO | WO 95/15594 | 6/1995 |
| WO | WO 97/2965 | 1/1997 |
| WO | WO 98/30961 | 7/1998 |
| WO | WO 00/69662 | 11/2000 |

OTHER PUBLICATIONS

"The One to Count on Through Hell and High Water"; 4–page (as photocopied) brochure; Product of Oshkosh Truck Corporation; (Sep. 2000).

(Continued)

Primary Examiner—Gertrude A. Jeanglaude
(74) Attorney, Agent, or Firm—Foley & Lardner LLP

(57) ABSTRACT

An electronic control system for a vehicle includes a plurality of input devices, a plurality of output devices, a communication network, and a plurality of interface modules. The plurality of input devices may include a first input device that provides information pertaining to an angular position of a first vehicle wheel. The plurality of output devices may include an actuator capable of adjusting one or both of the angular position of the first vehicle wheel or an angular position of a second vehicle wheel. The plurality of interface modules can be microprocessor based and can be interconnected to each other by way of the communication network. The plurality of interface modules may also be coupled to the plurality of input devices and to the plurality of output devices. The plurality of interface modules may include one or more interface modules that is coupled to the first input device and to the actuator. The electronic control system can be configured to control the angular position of one or both of the first and second vehicle wheels as a function of the information from the first input device.

52 Claims, 53 Drawing Sheets

U.S. PATENT DOCUMENTS

| | | |
|---|---|---|
| 4,162,714 A | 7/1979 | Correll |
| 4,180,803 A | 12/1979 | Wesemeyer et al. |
| 4,355,385 A | 10/1982 | Hampshire et al. |
| 4,516,121 A | 5/1985 | Moriyama et al. |
| 4,542,802 A | 9/1985 | Garvey et al. |
| RE32,140 E * | 5/1986 | Tokuda et al. ............... 701/115 |
| 4,639,609 A | 1/1987 | Floyd et al. |
| 4,646,232 A | 2/1987 | Chang et al. |
| 4,702,333 A | 10/1987 | Lippert |
| 4,760,275 A | 7/1988 | Sato et al. |
| 4,809,177 A | 2/1989 | Windle et al. |
| 4,809,803 A * | 3/1989 | Ahern et al. ............... 180/65.4 |
| 4,843,557 A | 6/1989 | Ina et al. |
| 4,864,154 A | 9/1989 | Copeland et al. |
| 4,894,781 A | 1/1990 | Sato et al. |
| 4,941,546 A | 7/1990 | Nist et al. |
| 4,949,808 A | 8/1990 | Garnett |
| 4,955,443 A | 9/1990 | Bausch |
| 5,025,253 A | 6/1991 | DiLullo et al. |
| 5,086,863 A | 2/1992 | Tischer |
| 5,088,573 A | 2/1992 | Moll |
| 5,091,856 A | 2/1992 | Hasegawa et al. |
| 5,092,419 A | 3/1992 | Leiber et al. |
| 5,111,901 A | 5/1992 | Bachhuber et al. |
| 5,137,292 A | 8/1992 | Eisen |
| 5,168,948 A | 12/1992 | Röhringer et al. |
| 5,189,617 A | 2/1993 | Shiraishi |
| 5,194,851 A | 3/1993 | Kraning et al. |
| 5,217,083 A | 6/1993 | Bachhuber et al. |
| 5,365,436 A | 11/1994 | Schaller et al. |
| 5,416,702 A | 5/1995 | Kitagawa et al. |
| 5,417,299 A | 5/1995 | Pillar et al. |
| 5,463,992 A | 11/1995 | Swenson et al. |
| 5,508,689 A | 4/1996 | Rado et al. |
| 5,555,171 A | 9/1996 | Sonehara et al. |
| 5,557,257 A | 9/1996 | Gieffers |
| 5,607,028 A | 3/1997 | Braun et al. |
| 5,623,169 A | 4/1997 | Sugimoto et al. |
| 5,637,933 A | 6/1997 | Rawlings et al. |
| 5,638,272 A | 6/1997 | Minowa et al. |
| 5,657,224 A | 8/1997 | Lonn et al. |
| 5,670,845 A | 9/1997 | Grant et al. |
| 5,736,925 A | 4/1998 | Knauff et al. |
| 5,739,592 A | 4/1998 | Rigsby et al. |
| 5,754,021 A | 5/1998 | Kojima |
| 5,793,648 A | 8/1998 | Nagle et al. |
| 5,794,165 A | 8/1998 | Minowa et al. |
| 5,819,188 A | 10/1998 | Vos |
| 5,827,957 A | 10/1998 | Wehinger |
| 5,845,221 A | 12/1998 | Hosokawa et al. |
| 5,848,365 A | 12/1998 | Coverdill |
| 5,864,781 A | 1/1999 | White |
| 5,884,206 A | 3/1999 | Kim |
| 5,890,080 A | 3/1999 | Coverdill et al. |
| 5,890,558 A | 4/1999 | Keegan |
| 5,896,418 A | 4/1999 | Hamano et al. |
| 5,919,237 A | 7/1999 | Balliet |
| 5,948,025 A | 9/1999 | Sonoda |
| 5,949,330 A | 9/1999 | Hoffman et al. |
| 5,957,985 A | 9/1999 | Wong et al. |
| 5,987,365 A | 11/1999 | Okamoto |
| 5,997,338 A | 12/1999 | Pohjola |
| 5,999,104 A | 12/1999 | Symanow et al. |
| 6,012,004 A | 1/2000 | Sugano et al. |
| 6,038,500 A | 3/2000 | Weiss |
| 6,096,978 A | 8/2000 | Pohjola |
| 6,135,806 A | 10/2000 | Pohjola |
| 6,141,610 A | 10/2000 | Rothert et al. |
| 6,154,122 A | 11/2000 | Menze |
| 6,223,104 B1 | 4/2001 | Kamen et al. |
| 6,338,010 B1 | 1/2002 | Sparks et al. |
| 6,356,826 B1 | 3/2002 | Pohjola |
| 6,371,243 B1 | 4/2002 | Donaldson et al. |
| 6,421,593 B1 | 7/2002 | Kempen et al. |
| 6,434,512 B1 | 8/2002 | Discenzo |
| 6,496,775 B1 | 12/2002 | McDonald, Jr. et al. |
| 6,501,386 B1 | 12/2002 | Lehrman et al. |
| 6,553,290 B1 | 4/2003 | Pillar |
| 6,580,593 B1 | 6/2003 | Balakrishnan |
| 6,611,755 B1 | 8/2003 | Coffee et al. |
| 6,757,597 B1 | 6/2004 | Yakes et al. |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0195680 A1 | 10/2003 | Pillar |
| 2003/0200015 A1 | 10/2003 | Pillar |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |

OTHER PUBLICATIONS

"Palletized Load System (PLS)—PLS Potable Water Distributor Module"; 2–page (as photocopied) brochure; Product of Oshkosh Truck Corporation.

"Palletized Load System (PLS)—Concrete Mobile Mixer Module"; 2–page (as photocopied) brochure; Product of Oshkosh Truck Corporation.

"Oshkosh Trucks—75 Years of Specialty Truck Production"; Wright et al.; (pp. 119–126); Motorbooks International Publishers & Wholesalers (1992).

"MTVR Wrecker Variant (MK36 Wrecker Recovery Vehicle)"; 2–page (as photocopied) brochure; Product of Oshkosh Truck Corporation; (Sep. 2001).

"MTVR Dump Body Variant (Medium Tactical Vehicle Replacement)"; 2–page (as photocopied) brochure; Product of Oshkosh Truck Corporation; (Sep. 2001).

"Medium Tactical Vehicle Replacement"; 6–page (as photocopied) brochure; Product of Oshkosh Truck Corporation; (Aug. 2000).

"M1977 CBT (Common Bridge Transporter)"; 2–page (as photcopied) brochure; Product of Oshkosh Truck Corporation.

"M1070F Heavy Equipment Transporter & Trailer"; 8–page (as photocopied) brochure; Product of Oshkosh Truck Corporation; (Sep. 2001).

"LVS—Logistic Vehicle System (MK48 Series)"; 6–page document; Product of Oshkosh Truck Corporation.

"LHS Decontamination Mission Module"; 2–page (as photocopied) brochure; Product of Oshkosh Truck Corporation.

"HEMTT—Heavy Expanded Mobility Tactical Truck M977 Series Truck"; 12–page (as photocopied) brochure; Product of Oshkosh Truck Corporation; (Mar. 2000).

"Aircraft Internal Time Division Multiplex Data Bus," MIL–STD–1553(USAF); 29 pp..; (Aug. 30, 1973).

"Oshkosh Demonstrates ProPulse, the First Electric Hybrid—Drive Heavy Defense Truck," Oshkosh Truck Corp., Feb. 27, 2000 (2 pages).

"Oshkosh Showcases ProPulse Hybrid Electric System at Major Defense Exhibition," Oshkosh Truck Corp., Oct. 21, 2002 (1 page).

"Oshkosh Receives Federal Government Funding to Develop ProPulse Alternative Drive System for Military Trucks," Oshkosh Truck Corp., Aug. 31, 2001 (2 pages).

Dana Corporation, Kallamazoo, Michigan, "Dana® Spicer® Central Tire Inflation System Specifications," www.dana.com, May 2000 (2 pages).

"Oshkosh Truck Rolls Out Next Generation of Command Zone Advanced Electronics System to Military Market," Oshkosh Truck Corp., Oct. 21, 2002 (2 pages).

"Oshkosh Truck's Robotic Truck Qualifies for Pentagon's $1 Million Desert Race," Oshkosh Truck Corp., Mar. 12, 2004 (2 pages).

"Oshkosh Truck and Ohio State University Design Robotic Vehicle to Compete in Desert Race," Oshkosh Truck Corp., Feb. 11, 2004 (2 pages).

"Oshkosh Truck Awarded Contract for U.S. Army Future Tactical Truck Concepts and Technology Evaluations," Oshkosh Truck Corp., Dec. 2, 2003 (2 pages).

* cited by examiner

| STATE | INPUT #1 | INPUT #2 | OUTPUT #1 | OUTPUT #2 |
|---|---|---|---|---|
| 1 | OFF | OFF | OFF | OFF |
| 2 | OFF | ON | ON | ON |
| 3 | ON | OFF | OFF | OFF |
| 4 | ON | ON | OFF | OFF |
| 5 | OFF | ? | ON | OFF |
| 6 | ON | ? | OFF | OFF |
| 7 | ? | ON | OFF | OFF |
| 8 | ? | OFF | OFF | OFF |
| 9 | ? | ? | OFF | OFF |

FIG. 7

| I-11 | O-14 | O-21 | I-35 | I-44 | I-52 |
|---|---|---|---|---|---|
| I-12 | O-15 | O-22 | O-31 | I-45 | I-53 |
| I-13 | I-21 | O-23 | O-32 | IM-41 | I-54 |
| I-14 | I-22 | O-24 | O-33 | O-41 | I-55 |
| I-15 | I-23 | O-25 | O-34 | O-42 | O-51 |
| IM-11 | I-24 | I-31 | O-35 | O-43 | O-52 |
| O-11 | I-25 | I-32 | I-41 | O-44 | O-53 |
| O-12 | IM-21 | I-33 | I-42 | O-45 | O-54 |
| O-13 | IM-22 | I-34 | I-43 | I-51 | O-55 |

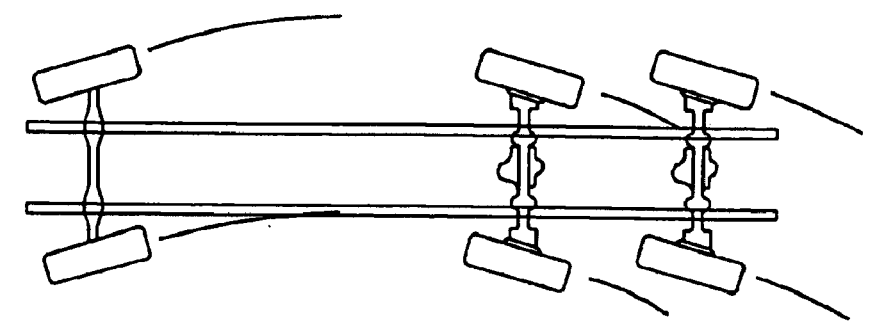
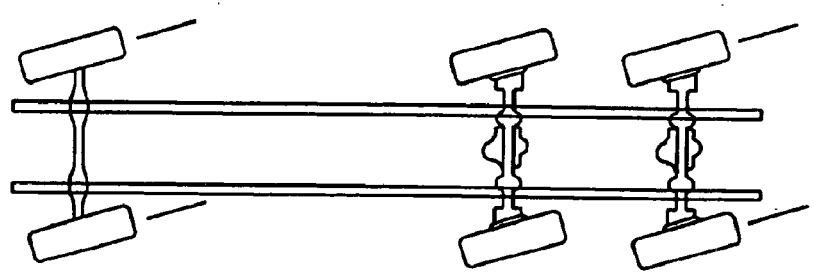
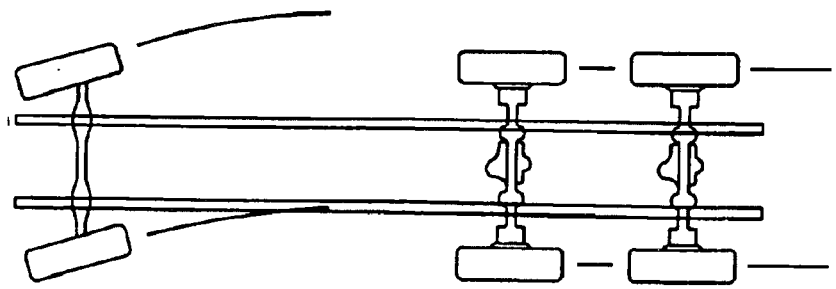
FIG. 50

STEERING CONTROL SYSTEM AND METHOD

CROSS REFERENCE TO RELATED APPLICATIONS

This application claims priority to U.S. Prov. No. 60/449,797, filed Feb. 24, 2003, entitled "Steering Control System and Method" and to U.S. Prov. No. 60/388,451, filed Jun. 13, 2002, entitled "Control System and Method for an Equipment Service Vehicle," each of which is hereby expressly incorporated by reference. This application is also a continuation-in-part of U.S. Ser. No. 10/325,439, filed Dec. 20, 2002, entitled "Equipment Service Vehicle With Network-Assisted Vehicle Service and Repair," pending, which (1) is a continuation-in-part of U.S. Ser. No. 09/927,946, filed Aug. 10, 2001, entitled "Military Vehicle Having Cooperative Control Network With Distributed I/O Interfacing," pending, which is a continuation-in-part of U.S. Ser. No. 09/384,393, filed Aug. 27, 1999, entitled "Military Vehicle Having Cooperative Control Network With Distributed I/O Interfacing," now U.S. Pat. No. 6,421,593, which is a continuation-in-part of U.S. Ser. No. 09/364,690, filed Jul. 30, 1999, entitled "Firefighting Vehicle Having Cooperative Control Network With Distributed I/O Interfacing," abandoned; (2) is a continuation-in-part of U.S. Ser. No. 09/500,506, filed Feb. 9, 2000, entitled "Equipment Service Vehicle Having On-Board Diagnostic System," now U.S. Pat. No. 6,553,290; (3) claims priority to U.S. Prov. No. 60/342,292, filed Dec. 21, 2001, entitled "Vehicle Control and Monitoring System and Method;" (4) claims priority to U.S. Prov. No. 60/360,479, filed Feb. 28, 2002, entitled "Turret Control System and Method for a Fire Fighting Vehicle;" and (5) claims priority to U.S. Prov. No. 60/388,451, filed Jun. 13, 2002, entitled "Control System and Method for an Equipment Service Vehicle;" all of which are hereby expressly incorporated by reference.

BACKGROUND OF THE INVENTION

The present invention relates to steering control systems and methods. In particular, the present invention relates to electronic control systems and methods of steering a vehicle.

All wheel steering systems are known in the art. Examples of all wheel steer systems are described in U.S. Pat. Nos. 5,607,028, 5,417,299, 5,217,083, and 5,111,901, all of which are entitled "All-Wheel Steering System," and are hereby incorporated by reference. Some known all-wheel steering systems are purely mechanical, meaning that the rear wheel angle is determined by gears and gear ratios manually selected by the vehicle operator with the shift of a lever. Unfortunately, this type of all wheel steering system adds considerable weight and complexity to the mechanical subsystem of the vehicle. Other all-wheel steering systems provide rear wheel steering independent of the front wheel angle where the operator steers the rear wheels independently of the front wheels, the rear wheels being steered with a separate steering wheel, joy stick or potentiometer. This type of system is typically used on vehicles that are steered by two operators: one operator steers the front wheels and one operator steers the rear wheels. Unfortunately, the use of two operators has a number of disadvantages such as increasing the labor costs associated with operating the vehicle. Electronically controlled systems have also been employed.

All wheel steering systems are often used on larger vehicles such as trucks. It is desirable for these vehicles to be able to maneuver into small spaces in short periods of time. All-wheel steering provides great benefits in this regard because it provides a smaller minimum turning radius. All-wheel steering systems may also be used in other types of vehicles.

All wheel steering systems, particularly those that are electronically controlled, typically implement steering algorithms to control steering of one or more sets of wheels. In order to provide flexibility in the types of steering algorithms that can be implemented, it is desirable to provide all wheel steering systems with access to a variety of sources of vehicle data. It is also desirable in many instances to provide other electronic systems on-board the vehicle with access to data from the steering control system. What is needed is a control system architecture that provides an improved integration of the steering control system with other vehicle devices.

All-wheel steer systems typically have more modes of operation than a standard front wheel drive system. In order to allow a vehicle operator to use an all-wheel steer system most effectively, it is desirable to provide the operator with feedback regarding operation of the system including vehicle diagnostics. What is needed is improved systems for providing operator feedback in connection with a steering control system.

It is typically necessary to periodically calibrate the steering system of an all wheel steering vehicle. Often these systems are difficult to calibrate and require that the operator to get underneath the truck. What is needed is a steering control system that it is easier to calibrate.

Accordingly, there is an ongoing need for improvements to control systems and methods used in connection with such steering systems. It should be understood, however, that the techniques below extend to those embodiments which fall within the scope of the appended claims, regardless of whether they meet any of the above-mentioned needs.

SUMMARY OF THE INVENTION

In one embodiment, an electronic control system for a vehicle includes a plurality of input devices, a plurality of output devices, a communication network, and a plurality of interface modules. The plurality of input devices includes a first input device that provides information pertaining to an angular position of a first vehicle wheel. The plurality of output devices includes an actuator capable of adjusting the angular position of the first vehicle wheel or an angular position of a second vehicle wheel. The plurality of interface modules are microprocessor based and can be interconnected to each other by way of the communication network. The plurality of interface modules are also coupled to the plurality of input devices and to the plurality of output devices and include one or more interface modules that is coupled to the first input device and to the actuator. The electronic control system is configured to control the angular position of one or both of the first and second vehicle wheels as a function of the information from the first input device.

In another embodiment, an electronic control system for a vehicle includes a plurality of input devices, a plurality of output devices, a communication network, and a plurality of microprocessor based interface modules. The plurality of input devices includes a sensor that provides information pertaining to an angular position of a first vehicle wheel. The plurality of output devices includes an actuator capable of adjusting an angular position of a second vehicle wheel. The plurality of microprocessor based interface modules are interconnected to each other by way of the communication network. The plurality of interface modules are also coupled to the plurality of input devices and to the plurality of output devices, and include one or more interface modules that is coupled to the sensor and to the actuator. The electronic control system is configured to control the angular position of the second vehicle wheel as a function of the angular position of the first vehicle wheel.

In another embodiment, an electronic control system for a vehicle includes a sensor and an actuator. The sensor is configured to provide digital signals pertaining to an angular position of a first vehicle wheel. The actuator is capable of adjusting one or both of the angular position of the first vehicle wheel or an angular position of a second vehicle wheel. The electronic control system receives the digital signals from the sensor and controls the angular position of one or both of the first and second vehicle wheels.

In another embodiment, a vehicle having an electronic control system includes a first set of vehicle wheels with a first wheel angle, a second set of vehicle wheels with a second wheel angle, and a plurality of modes for controlling the second wheel angle as a function of the first wheel angle. The plurality of modes include a first mode and a second mode. The electronic control system is configured to receive input to change from a first mode to a second mode, and, in response to the input, the electronic control unit is configured to operate in the first mode until at least one of the sets of vehicle wheels travels through a straight-ahead position at which time the electronic control unit changes to the second mode.

In another embodiment, a vehicle having an electronic control system includes a first set of vehicle wheels with a variable first wheel angle, a second set of vehicle wheels with a variable second wheel angle, and a lock configured to maintain the second set of vehicle wheels in a locked position. The electronic control system controls the second wheel angle as a function of information pertaining to a first wheel angle. The locked position of the second set of vehicle wheels is input into the electronic control system as a calibration point for a straight-ahead position of the second set of vehicle wheels.

In another embodiment, a vehicle having an electronic control system includes a first set of vehicle wheels with a variable first wheel angle and a second set of vehicle wheels with a second wheel angle. The electronic control system controls one or both of the first and second wheel angles. The electronic control system is configured to log the position of one or both of the first and second set of vehicle wheels.

In another embodiment, an electronic control system for a vehicle includes a sensor, an actuator, and a graphical user interface. The sensor provides information relating to an angular position of a first set of vehicle wheels. The actuator is capable of adjusting an angular position of a second set of vehicle wheels. The electronic control system controls the angular position of the second set of vehicle wheels as a function of the angular position of the first set of vehicle wheels. The graphical user interface displays calibration instructions for calibrating the straight-ahead position of the first and second sets of vehicle wheels.

In another embodiment, a system includes a vehicle and a vehicle wheel alignment system. The vehicle includes a first set of vehicle wheels with a variable first wheel angle, a second set of vehicle wheels with a variable second wheel angle, and an electronic control system. The electronic control system controls the second wheel angle as a function of information pertaining to the first wheel angle. The electronic control system also receives input from the vehicle wheel alignment system and uses the input to determine the straight-ahead position of the second set of vehicle wheels.

In another embodiment, a vehicle having an electronic control system includes a first set of vehicle wheels with a variable first wheel angle, a second set of vehicle wheels with a variable second wheel angle, and a graphical user interface. The graphical user interface includes a representation of the vehicle including an image of the first and second sets of vehicle wheels wherein the first and second wheel angle in the image change as the first and second wheel angle of the first and second sets of vehicle wheels change.

BRIEF DESCRIPTION OF THE DRAWINGS

FIG. 7 is truth table in which an output is controlled with an additional layer of failure management for inputs with undetermined states;

FIG. 10 is an I/O status table of FIG. 9 shown in greater detail;

FIG. 50 shows various modes of operation of the steering control system of FIG. 48;

DETAILED DESCRIPTION OF THE PREFERRED EMBODIMENTS

A. Fire Truck Control System

1. Architecture of Preferred Fire Truck Control System

Figure 1:
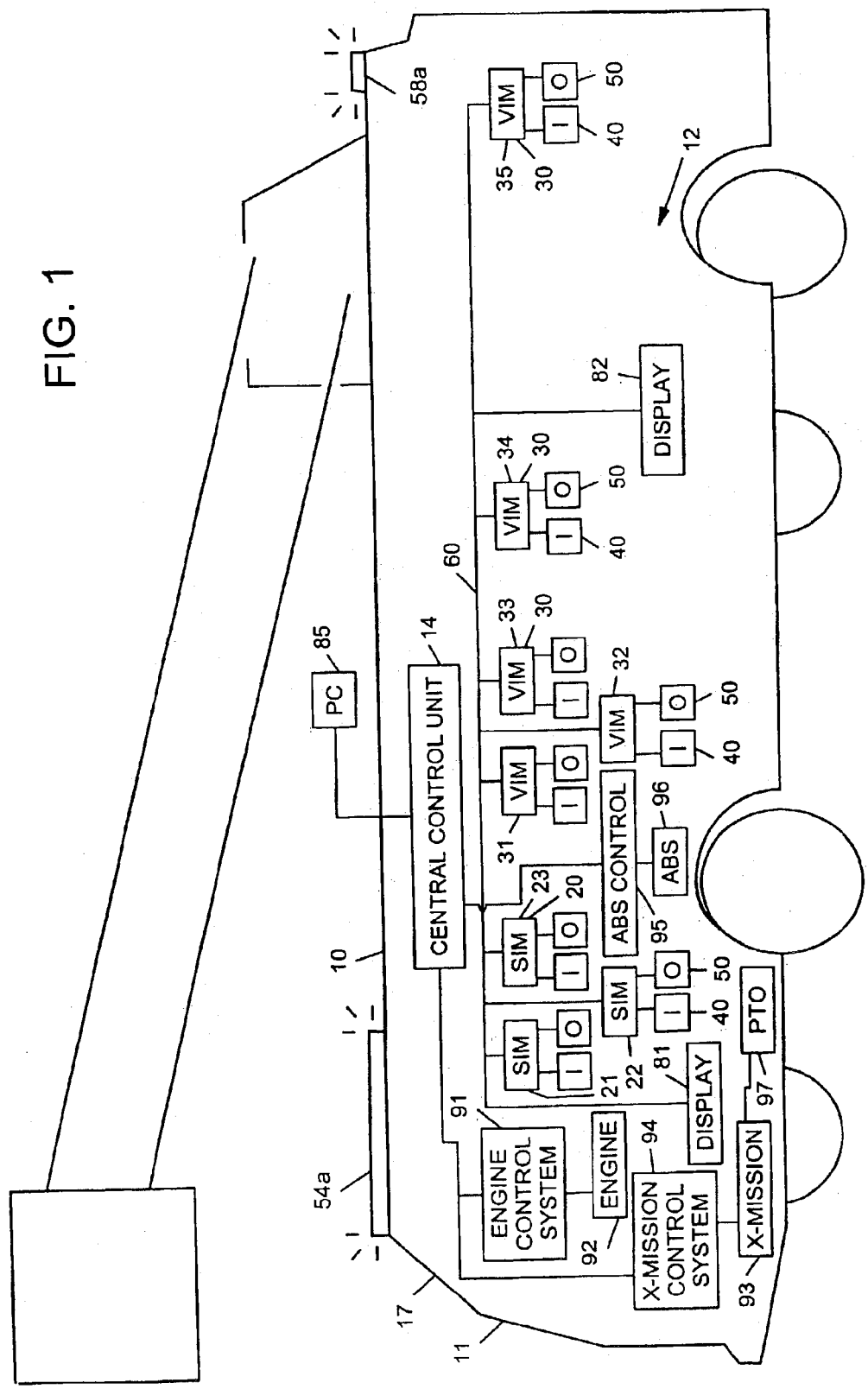
FIG. 1 is a schematic view of a fire truck having a control system according to one embodiment of the present invention.

Referring now to FIG. 1, a preferred embodiment of a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. In general, the control unit 14 executes the program to collect and store input status information from the input devices 40, and to control the output devices 50 based on the collected status information. The control program may implement an interlock system, a load manager, and a load sequencer. As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. For this reason, the interface modules 20 are sometimes referred to herein as "SIMs" ("switch interface modules"). Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20, and therefore are sometimes referred to herein as "VIMs" ("vehicle interface modules"). The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
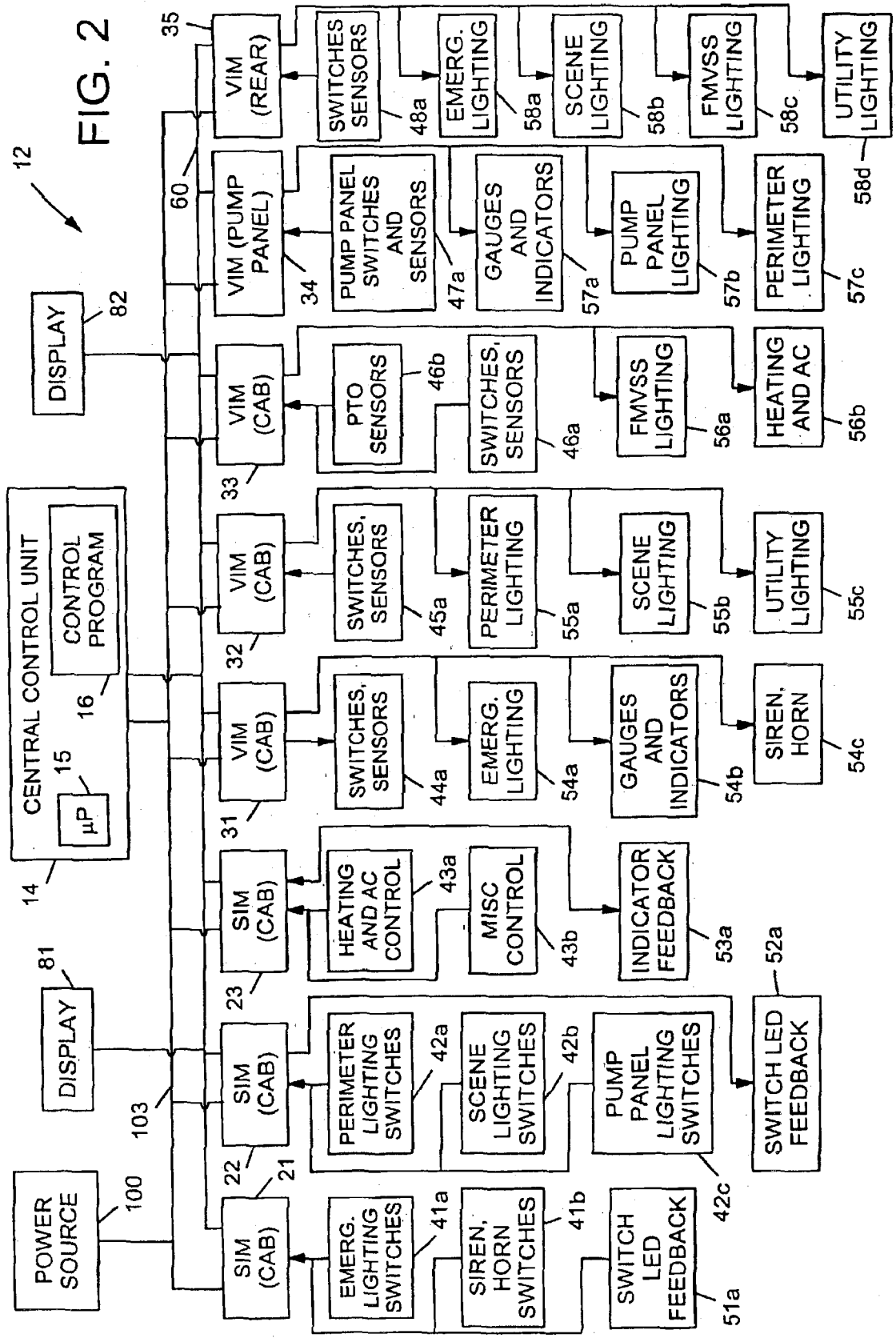
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51a, 52a, 53a, 54a–c, 55a–c, 56a–b, 57a–c and 58a–d in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20. Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41*a* that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41*a* may be an emergency master on/off (E-master) switch used to initiate load sequencing, as described in greater detail below. The interface module 21 may also be connected, for example, to switches 41*b* that control the emergency siren and horn. The interface module 21 is also connected to LEDs 51*a* that are integrally located in the switches 41*a* and 41*b* and that provide operator feedback regarding the positions of the switches 41*a* and 41*b*, as previously described.

The interface module 22 receives inputs from switches 42*a* that control lighting around the perimeter of the fire truck 10, switches 42*b* that control scene lighting, and switches 42*c* that control lighting which aids the operators in viewing gauges and other settings at the pump panel. The interface module 22 is also connected to LEDs 52*a* that are integrally located in the switches 42*a*, 42*b* and 42*c* and that provide operator feedback regarding the positions of the switches 42*a*, 42*b* and 42*c*.

The interface module 23 receives inputs from switches 43*a* that control heating and air conditioning, and switches 43*b* that controls miscellaneous other electrical devices. The interface module 23 is connected to LED indicators, some of which may be integrally located with the switches 43*a* and 43*b* and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs).

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44*a*, 45*a*, 46*a*, 47*a* and 48*a*. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54b which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54c, which are used in combination with the emergency lights 54a.

In addition to the switches and sensors 45a, the interface module 32 is also connected to perimeter lighting 55a, scene lighting 55b and utility lighting 55c. The perimeter lighting 55a illuminates the perimeter of the fire truck 10. The scene lighting 55b includes bright flood lights and/or spot lights to illuminate the work area at a fire. The utility lighting 55c includes lighting used to light operator panels, compartments and so on of the fire truck 10.

In addition to the switches and sensors 46a, the interface module 33 is also connected to PTO sensors 46b. The PTO sensors 46b monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56a of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56b.

In addition to the switches and sensors 47a, the interface module 34, which is disposed near the pump panel, is connected to pump panel switches and sensors 47a, pump panel gauges and indicators 57a, pump panel lighting 57b, and perimeter lighting 57c. The pump system may be manually controlled or may be automatically controlled through the use of electronically controlled valves. In either case, the various fluid pressures are measured by sensors and displayed on the gauges and indicators 57a.

Finally, in addition to the switches and sensors 48a, the interface module 35 is also connected to emergency lighting 58a, scene lighting 58b, FMVSS lighting 58c, and the utility lighting 58d. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Also shown in FIG. 2 is a personal computer 85 which is connected to the control unit 14 by way of a communication link 86, which may be a modem link, an RS-232 link, an Internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state or other remote location by way of the Internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, referring back to FIG. 1, several additional systems are shown which will now be briefly described before proceeding to a discussion of the operation of the control system 12. In particular, FIG. 1 shows an engine system including an engine 92 and an engine control system 91, a transmission system including a transmission 93 and a transmission control system 94, and an anti-lock brake system including an anti-lock brake control system 95 and anti-lock brakes 96. The transmission 93 is mechanically coupled to the engine 92, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

From the foregoing description, a number advantages of the preferred fire truck control system are apparent. In general, the control system is easier to use, more flexible, more robust, and more reliable than existing control systems. In addition, because of these advantages, the control system also increases firefighter safety because the many of the functions that were previously performed by firefighters are performed automatically, and the control system also makes possible features that would otherwise be impossible or at least impractical. Therefore, firefighters are freed to focus on fighting fires.

The control system is easier to use because the control system provides a high level of cooperation between various vehicle subsystems. The control system can keep track of the mode of operation of the fire truck, and can control output devices based on the mode of operation. The functions that are performed on the fire truck are more fully integrated to provide a seamless control system, resulting in better performance.

The control system is robust and can accept almost any new feature without changes in wiring. Switches are connected to interface modules and not to outputs directly, and new features can be programmed into the control program executed by the central control unit. A system can be modified by adding a new switch to an existing interface module, or by modifying the function of an existing switch in the control program. Therefore, modifying a system that is already in use is easy because little or no wiring changes are required.

Additionally, because the control system has access to input status information from most or all of the input devices on the fire truck and has control over most or all of the output devices on the fire truck, a high level of cooperation between the various subsystems on the fire truck is possible. Features that require the cooperation of multiple subsystems are much easier to implement.

The fire truck is also easier to operate because there is improved operator feedback. Displays are provided which can be used to determine the I/O status of any piece of equipment on the vehicle, regardless of the location of the display. Additionally, the displays facilitate troubleshooting, because troubleshooting can be performed in real time at the scene of a fire when a problem is occurring. Troubleshooting is also facilitated by the fact that the displays are useable to display all of the I/O status information on the fire truck. There is no need for a firefighter to go to different locations on the fire truck to obtain required information. Troubleshooting is also facilitated by the provision of a central control unit which can be connected by modem to another computer. This allows the manufacturer to troubleshoot the fire truck as soon as problems arise.

LED indicators associated with switches also improve operator feedback. The LEDs indicate whether the switch is considered to be off or on, or whether the switch is considered to be on but the output device controlled by the switch is nevertheless off due to some other condition on the fire truck.

Because the control system is easier to use, firefighter safety is enhanced. When a firefighter is fighting fires, the firefighter is able to more fully concentrate on fighting the fire and less on having to worry about the fire truck. To the extent that the control system accomplishes tasks that otherwise would have to be performed by the firefighter, this frees the firefighter to fight fires.

The control system is also more reliable and maintainable, in part because relay logic is replaced with logic implemented in a control program. The logic in the control program is much easier to troubleshoot, and troubleshooting can even occur remotely by modem. Also mechanical circuit breakers can be replaced with electronic control, thereby further reducing the number of mechanical failure points and making current control occur more seamlessly. The simplicity of the control system minimizes the number of potential failure points and therefore enhances reliability and maintainability.

The system is also more reliable and more maintainable because there is less wire. Wiring is utilized only to established dedicated links between input/output devices and the interface module to which they are connected. The control system uses distributed power distribution and data collecting. The interface modules are interconnected by a network communication link instead of a hardwired link, thereby reducing the amount of wiring on the fire truck. Most wiring is localized wiring between the I/O devices and a particular interface module.

Additionally, the interface modules are interchangeable units. In the disclosed embodiment, the interface modules 20 are interchangeable with each other, and the interface modules 30 are interchangeable with each other. If a greater degree of interchangeability is required, it is also possible to use only a single type of interface module. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs, at least until configured by the central control unit. Because the interface modules are interchangeable, maintainability is enhanced. An interface module that begins to malfunction due to component defects may be replaced more easily. On power up, the central control unit downloads configuration information to the new interface module, and the interface module becomes fully operational. This enhances the maintainability of the control system.

Because the interface modules are microprocessor-based, the amount of processing required by the central control unit as well as the amount of communication that is necessary between the interface modules and the central control unit is reduced. The interface modules perform preprocessing of input signals and filter out less critical input signals and, as a result, the central control unit receives and responds to critical messages more quickly.

B. Military Vehicle Control System

Figure 3:
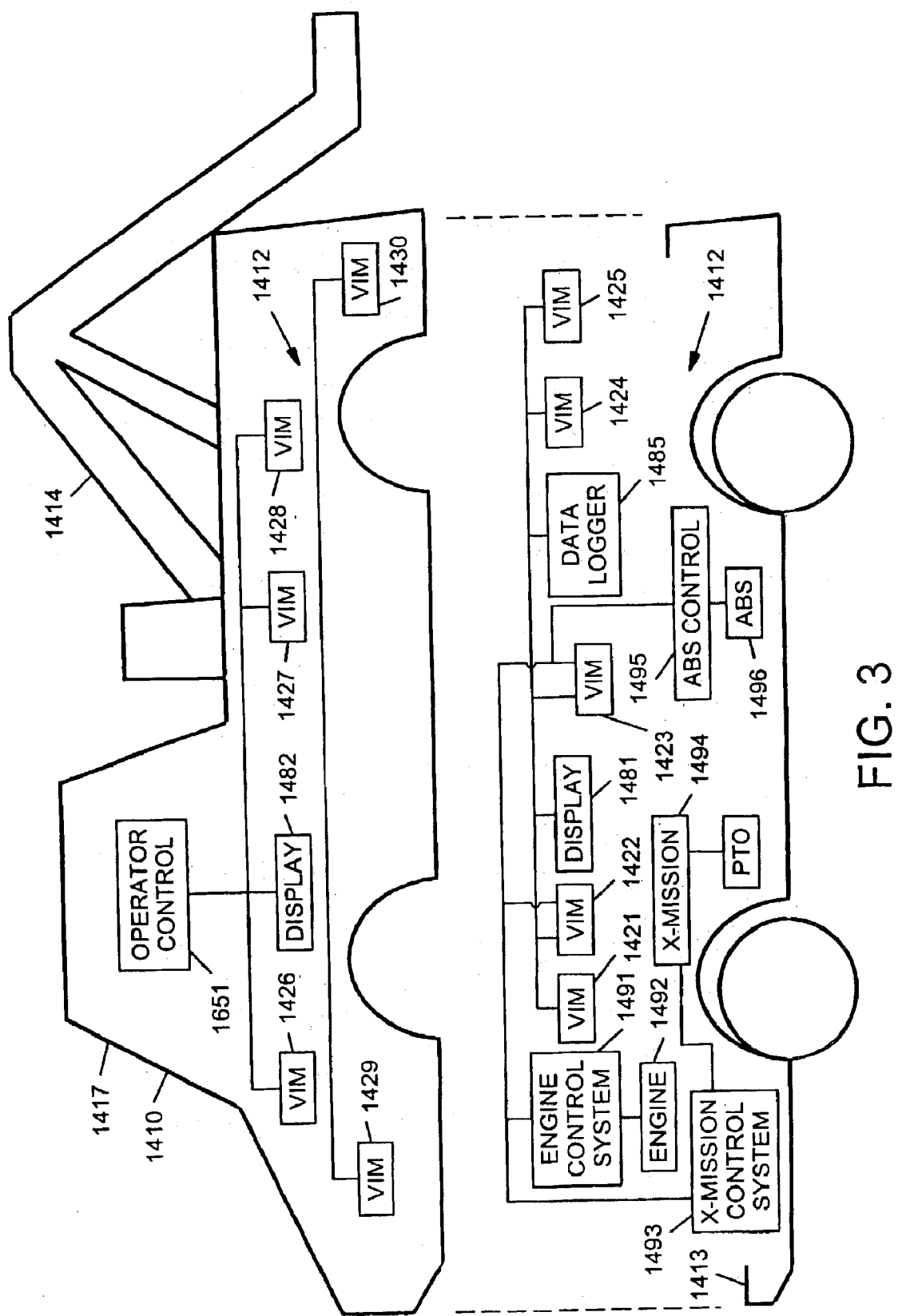
FIG. 3 is a schematic view of a military vehicle having a control system according to another embodiment of the present invention.

Referring now to FIG. 3, a preferred embodiment of a military vehicle 1410 having a control system 1412 is illustrated. As previously indicated, the control system described above can be applied to other types of equipment service vehicles, such as military vehicles, because the interface modules view the outside world in terms of generic inputs and outputs. Most or all of the advantages described above in the context of fire fighting vehicles are also applicable to military vehicles. As previously described, however, it is sometimes desirable in the context of military applications for the military vehicle control system to be able to operate at a maximum level of effectiveness when the vehicle is damaged by enemy fire, nearby explosions, and so on. In this situation, the control system 1412 preferably incorporates a number of additional features, discussed below, that increase the effectiveness of the control system 1412 in these military applications.

By way of overview, the control system 1412 comprises a plurality of microprocessor-based interface modules 1420, a plurality of input and output devices 1440 and 1450 (see FIG. 4) that are connected to the interface modules 1420, and a communication network 1460 that interconnects the interface modules 1420. The control system 1412 preferably operates in the same manner as the control system 12 of FIGS. 1–2, except to the extent that differences are outlined are below.

Figure 8:
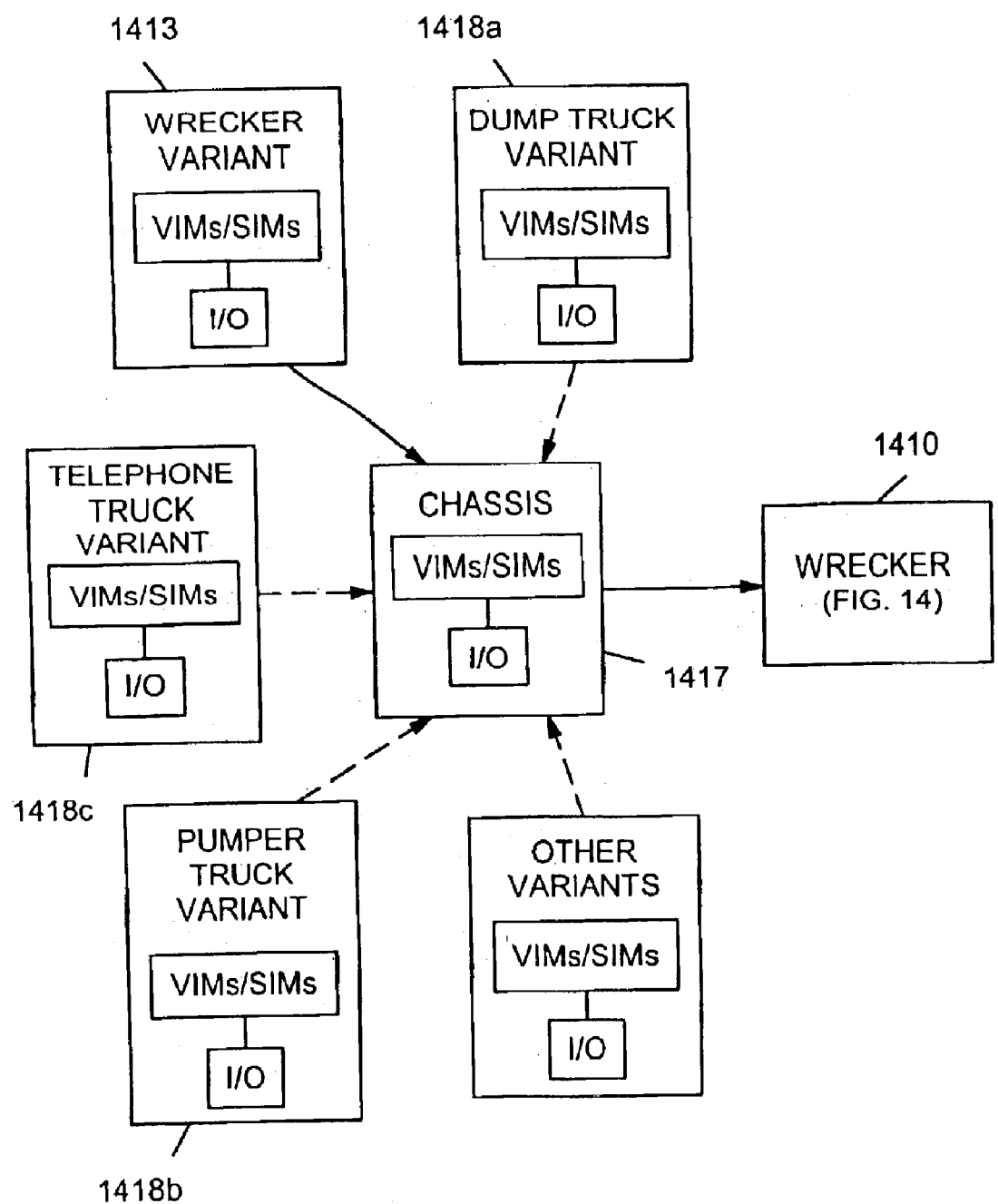
FIG. 8 is an overview of a preferred variant vehicle system.

More specifically, in the illustrated embodiment, the control system 1412 is used in connection with a military vehicle 1410 which is a multipurpose modular military vehicle. As is known, a multipurpose module vehicle comprises a chassis and a variant module that is capable of being mounted on the chassis, removed, and replaced with another variant module, thereby allowing the same chassis to be used for different types of vehicles with different types of functionality depending on which variant module is mounted to the chassis. In the illustrated embodiment, the military vehicle 1410 is a wrecker and includes a wrecker variant module 1413 mounted on a chassis (underbody) 1417 of the military vehicle 1410. The weight of the variant module 1413 is supported by the chassis 1417. The variant module 1413 includes a mechanical drive device 1414 capable of imparting motion to solid or liquid matter that is not part of the military vehicle 1410 to provide the military vehicle 1410 with a particular type of functionality. In FIG. 3, where the variant module 1413 is a wrecker variant, the mechanical drive device is capable of imparting motion to a towed vehicle. As shown in FIG. 8, the variant module 1413 is removable and replaceable with other types of variant modules, which may include a dump truck variant 1418a, a water pump variant 1418b, a telephone variant 1418c, and so on. Thus, for example, the wrecker variant 1413 may be removed and replaced with a water pump variant 1418b having a different type of drive mechanism (a water pump) to provide a different type of functionality (pumper functionality). The I/O devices 1440 and 1450 used by the vehicle 1410 include devices that are the same as or similar to the non-fire truck specific I/O devices of FIGS. 1–2 (i.e., those types of I/O devices that are generic to most types of vehicles), as well as I/O devices that are typically found on the specific type of variant module chosen (in FIG. 3, a wrecker variant).

The interface modules 1420 are constructed in generally the same manner as the interface modules 20 and 30 and each include a plurality of analog and digital inputs and outputs. The number and type of inputs and outputs may be the same, for example, as the vehicle interface modules 30. Preferably, as described in greater detail below, only a single type of interface module is utilized in order to increase the field serviceability of the control system 1412. Herein, the reference numeral 1420 is used to refer to the interface modules 1420 collectively, whereas the reference numerals 1421–1430 are used to refer to specific ones of the interface modules 1420. The interface modules are described in greater detail in connection with FIGS. 4–6.

Also connected to the communication network 1460 are a plurality of displays 1481 and 1482 and a data logger 1485. The displays 1481 and 1482 permit any of the data collected by the control system 1412 to be displayed in real time, and also display warning messages. The displays 1481 and 1482 also include membrane pushbuttons that allow the operators to scroll through, page through, or otherwise view the screens of data that are available. The membrane pushbuttons may also allow operators to change values of parameters in the control system 1412. The data logger 1485 is used to store information regarding the operation of the military vehicle 1410. The data logger 1485 may also be used as a "black box recorder" to store information logged during a predetermined amount of time (e.g., thirty seconds) immediately prior to the occurrence of one or more trigger events (e.g., events indicating that the military vehicle 1410 has been damaged or rendered inoperative, such as when an operational parameter such as an accelerometer threshold has been exceeded).

Finally, FIG. 3 shows an engine system including an engine 1492 and an engine control system 1491, a transmission system including a transmission 1493 and a transmission control system 1494, and an anti-lock brake system including an anti-lock brake control system 1495. These systems may be interconnected with the control system 1412 in generally the same manner as discussed above in connection with the engine 92, the engine control system 91, the transmission 93, the transmission control system 94, and the anti-lock brake system 36 of FIG. 1.

Figure 4:
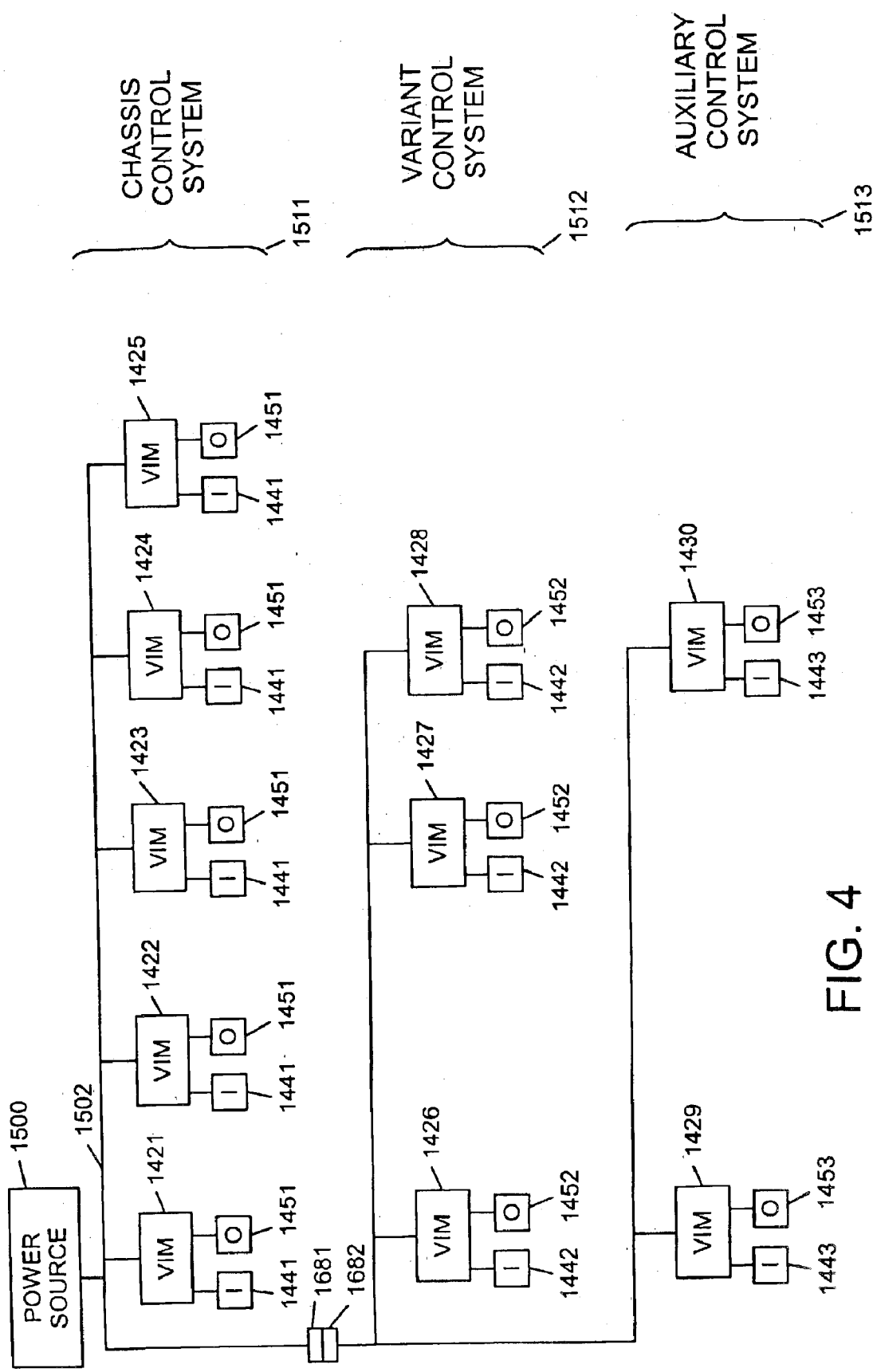
FIGS. 4–5 are block diagrams of the control system of FIG. 3 showing selected aspects of the control system in greater detail.
Figure 5:
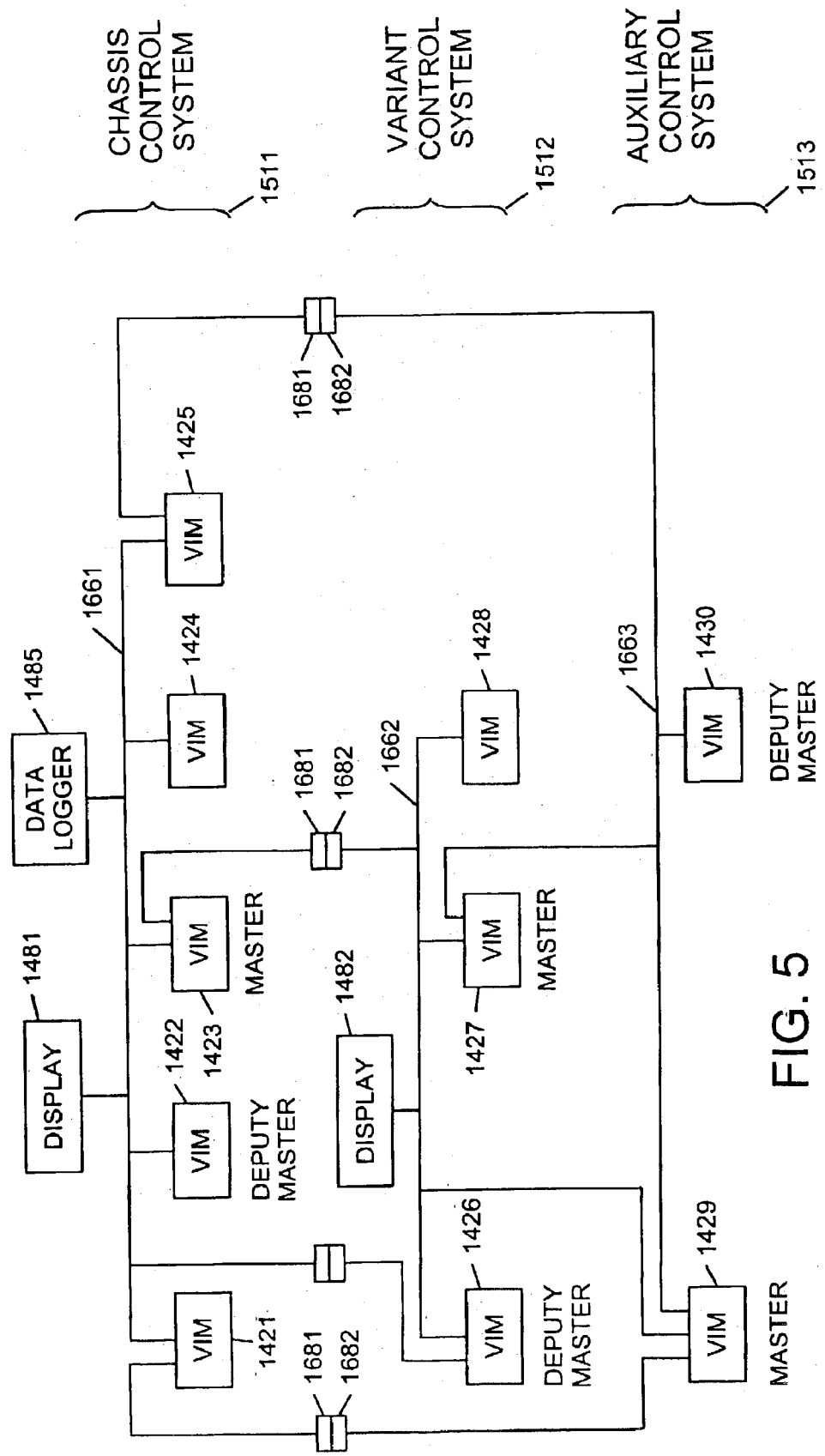
Figure 6:
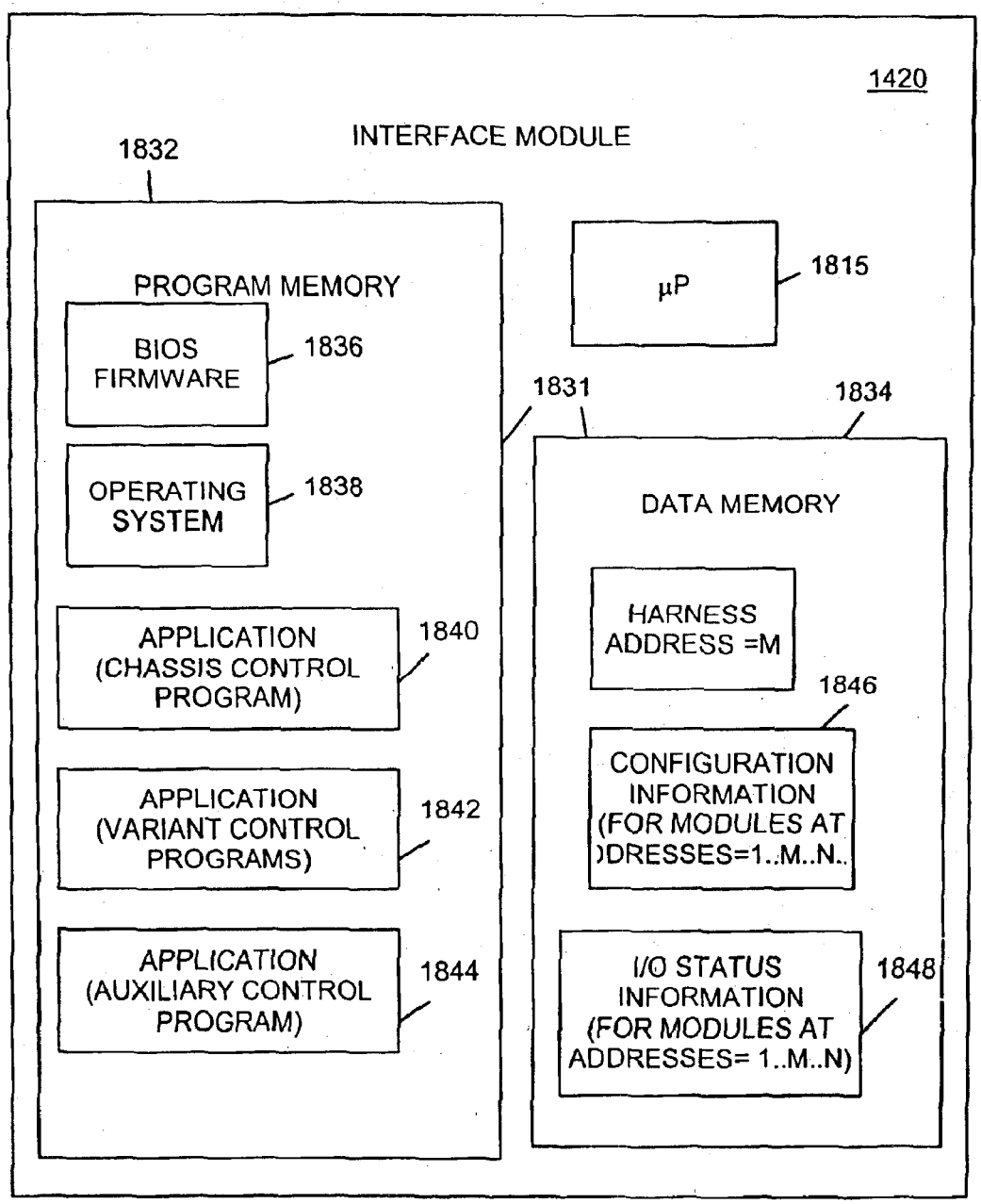
FIG. 6 is a diagram showing the memory contents of an exemplary interface module in greater detail.

Referring now also to FIG. 4-6, the structure and interconnection of the interface modules 1420 is described in greater detail. Referring first to FIG. 4, the interconnection of the interface modules 1420 with a power source 1500 is described. The interface modules 1420 receive power from the power source 1500 by way of a power transmission link 1502. The interface modules 1420 are distributed throughout the military vehicle 1410, with some of the interface modules 1420 being located on the chassis 1417 and some of the interface modules 1420 being located on the variant module 1413.

The control system is subdivided into three control systems including a chassis control system 1511, a variant control system 1512, and an auxiliary control system 1513. The chassis control system 1511 includes the interface modules 1421–1425 and the I/O devices 1441 and 1451, which are all mounted on the chassis 1417. The variant control system 1512 includes the interface modules 1426–1428 and the I/O devices 1442 and 1452, which are all mounted on the variant module 1413. The auxiliary control system 1513 includes the interface modules 1429–1430 and the I/O devices 1443 and 1453, which may be mounted on either the chassis 1417 or the variant module 1413 or both.

The auxiliary control system 1513 may, for example, be used to control a subsystem that is disposed on the variant module but that is likely to be the same or similar for all variant modules (e.g., a lighting subsystem that includes headlights, tail lights, brake lights, and blinkers). The inclusion of interface modules 1420 within a particular control system may also be performed based on location rather than functionality. For example, if the variant module 1413 has an aerial device, it may be desirable to have one control system for the chassis, one control system for the aerial device, and one control system for the remainder of the variant module. Additionally, although each interface module 1420 is shown as being associated with only one of the control systems 1511–1513, it is possible to have interface modules that are associated with more than one control system. It should also be noted that the number of sub-control systems, as well as the number of interface modules, is likely to vary depending on the application. For example, a mobile command vehicle is likely to have more control subsystems than a wrecker variant, given the large number of I/O devices usually found on mobile command vehicles.

The power transmission link 1502 may comprise a single power line that is routed throughout the military vehicle 1410 to each of the interface modules 1420, but preferably comprises redundant power lines. Again, in order to minimize wiring, the interface modules 1420 are placed so as to be located as closely as possible to the input devices 1440 from which input status information is received and the output devices 1450 that are controlled. This arrangement allows the previously-described advantages associated with distributed data collection and power distribution to be achieved. Dedicated communication links, which may for example be electric or photonic links, connect the interface modules 1421–1430 modules with respective ones of the I/O devices, as previously described.

Referring next to FIG. 5, the interconnection of the interface modules 1420 by way of the communication network 1460 is illustrated. As previously indicated, the control system 1412 is subdivided into three control systems 1511, 1512 and 1513. In accordance with this arrangement, the communication network 1460 is likewise further subdivided into three communication networks 1661, 1662, and 1663. The communication network 1661 is associated with the chassis control system 1511 and interconnects the interface modules 1421–1425. The communication network 1662 is associated with the variant control system 1512 and interconnects the interface modules 1426–1428. The communication network 1663 is associated with the auxiliary control system 1513 and interconnects the interface modules 1429–1430. Communication between the control systems 1511–1513 occurs by way of interface modules that are connected to multiple ones of the networks 1661–1663. Advantageously, this arrangement also allows the interface modules to reconfigure themselves to communicate over another network in the event that part or all of their primary network is lost.

In practice, each of the communication networks 1661–1663 may be formed of two or more communication networks to provide redundancy within each control system. Indeed, the connection of the various interface modules 1420 with different networks can be as complicated as necessary to obtain the desired level of redundancy. For simplicity, these potential additional levels of redundancy will be ignored in the discussion of FIG. 5 contained herein.

The communication networks 1661–1663 may be implemented in accordance with SAE J1708/1587 and/or J1939 standards, or some other network protocol, as previously described. The transmission medium is preferably fiber optic cable in order to reduce the amount of electromagnetic radiation that the military vehicle 1410 produces, therefore making the vehicle less detectable by the enemy. Fiber optic networks are also more robust to the extent that a severed fiber optic cable is still usable to create two independent networks, at least with reduced functionality.

When the variant module 1413 is mounted on the chassis 1417, connecting the chassis control system 1511 and the variant control system 1512 is achieved simply through the use of two mating connectors 1681 and 1682 that include connections for one or more communication busses, power and ground. The chassis connector 1682 is also physically and functionally mateable with connectors for other variant modules, i.e., the chassis connector and the other variant connectors are not only capable of mating physically, but the mating also produces a workable vehicle system. A given set of switches or other control devices 1651 on the dash (see FIG. 3) may then operate differently depending on which variant is connected to the chassis. Advantageously, therefore, it is possible to provide a single interface between the chassis and the variant module (although multiple interfaces may also be provided for redundancy). This avoids the need for a separate connector on the chassis for each different type of variant module, along with the additional unutilized hardware and wiring, as has conventionally been the approach utilized.

Upon power up, the variant control system 1512 and the chassis control system 1511 exchange information that is of interest to each other. For example, the variant control system 1512 may communicate the variant type of the variant module 1413. Other parameters may also be communicated. For example, information about the weight distribution on the variant module 1413 may be passed along to the chassis control system 1511, so that the transmission shift schedule of the transmission 1493 can be adjusted in accordance with the weight of the variant module 1413, and so that a central tire inflation system can control the inflation of tires as a function of the weight distribution of the variant. Similarly, information about the chassis can be passed along to the variant. For example, where a variant module is capable of being used by multiple chassis with different engine sizes, engine information can be communicated to a wrecker variant module so that the wrecker variant knows how much weight the chassis is capable of pulling. Thus, an initial exchange of information in this manner allows the operation of the chassis control system 1511 to be optimized in accordance with parameters of the variant module 1413, and vice versa.

It may also be noted that the advantages obtained for military variants can also be realized in connection with commercial variants. Thus, a blower module, a sweeper module, and a plow module could be provided for the same chassis. This would allow the chassis to be used for a sweeper in summer and a snow blower or snow plow in winter.

As shown in FIG. 5, each control system 1511–1513 includes an interface module that is designated "master" and another that is designated "deputy master." The master interface module may for example be used as a nexus for communication with external devices. Thus, for example, the chassis control system 1511 includes a master interface module 1423 and a deputy master interface module 1422. Additional tiers of mastership may also be implemented in connection with the interface modules 1421, 1424 and 1425.

The interface modules 1420 are assigned their respective ranks in the tiers of mastership based on their respective locations on the military vehicle 1410. A harness connector at each respective location of the military vehicle 1410 connects a respective one of the interface modules 1420 to the remainder of the control system 1412. The harness connector is electronically keyed, such that being connected to a particular harness connector provides an interface module 1420 with a unique identification code or address M. For simplicity, the value M is assumed to be a value between 1 and N, where N is the total number of interface modules on the vehicle (M=10 in the illustrated embodiment).

The interface modules 1420 each store configuration information that, among other things, relates particular network addresses with particular ranks of mastership. Thus, for example, when the interface module 1423 boots up, it ascertains its own network address and, based on its network address, ascertains that it is the master of the control system 1511. The interface module 1423 serves as the central control unit so long as the interface module 1423 is competent to do so. For example, if it is determined that the interface module 1423 is no longer competent to serve as master (e.g., because the interface module 1423 has been damaged in combat), then the interface module 1422 becomes the master interface module and begins serving as the central control unit. This decision can be made, for example, by the interface module 1423 itself, based on a vote taken by the remaining interface modules 1420, or based on a decision by the deputy master.

Referring next to FIG. 6, an exemplary one of the interface modules 1420 is shown in greater detail. The interface modules 1420 each include a microprocessor 1815 that is sufficiently powerful to allow each interface module to serve as the central control unit. The interface modules are identically programmed and each include a memory 1831 that further includes a program memory 1832 and a data memory 1834. The program memory 1832 includes BIOS (basic input/output system) firmware 1836, an operating system 1838, and application programs 1840, 1842 and 1844. The application programs include a chassis control program 1840, one or more variant control programs 1842, and an auxiliary control program 1844. The data memory 1834 includes configuration information 1846 and I/O status information 1848 for all of the modules 1420–1430 associated with the chassis 1417 and its variant module 1413, as well as configuration information for the interface modules (N+1 to Z in FIG. 6) of other variant modules that are capable of being mounted to the chassis 1417.

It is therefore seen that all of the interface modules 1420 that are used on the chassis 1417 and its variant module 1413, as well as the interface modules 1420 of other variant modules that are capable of being mounted to the chassis 1417, are identically programmed and contain the same information. Each interface module 1420 then utilizes its network address to decide when booting up which configuration information to utilize when configuring itself, and which portions of the application programs 1840–1844 to execute given its status as a master or non-master member of one of the control systems 1511–1513. The interface modules are both physically and functionally interchangeable because the interface modules are capable of being plugged in at any slot on the network, and are capable of performing any functions that are required at that slot on the network.

This arrangement is highly advantageous. Because all of the interface modules 1420 are identically programmed and store the same information, the interface modules are physically and functionally interchangeable within a given class of vehicles. Thus, if an interface module 1420 on one variant module is rendered inoperative, but the variant module is otherwise operational, the inoperative interface module can be replaced with an interface module scavenged from another inoperative vehicle. When the replacement interface module 1420 reboots, it will then reconfigure itself for use in the new vehicle, and begin operating the correct portions of the application programs 1840–1844. This is the case even when the two vehicles are different types of vehicles.

Additionally, if a highly critical interface module is rendered inoperable, the highly critical interface module can be swapped with an interface module that is less critical. Although the input/output devices associated with the less critical interface module will no longer be operable, the input/output devices associated with the more critical interface module will be operable. This allows the effectiveness of the military vehicle to be maximized by allowing undamaged interface modules to be utilized in the most optimal manner. In this way, the field serviceability of the control system 1412 is dramatically improved. Further, the field serviceability of the control system 1412 is also improved by the fact that only a single type of interface module is used, because the use of a single type of interface module makes it easier to find replacement interface modules.

Additionally, as previously noted, each interface module 1420 stores I/O status information for all of the modules 1420–1430 associated with the chassis 1417 and its variant module 1413. Therefore, each interface module 1420 has total system awareness. As a result, it is possible to have each interface module 1420 process its own inputs and outputs based on the I/O status information in order to increase system responsiveness and in order to reduce the amount of communication that is required with the central control unit. The main management responsibility of the central control unit or master interface module above and beyond the responsibilities of all the other interface modules 1420 then becomes, for example, to provide a nexus for interface operations with devices that are external to the control system of which the central control unit is a part.

Referring now to FIG. 7, FIG. 7 is a truth table that describes the operation of the control system 1412 in the event of failure of one of the interface modules 1420 and/or one of the input devices 1440. The arrangement shown in FIG. 7 allows the control system 1412 to be able to continue to operate in the event of failure using a "best guess" method of controlling outputs.

In the example of FIG. 7, two output devices are controlled based on two input devices. For example, the first output device may be headlights of the military vehicle 1410, the first input device may be a combat switch or combat override switch that places the entire vehicle into a combat mode of operation, and the second input may be an operator switch for operator control of the headlights. The second output device is discussed further below. For simplicity, only the input states of two binary input devices are shown. In practice, of course, the control logic for most output devices will usually be a function of more input devices, in some cases ten or more input devices including analog input devices. Nevertheless, the simplified truth table of FIG. 7 is sufficient to obtain an understanding of this preferred aspect of the invention.

The truth table of FIG. 7 shows a number of different possible input states and the corresponding output states. In the first two states, when the combat override switch (input #1) is off, then the headlights (output #1) are controlled as a function of the operator switch. Thus, if the operator switch is on, then the control system 1412 turns the headlights on, and if the operator switch is off, then the control system 1412 turns the headlights off. In the third and fourth input states, the combat override switch is on, and therefore the control system 1412 turns the headlights off in order to make the vehicle less detectable by the enemy. It may be noted that the control system 1412 ignores the input state of the second input device when the combat override switch is on. The third column in the truth table could therefore instead be the output of a safety interlock, since safety interlocks are another example of input information that is sometimes ignored when a combat override is turned on. This would allow the control system 1412 to take into account the urgency of a combat situation while still also implementing safety functions to the extent that they do not interfere with the operation of the vehicle 1410.

The truth table also has a number of additional states (five through nine) corresponding to situations in which one or both of the inputs is designated as undetermined ("?" in FIG. 7). Thus, for example, in states five and six, the input state of the operator switch (input #2) is designated as undetermined. The undetermined state of the operator switch may be the result of the failure of the interface module that receives the input signal from the operator switch, a failure of the electrical connection between the switch and the interface module, and/or a failure of the operator switch itself. In the fifth state, when the combat override switch is off and the state of the operator switch is undetermined, the control system 1412 turns on the headlights, based on the assumption that if it is nighttime the operator wants the lights on and if it is daytime the operator does not have a strong preference either way. In the sixth state, when the combat override switch is on and the state of the operator switch is undetermined, the control system 1412 turns off the headlights, because the headlights should always be turned off in the combat mode of operation.

In states seven through nine, the input state of the combat override switch (input #1) is designated as undetermined. The undetermined state of the combat override switch may be caused by generally the same factors that are liable to cause the state of the operator switch to be undetermined. In all of these states, the control system 1412 turns off the headlights, based on the worst case assumption that the military vehicle may be in combat and that therefore the headlights should be turned off.

The arrangement shown in FIG. 7 is thus applied to all output devices 1450 on the military vehicle. In this way, the control logic for controlling the output devices is expanded to take into account a third "undetermined" state for each of the input devices, and an entire additional layer of failure management is added to the control logic. In this way, the control system 1412 is able to remain operational (at least in a best guess mode) when the input states of one or more input devices cannot be determined. This prevents output devices that have an output state based on the input state of a given input device from being crippled when a system failure causes one or more input devices to be lost.

This arrangement also allows the output state of each output device to be programmed individually in failure situations. In other words, when a given input device is lost, the control system can be programmed to assume for purposes of some output devices (using the above described truth table arrangement) that the input device is on and to assume for the purposes of other output devices that the input device is off. For example, in FIG. 7, if output device #2 is another output device that is controlled by the same operator switch, the control system can be programmed to assume for purposes of output device #2 that the operator switch is off in state five rather than on, such that the control system turns off the output device #2 in state five. In this way, it is not necessary to assume the same input state for purposes of all output devices.

It may also be noted that military vehicles tend to make widespread use of redundant sensors. In this case, by connecting the redundant sensors to different ones of the interface modules, the state table for each output device can be modified to accept either input, thereby making it possible for the control system 1412 to obtain the same information by a different route. Further, if the redundant sensors disagree on the input status of a system parameter, then this disagreement itself can be treated as an undetermined input state of an input device. In this way, rather than using a voting procedure in which the sensors vote on the state of the input device for purposes of all output devices, the uncertainty can be taken into account and best guess decisions regarding how to operate can be made for each of the various output devices individually.

As previously described, each interface module 1420 has total system awareness. Specifically, the data memory 1834 of each interface module 1420 stores I/O status information 1848 for not only local I/O devices 1440 and 1450 but also for non-local I/O devices 1440 and 1450 connected to remaining ones of the interface modules 1420. Referring now to FIGS. 9–12, a preferred technique for transmitting I/O status information between the interface modules 1420 will now be described. Although this technique is primarily described in connection with the chassis control system 1511, this technique is preferably also applied to the variant control system 1512 and the auxiliary control system 1513, and/or in the control system 12.

Figure 9:
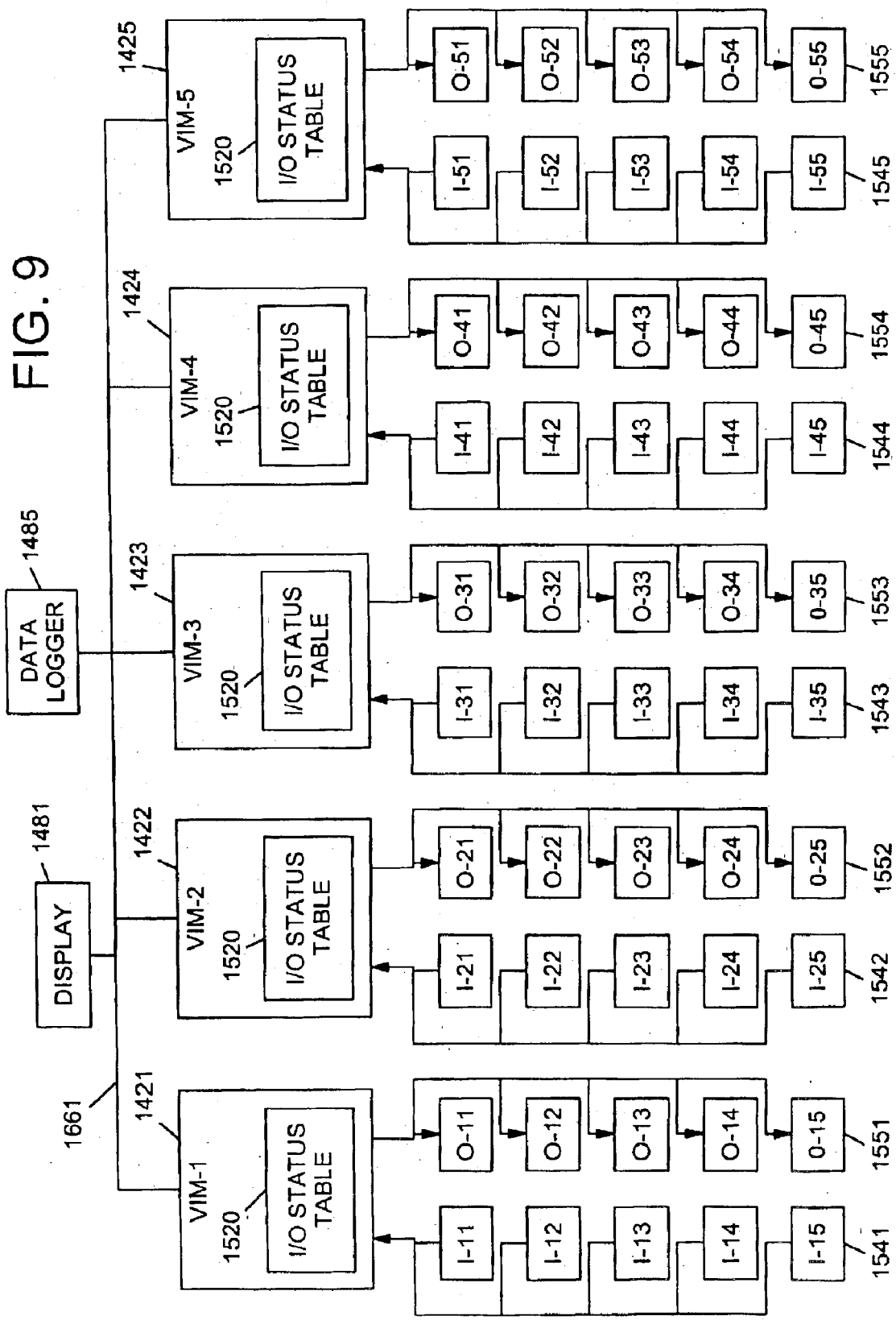
FIG. 9 is a block diagram of the control system of FIG. 3 showing selected aspects of the control system in greater detail.

Referring first to FIG. 9, as previously described, the chassis control system 1511 includes the interface modules 1421–1425, the input devices 1441, and the output devices 1451. Also shown in FIG. 9 are the display 1481, the data logger 1485, and the communication network 1661 which connects the interface modules 1421–1425. In practice, the system may include additional devices, such as a plurality of switch interface modules connected to additional I/O devices, which for simplicity are not shown. The switch interface modules may be the same as the switch interface modules 20 previously described and, for example, may be provided in the form of a separate enclosed unit or in the more simple form of a circuit board mounted with associated switches and low power output devices. In practice, the system may include other systems, such as a display interface used to drive one or more analog displays (such as gauges) using data received from the communication network 1661. Any additional modules that interface with I/O devices preferably broadcast and receive I/O status information and exert local control in the same manner as detailed below in connection with the interface modules 1421–1425. As previously noted, one or more additional communication networks may also be included which are preferably implemented in accordance with SAE J1708/1587 and/or J1939 standards. The communication networks may be used, for example, to receive I/O status information from other vehicle systems, such as an engine or transmission control system. Arbitration of I/O status broadcasts between the communication networks can be performed by one of the interface modules 1420.

To facilitate description, the input devices 1441 and the output devices 1451 have been further subdivided and more specifically labeled in FIG. 9. Thus, the subset of the input devices 1441 which are connected to the interface module 1421 are collectively labeled with the reference numeral 1541 and are individually labeled as having respective input states I-11 to I-15. Similarly, the subset of the output devices 1451 which are connected to the interface module 1421 are collectively labeled with the reference numeral 1551 and are individually labeled as having respective output states O-11 to O-15. A similar pattern has been followed for the interface modules 1422–1425, as summarized in Table I below:

TABLE I

| Interface Module | Input Devices | Input States | Output Devices | Output States |
| --- | --- | --- | --- | --- |
| 1421 | 1541 | I-11 to I-15 | 1551 | O-11 to O-15 |
| 1422 | 1542 | I-21 to I-25 | 1552 | O-21 to O-25 |
| 1423 | 1543 | I-31 to I-35 | 1553 | O-31 to O-35 |
| 1424 | 1544 | I-41 to I-45 | 1554 | O-41 to O-45 |
| 1425 | 1545 | I-51 to I-55 | 1555 | O-51 to O-55 |

Of course, although five input devices 1441 and five output devices 1451 are connected to each of the interface modules 1420 in the illustrated embodiment, this number of I/O devices is merely exemplary and a different number of devices could also be used, as previously described.

The interface modules 1420 each comprise a respective I/O status table 1520 that stores information pertaining to the I/O states of the input and output devices 1441 and 1451. Referring now to FIG. 10, an exemplary one of the I/O status tables 1520 is shown. As shown in FIG. 10, the I/O status table 1520 stores I/O status information pertaining to each of the input states I-11 to I-15, I-21 to I-25, I-31 to I-35, I-41 to I-45, and I-51 to I-55 of the input devices 1541–1545, respectively, and also stores I/O status information pertaining to each of the output states O-11 to O-15, O-21 to O-25, O-31 to O-35, O-41 to O-45, and O-51 to O-55 of the output devices 1551-1555, respectively. The I/O status tables 1520 are assumed to be identical, however, each I/O status table 1520 is individually maintained and updated by the corresponding interface module 1420. Therefore, temporary differences may exist between the I/O status tables 1520 as updated I/O status information is received and stored. Although not shown, the I/O status table 1520 also stores I/O status information for the interface modules 1426–1428 of the variant control system 1512 and the interface modules 1429–1430 of the auxiliary control system 1513.

In practice, although FIG. 10 shows the I/O status information being stored next to each other, the memory locations that store the I/O status information need not be contiguous and need not be located in the same physical media. It may also be noted that the I/O status table 1520 is, in practice, implemented such that different I/O status are stored using different amounts of memory. For example, some locations store a single bit of information (as in the case of a digital input device or digital output device) and other locations store multiple bits of information (as in the case of an analog input device or an analog output device). The manner in which the I/O status table is implemented is dependent on the programming language used and on the different data structures available within the programming language that is used. In general, the term I/O status table is broadly used herein to encompass any group of memory locations that are useable for storing I/O status information.

Also shown in FIG. 10 are a plurality of locations that store intermediate status information, labeled IM-11, IM-21, IM-22, and IM-41. The intermediate states IM-11, IM-21, IM-22, and IM-41 are processed versions of selected I/O states. For example, input signals may be processed for purposes of scaling, unit conversion and/or calibration, and it may be useful in some cases to store the processed I/O status information. Alternatively, the intermediate states IM-11, IM-21, IM-22, and IM-41 may be a function of a plurality of I/O states that in combination have some particular significance. The processed I/O status information is then transmitted to the remaining interface modules 1420.

Figure 11:
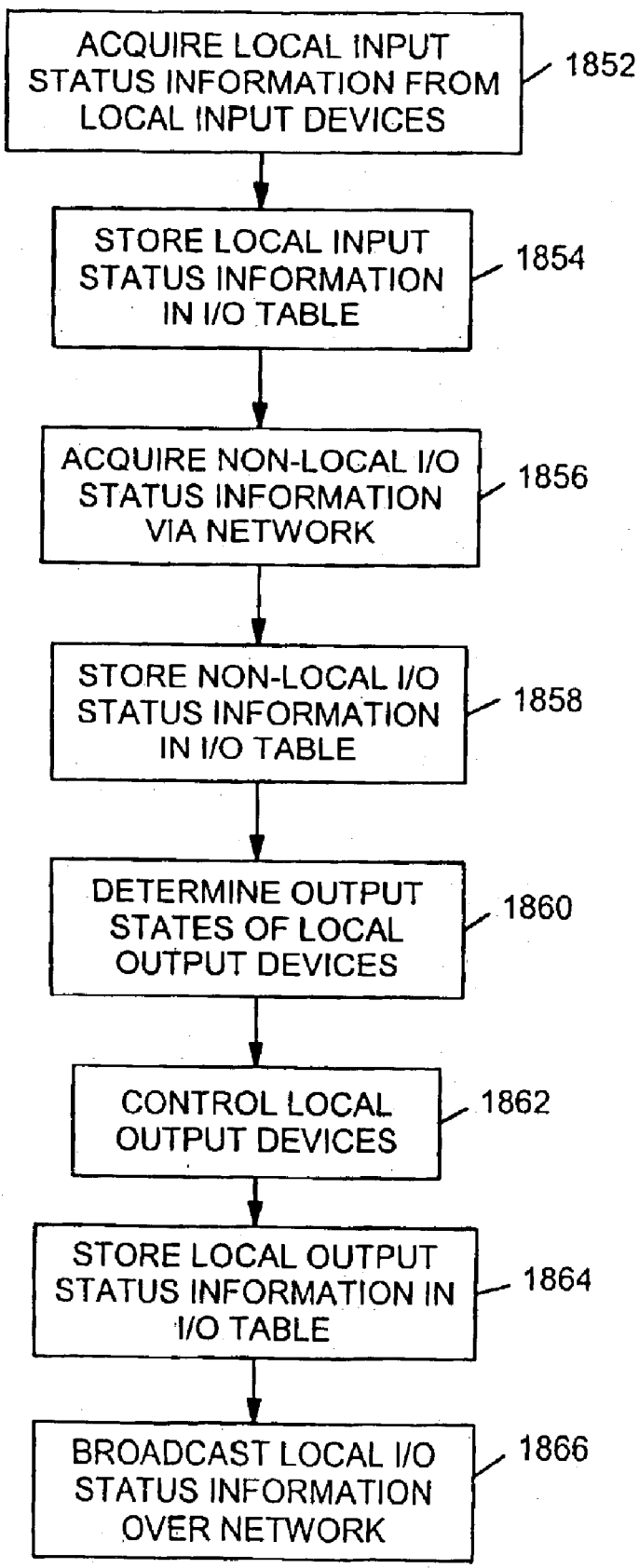
FIG. 11 is a flowchart describing the operation of the control system of FIG. 9 in greater detail.
Figure 12:
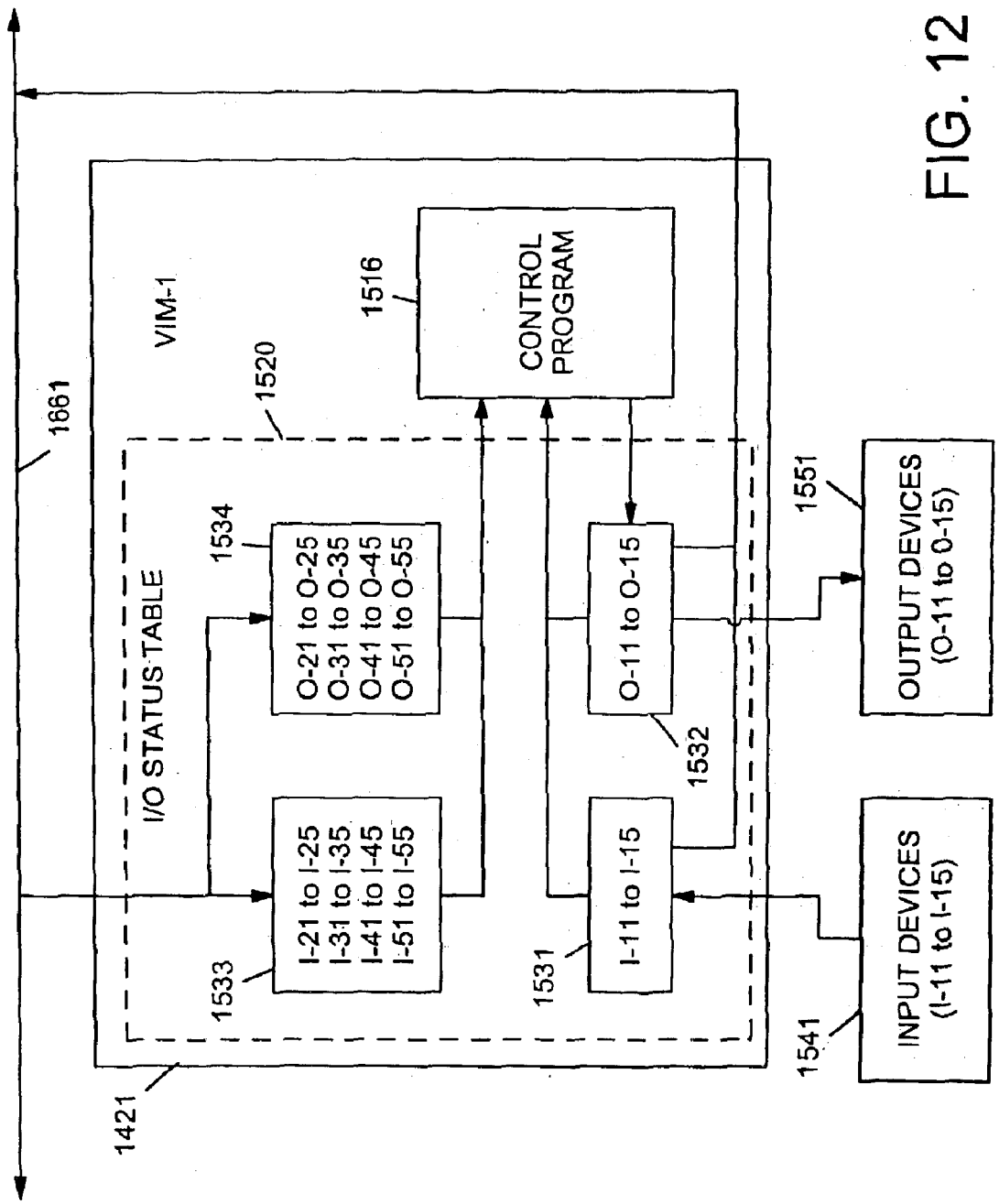
FIG. 12 is a data flow diagram describing data flow through an exemplary interface module during the process of FIG. 11.

Referring now to FIGS. 11–12, FIG. 11 is a flowchart describing the operation of the control system of FIG. 9, and FIG. 12 is a data flow diagram describing data flow through an exemplary interface module during the process of FIG. 11. As an initial matter, it should be noted that although FIG. 11 depicts a series of steps which are performed sequentially, the steps shown in FIG. 11 need not be performed in any particular order. In practice, for example, modular programming techniques are used and therefore some of the steps are performed essentially simultaneously. Additionally, it may be noted that the steps shown in FIG. 11 are performed repetitively during the operation of the interface module 1421, and some of the steps are in practice performed more frequently than others. For example, input information is acquired from the input devices more often than the input information is broadcast over the communication network. Although the process of FIG. 11 and the data flow diagram of FIG. 12 are primarily described in connection with the interface module 1421, the remaining interface modules 1422–1425 operate in the same manner.

At step 1852, the interface module 1421 acquires input status information from the local input devices 1541. The input status information, which pertains to the input states I-11 to I-15 of the input devices 1541, is transmitted from the input devices 1541 to the interface module 1421 by way of respective dedicated communication links, as previously described. At step 1854, the input status information acquired from the local input devices 1541 is stored in the I/O status table 1520 at a location 1531. For the interface module 1421, the I/O devices 1541 and 1551 are referred to as local I/O devices since the I/O devices 1541 and 1551 are directly coupled to the interface module 1421 by way of respective dedicated communication links, as opposed to the remaining non-local I/O devices and 1542–1545 and 1552–1555 which are indirectly coupled to the interface module 1421 by way of the communication network 1661.

At step 1856, the interface module 1421 acquires I/O status information for the non-local input devices 1542–1545 and the non-local output devices 1552–1555 by way of the communication network 1661. Specifically, the interface module 1421 acquires input status information pertaining to the input states I-21 to I-25, I-31 to I-35, I-41 to I-45, I-51 to I-55 of the input devices 1542–1545, respectively, and acquires output status information pertaining to the output states O-21 to O-25, O-31 to O-35, O-41 to O-45, O-51 to O-55 of the output devices 1552–1555. The input status information and the output status information are stored in locations 1533 and 1534 of the I/O status table 1520, respectively.

At step 1860, the interface module 1421 determines desired output states O-11 to O-15 for the output devices 1551. As previously noted, each of the interface modules 1420 stores a chassis control program 1840, one or more variant control programs 1842, and an auxiliary control program 1844. The interface module 1421 is associated with the chassis control system 1511 and, therefore, executes a portion of the chassis control program 1840. (The portion of the chassis control program 1840 executed by the interface module 1421 is determined by the location of the interface module 1421 on the military vehicle 1410, as previously described.) The interface module 1421 executes the chassis control program 1840 to determine the desired output states O-11 to O-15 based on the I/O status information stored in the I/O status table 1520. Preferably, each interface module 1420 has complete control of its local output devices 1450, such that only I/O status information is transmitted on the communication network 1460 between the interface modules 1420.

At step 1862, the interface module 1421 controls the output devices 1551 in accordance with the desired respective output states O-11 to O-15. Once the desired output state for a particular output device 1551 has been determined, control is achieved by transmitting a control signal to the particular output device 1551 by way of a dedicated communication link. For example, if the output is a digital output device (e.g., a headlight controlled in on/off fashion), then the control signal is provided by providing power to the headlight by way of the dedicated communication link. Ordinarily, the actual output state and the desired output state for a particular output device are the same, especially in the case of digital output devices. However, this is not always the case. For example, if the headlight mentioned above is burned out, the actual output state of the headlight may be "off," even though the desired output state of the light is "on." Alternatively, for an analog output device, the desired and actual output states may be different if the control signal is not properly calibrated for the output device.

At step 1864, the interface module 1421 stores output status information pertaining to the desired output states O-11 to O-15 for the output devices 1551 in the I/O status table 1520. This allows the output states O-11 to O-15 to be stored prior to being broadcast on the communication network 1661. At step 1866, the interface module 1421 broadcasts the input status information pertaining to the input states I-11 to I-15 of the input devices 1541 and the output status information pertaining to the output states O-11 to O-15 of the output devices 1551 over the communication network 1661. The I/O status information is received by the interface modules 1422–1425. Step 1866 is essentially the opposite of step 1856, in which non-local I/O status information is acquired by the interface module 1421 by way of the communication network 1661. In other words, each interface module 1420 broadcasts its portion of the I/O status table 1520 on the communication network 1661, and monitors the communication network 1661 for broadcasts from the remaining interface modules 1420 to update the I/O status table 1520 to reflect updated I/O states for the non-local I/O devices 1441 and 1451. In this way, each interface module 1420 is able to maintain a complete copy of the I/O status information for all of the I/O devices 1441 and 1451 in the system.

The interface modules 1423 and 1425 are used to transmit I/O status information between the various control systems 1511–1513. Specifically, as previously noted, the interface module 1423 is connected to both the communication network 1661 for the chassis control system 1511 and to the communication network 1662 for the variant control system 1512. The interface module 1423 is preferably utilized to relay broadcasts of I/O status information back and forth between the interface modules 1421–1425 of the chassis control system 1511 and the interface modules 1426–1428 of the variant control system 1512. Similarly, the interface module 1425 is connected to both the communication network 1661 for the chassis control system 1511 and the to the communication network 1663 for the auxiliary control system 1513, and the interface module 1425 is preferably utilized to relay broadcasts of I/O status information back and forth between the interface modules 1421–1425 of the chassis control system 1511 and the interface modules 1429–1430 of the auxiliary control system 1513.

The arrangement of FIGS. 9–12 is advantageous because it provides a fast and efficient mechanism for updating the I/O status information 1848 stored in the data memory 1834 of each of the interface modules 1420. Each interface module 1420 automatically receives, at regular intervals, complete I/O status updates from each of the remaining interface modules 1420. There is no need to transmit data request (polling) messages and data response messages (both of which require communication overhead) to communicate information pertaining to individual I/O states between individual I/O modules 1420. Although more I/O status data is transmitted, the transmissions require less overhead and therefore the overall communication bandwidth required is reduced.

This arrangement also increases system responsiveness. First, system responsiveness is improved because each interface module 1420 receives current I/O status information automatically, before the information is actually needed. When it is determined that a particular piece of I/O status information is needed, there is no need to request that information from another interface module 1420 and subsequently wait for the information to arrive via the communication network 1661. The most current I/O status information is already assumed to be stored in the local I/O status table 1520. Additionally, because the most recent I/O status information is always available, there is no need to make a preliminary determination whether a particular piece of I/O status information should be acquired. Boolean control laws or other control laws are applied in a small number of steps based on the I/O status information already stored in the I/O status table 1520. Conditional control loops designed to avoid unnecessarily acquiring I/O status information are avoided and, therefore, processing time is reduced.

It may also be noted that, according to this arrangement, there is no need to synchronize the broadcasts of the interface modules 1420. Each interface module 1420 monitors the communication network 1661 to determine if the communication network 1661 is available and, if so, then the interface module broadcasts the I/O status information for local I/O devices 1441 and 1451. (Standard automotive communication protocols such as SAE J1708 or J1939 provide the ability for each member of the network to monitor the network and broadcast when the network is available.) Although it is desirable that the interface modules rebroadcast I/O status information at predetermined minimum intervals, the broadcasts may occur asynchronously.

The technique described in connection with FIGS. 9–12 also provides an effective mechanism for detecting that an interface module 1420 has been rendered inoperable, for example, due to damage incurred in combat. As just noted, the interface modules 1420 rebroadcast I/O status information at predetermined minimum intervals. Each interface module 1420 also monitors the amount of time elapsed since an update was received from each remaining interface module 1420. Therefore, when a particular interface module 1420 is rendered inoperable due to combat damage, the inoperability of the interface module 1420 can be detected by detecting the failure of the interface module 1420 to rebroadcast its I/O status information within a predetermined amount of time. Preferably, the elapsed time required for a particular interface module 1420 to be considered inoperable is several times the expected minimum rebroadcast time, so that each interface module 1420 is allowed a certain number of missed broadcasts before the interface module 1420 is considered inoperable. A particular interface module 1420 may be operable and may broadcast I/O status information, but the broadcast may not be received by the remaining interface modules 1420 due, for example, to noise on the communication network.

This arrangement also simplifies the operation of the data logger 1485 and automatically permits the data logger 1485 to store I/O status information for the entire control system 1412. The data logger 1485 monitors the communication network 1661 for I/O status broadcasts in the same way as the interface modules 1420. Therefore, the data logger 1485 automatically receives complete system updates and is able to store these updates for later use.

As previously noted, in the preferred embodiment, the interface modules 1423 and 1425 are used to transmit I/O status information between the various control systems 1511–1513. In an alternative arrangement, the interface module 1429 which is connected to all three of the communication networks 1661–1663 could be utilized instead. Although less preferred, the interface module 1429 may be utilized to receive I/O status information from each of the interface modules 1421–1428 and 1430, assemble the I/O status data into an updated I/O status table, and then rebroadcast the entire updated I/O status table 1520 to each of the remaining interface modules 1421–1428 and 1430 at periodic or aperiodic intervals. Therefore, in this embodiment, I/O status information for the all of the interface modules 1420 is routed through the interface module 1429 and the interface modules 1420 acquire I/O status information for non-local I/O devices 1440 and 1450 by way of the interface module 1429 rather than directly from the remaining interface modules 1420.

From the foregoing description, a number of advantages of the preferred military vehicle control system are apparent, some of which have already been mentioned. First, the control system is constructed and arranged such that failure at a single location does not render the entire vehicle inoperable. The control system has the ability to dynamically reconfigure itself in the event that one or more interface modules are lost. By avoiding the use of a central control unit that is fixed at one location, and using a moving central control unit, there is no single point failure. If a master interface modules fails, another interface module will assume the position of the central control unit.

Additionally, because the interface modules are interchangeable, if one interface module is damaged, it is possible to field service the control system by swapping interface modules, obtained either from within the vehicle itself or from another vehicle, even if the other vehicle is not the same variant type. This allows the effectiveness of the military vehicle to be maximized by allowing undamaged interface modules to be utilized in the most optimal manner.

The use of the control system 1412 in connection with multipurpose modular vehicles is also advantageous. When the variant module is mounted to the chassis, all that is required is to connect power, ground and the communication network. Only one connector is required for all of the different types of variants. This avoids the need for a separate connector on the chassis for each different type of variant module, along with the additional unutilized hardware and wiring, as has conventionally been the approach utilized.

Moreover, since every interface module has a copy of the application program, it is possible to test each interface module as an individual unit. The ability to do subassembly testing facilitates assembly of the vehicle because defective mechanisms can be replaced before the entire vehicle is assembled.

Finally, the advantages regarding flexibility, robustness, ease of use, maintainability, and so on, that were discussed above in connection with fire fighting vehicles also apply to military vehicles. For example, it is often desirable in military applications to provide vehicles with consoles for both a left-hand driver and a right-hand driver. This option can be implemented without complex wiring arrangements with the preferred control system, due to the distributed data collection and the intelligent processing of information from input devices. Likewise, features such as "smart start" (in which vehicle starting is controlled automatically to reduce faulty starts due to operator error) can be implemented by the control system without any additional hardware.

C. Electric Traction Vehicle

Referring now to FIGS. 13–17, a control system for an electric traction vehicle 1910 is shown. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The disclosure herein can be used to implement electric vehicles in general and/or hybrid electric vehicles in particular. The electric vehicle 1910 can implement any of the other vehicle types described herein (e.g., fire fighting vehicle, military vehicle, snow blower vehicle, refuse-handling vehicle, concrete mixing vehicle) as well as others not described herein. Thus, the following teachings regarding the electric vehicle system may be combined with any/all of the teachings contained herein.

The electric traction vehicle 1910 preferably comprises a vehicle platform or vehicle support structure 1912, drive wheels 1914, a power source or principal power unit 1916, a power storage unit 1922, electric motors 1928, servo or drive controllers 1930, an energy dissipation device 1932, and interface modules 1934. The vehicle 1910 further comprises a control system with a plurality of input and output devices which vary depending on the application for which the vehicle 1920 is used. For example, if the vehicle 1910 is a fire truck, then the vehicle 1910 has input and output devices such as those described in connection with FIGS. 1–2 in connection with the fire truck 10. Except to the extent that different I/O devices are used, the control system the same as the control system 1412 as described in FIGS. 3–12 and is used to receive inputs from these input devices and control these output devices. The interface modules 1934 are part of this control system and preferably are constructed and operate in the same manner as the interface modules 1420 as described above. Specifically, each interface module 1934 preferably processes its own inputs and outputs based on I/O status information received via I/O status broadcasts from the other interface modules 1934.

Interconnecting the interface modules 1934 on the electric traction vehicle 1910 is a communication network 1976 and an AC power bus assembly 1942 through which the vehicle and its various functions are controlled and operated. The communication network 1976 corresponds to the communication network 60 of FIG. 2 in the case of an electric fire truck vehicle and to the communication network 1460 in the case of a electric military vehicle. The communication network 1976 is used to communication I/O status information between the interface modules 1934. The AC bus assembly 1942 is a power transmission link and corresponds to the power transmission link 102 of FIG. 2 in the case of an electric fire truck vehicle and to the power transmission link 1502 of FIG. 4 in the case of an electric military vehicle. Also connected to the AC bus assembly 1942 are the principal power unit 1916, the power storage unit 1922, and the energy dissipation device 1932. The interface modules 1934 include rectifier circuitry to convert AC power from the AC bus assembly 1942 to DC power for output devices such as LED indicators. Also, it may be noted that the AC power is also provided directly to the drive controllers 1930, which operate under the control of the interface modules 1934. It is also contemplated that wireless communication between the interface modules 1934 and the various modules 1984 can be achieved including communication of signals 1974 via radio waves, microwaves, and fiber optical paths including relay via satellite to a central command center.

Figure 13:
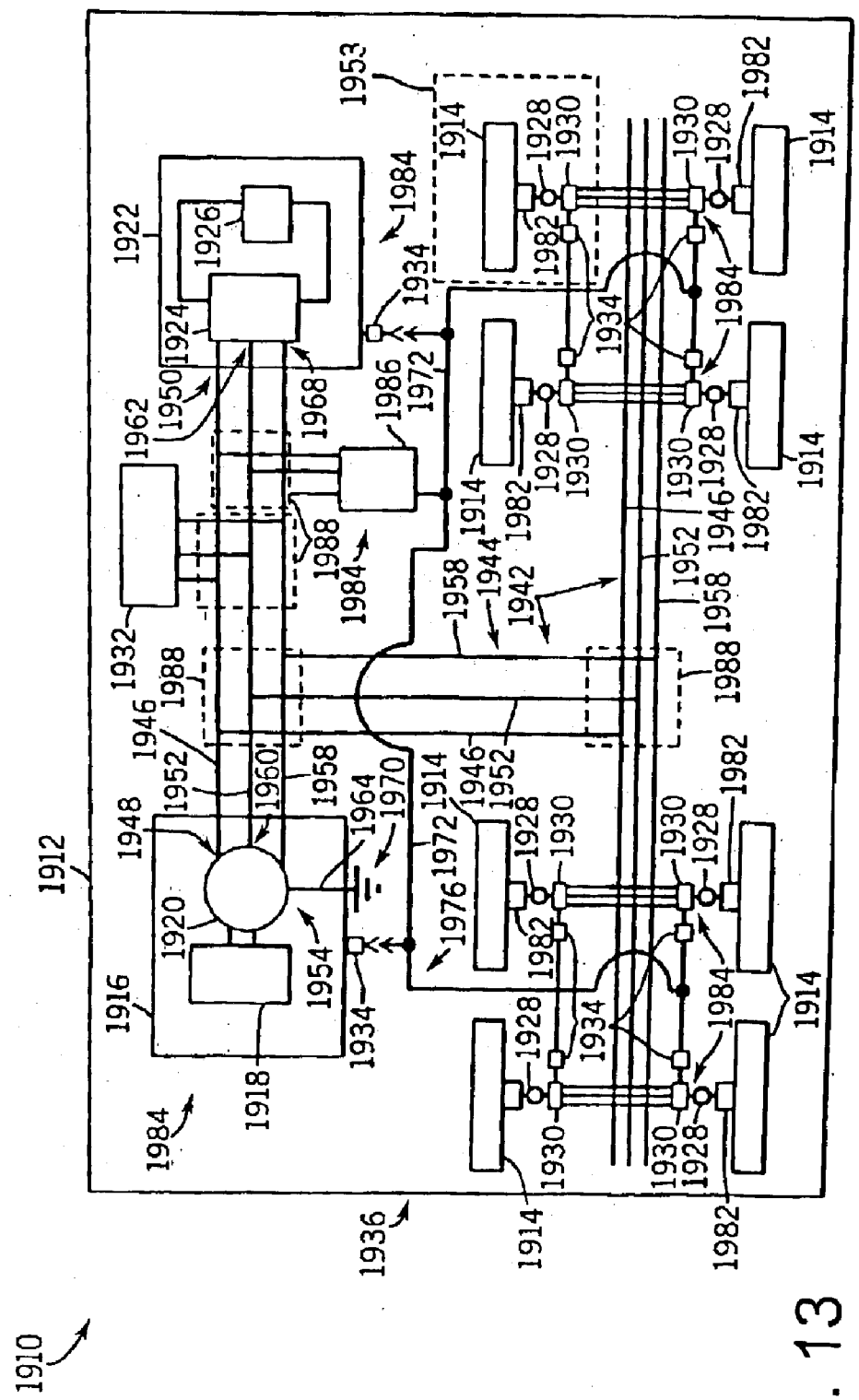
FIG. 13 is a schematic diagram of an exemplary embodiment of an electric traction vehicle providing an exemplary embodiment of an AC bus assembly coupled to various modules on the vehicle.
Figure 20A:
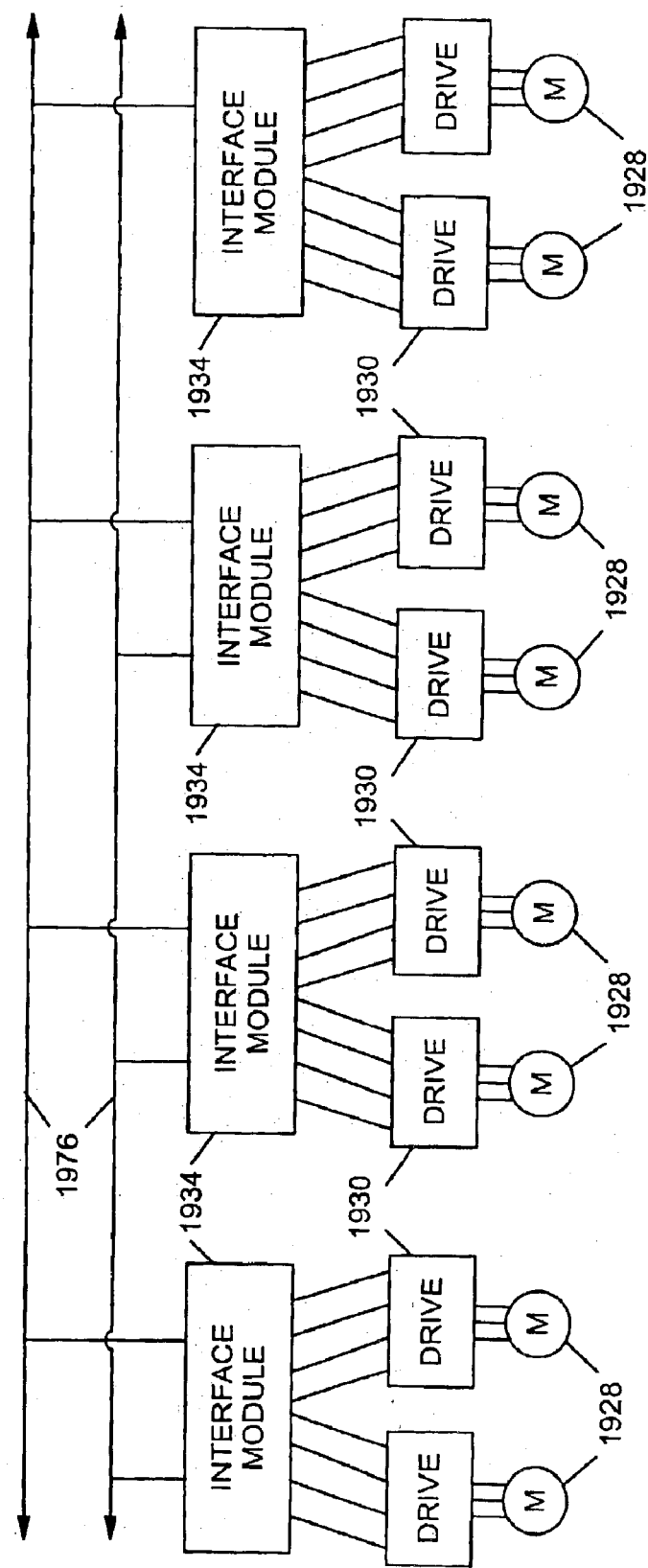
FIGS. 20A–20B is a block diagram showing various configurations for connecting interface modules to drive controllers in the electric traction vehicle of FIG. 13.
Figure 20B:
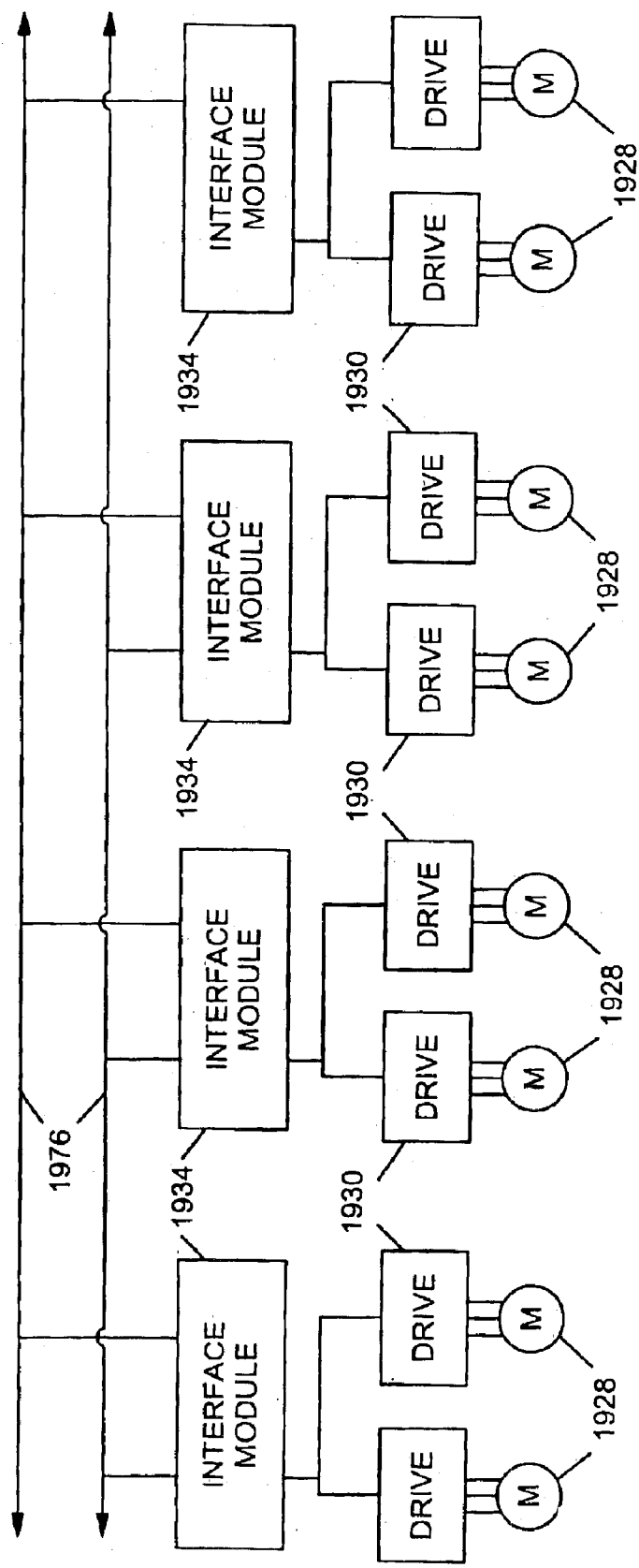

With reference to FIGS. 20A–20B, it may be noted that many commercially-available servo drive controllers may be network-enabled and therefore an option exists as to the manner in which the interface modules 1934 are connected to the drive controllers 1930. Thus, in FIG. 20A, each interface module 1934 is connected to one or more drive controllers 1930 by way of dedicated communication links for hardwired control of the drive controllers 1930. In the illustrated embodiment, three digital links and one analog link are shown for each drive controller 1930 representing, for example, a stop/run output, a forward/reverse output, a generation/regeneration output, and a variable torque command (0–100%) output from the interface module 1934. As indicated in FIG. 13, power from the AC bus assembly 1942 is preferably provided directly to the drive controllers 1930 (rather than through the interface modules 1934), and therefore each of the dedicated communication links is used to transmit only information and not power. Each interface module 1934 is then connected to the communication network 1976 which, in FIG. 20A, is implemented as two separate networks (e.g., a network dedicated for use with the interface modules 1934, and a separate J1939 network to connect to the electronic control units for the engine, transmission, anti-lock brake and central tire inflation systems).

In FIG. 20B, each interface module 1934 is connected to one or more drive controllers 1930 by way of a communication network for network control of the drive controllers 1930. The same information may be transmitted as in FIG. 20A except that the information is transmitted by way of the communication network. Because the AC bus assembly 1942 is connected directly to the drive controllers 1930, there is no need to transmit power from the interface modules 1934 to the drive controllers 1930. Each interface module 1934 is then connected to the communication network 1976. If only two network ports are included on the interface modules 1934, then information obtained from the electronic control units for the engine, transmission, anti-lock brake and central tire inflation systems may be obtained from other interface modules (not shown) connected to a J1939 network. Alternatively, the interface modules 1934 may be provided with a third network port.

The electric motors 1928 are appropriately sized traction motors. An exemplary embodiment of an electric traction vehicle 1910 employs an AC, three phase induction electric motor having a simple cast rotor, machine mount stator and sealed ball bearings. An induction motor is preferred because it avoids brushes, internal switches and sliding contact devices, with the rotor being the only moving part of the traction motor. Control of the electric motor 1928 is achieved by the interface module 1934 through the drive controller 1930 which is coupled to the motor 1928. The torque output of the motor 1928 is adjusted based on inputs received from the operator and transmitted to the interface module 1934 over the communication network 1976.

The drive wheels 1914 are rotatably mounted on the vehicle platform 1912 with an electric motor 1928 coupled to at least one wheel 1914. In one embodiment, the drive wheels 1914 are each be coupled to respective electric motors 1928, which in turn are each coupled to respective drive controllers 1930, which in turn are coupled to respective interface modules 1934.

Various embodiments of an electric traction vehicle 1910 are based on the number of wheels 1914 that are driven on the vehicle 1910. For instance, one embodiment includes a drive wheel 1914 coupled to an electric motor 1928, which in turn is coupled to a drive controller 1930, which in turn is coupled to an interface module 1934, which in turn is coupled to other interface modules (for other vehicle I/O) by way of the communication network 1976. The vehicle can also include four drive wheels 1914 coupled to four respective electric motors 1928, which in turn are coupled to four respective drive controllers 1930, which in turn are coupled to four respective interface modules 1934, which in turn are coupled to other interface modules and to each other by way of the communication network 1976. In the embodiment of FIG. 1, eight drive wheels 1914 are coupled to eight respective electric motors 1928, which in turn are coupled to eight respective drive controllers 1930, which in turn are coupled to eight respective interface modules 1934, which in turn are coupled to other interface modules and to each other by way of the communication network 1976. Other configurations may also be used, and the ratio of motors, wheels, servo drives and interface modules need not be one-to-one relative to each other. Thus, for example, each interface module 1934 may control one wheel, one axle, a tandem set of axles, or other set of wheels. As described in greater detail below, the vehicle 1910 can also include pairs of drive wheels 1914 which are driven in tandem by a respective one of the plurality of electric motors 1928. Typically, at least two of the wheels are steerable.

The torque output of each motor 1928 is adjusted to meet the requirements established in the associated interface module 1934 from the I/O status information. The electric motors 1928 may operate to produce electric torque to drive the drive wheels 1914 or may operate in a regenerative braking mode to provide power to the power storage unit 1922, as determined by inputs received from an operator of the electric traction vehicle 1910.

The electric traction vehicle 1910 can be configured with one or more modular independent coil spring suspensions for steerable and non-steerable wheel assemblies and driver and non-driver axles. Details of such modular independent coil spring suspensions can be found in U.S. Pat. Nos. 5,538,274, 5,820,150, and 6,105,984 incorporated herein by this reference, which are assigned to the assignee of the present invention.

The principal power unit 1916 and the power storage unit 1922 are mounted on the vehicle platform 1912. As previously noted, the principal power unit 1916 provides power for multiple electric motors 1928 coupled to individual drive wheels 1914. This simplifies the transmission of power to the wheels 1914 as compared to a non-electric vehicle by eliminating the torque converter, transmission, transfer case, and drive shafts. Further, because multiple electric motors 1928 are used, the horse power requirements of each electric motor 1928 are such that standard commercially available electric motors may be used even in the case of a heavy duty military vehicle.

The principal power unit 1916 includes a prime mover or engine 1918 coupled to a generator or alternator 1920. The prime mover 1918 can be a gas turbine or an internal combustion engine. The principal power unit 1916 can also be a fuel cell or a nuclear power device. The fuel cell may for example be a hydrogen-oxygen fuel cell that produces electrical power in the process of a chemical reaction that combines oxygen and hydrogen to create water. If a DC source is used, an inverter may be used to convert DC power from the DC source to AC power for the AC bus assembly 1942. In the preferred embodiment, the prime mover 1918 is a diesel engine optimized for operation at a constant speed (revolutions per minute). Operating the diesel engine at a constant, optimal speed eliminates inefficiencies associated with changing RPM levels during acceleration and deceleration, improves overall efficiency, and reduces emissions.

The generator/alternator 1920 is preferably a synchronous generator producing 460 to 480 volts, three phase, AC 60 Hz power for the electric traction vehicle 1910. However, it is contemplated that different sized generators or alternators can be coupled to the prime mover for purposes of generating either higher or lower electrical power. For instance, a single phase system can be utilized or a system that generates 720 volt power system can be used or a system that operates at a frequency other than 60 Hz, such as 50 Hz which is typical in European countries. It is also contemplated that the power generated by the principal power unit 1916 can be modified by appropriate auxiliary modules such as a step-down transformer to provide power to operate ancillary equipment on or associated with the electric traction vehicle 1910 such as pumps, instruments, tools, lights, and other equipment.

The AC bus assembly 1942 includes a plurality of phase conductors 1944. A first conductor 1946 having a first end 1948 and second end 1950 together with a second conductor 1952 having a first end 1954 and a second end 1956 can be configured together with a neutral 1964 to provide single phase power in one embodiment of the vehicle 1910. A third conductor 1958 having a first end 1960 and a second end 1962 can be used in conjunction with the first conductor 1946 and the second conductor 1952 to provide three phase power as shown in FIG. 1. The conductors 1944 can be stranded metal wire such as copper or aluminum sized and clad to transmit the power generation contemplated in the vehicle 1910 design. The conductors 1944 can also be solid metal bars, generally referred to as bus bars, composed of appropriate clad metals, such as copper or aluminum, as will be appreciated by one ordinarily skilled in the art.

Also connected to the AC power bus assembly 1942 is the power storage unit 1922, as previously mentioned. The power storage unit 1922 includes an electric power converter 1924 and an energy storage device 1926. The power storage unit 1922 can be configured to provide electric power above and beyond that required of the principal power unit 1916. The energy storage device 1926 can be electric capacitors, storage batteries, a flywheel, or hydraulic accumulators. The electric power converter 1924 can be configured to convert the AC power generated by the principal power unit 1916 to DC power and transfer such converted power to the storage device 1926. The electrical power converter 1924 can also convert the energy stored in the energy storage device 1926 back to AC power to augment and supplement the AC power generated by the principal power unit 1916 over the AC power bus assembly 1942. Applicants have determined that additional horsepower of short-term power can be provided into the AC power bus assembly 1942 over the phase conductors 1944 by discharge of an on-board capacitor or battery pack (energy storage device 1926) under control of the power storage unit 1922. (Depending on the application, the additional power may be in the range of 100–600 or more horsepower, such as 200–300 horsepower.) In one embodiment, the energy storage device 1926 is formed of a bank of ultracapacitors, such as the PC 500 ultracapacitor available from Maxwell Technologies, 9244 Balboa Avenue San Diego, Calif. 92123. These devices provide a high electrical energy storage and power capacity and have the ability to deliver bursts of high power and recharge rapidly from an electrical energy source/sink over hundreds of thousands of cycles.

An advantage constructing the energy storage device 1926 of capacitors is that capacitors are relatively easy to discharge. Therefore, it is possible to discharge the energy storage device 1926 when maintenance is to be performed on the vehicle 1910 to avoid electrocution of maintenance personnel. In FIG. 13, the power storage unit 1922 (including the energy storage device 1926) operates under the control of one of the interface modules 1934. In one embodiment, the interface module 1934 is used to discharge the energy storage device responsive to operator inputs. For example, a capacitor discharge switch may be provided in the cab of the vehicle 1910 and/or near the energy storage device 1926 and coupled to a nearby interface module 1934. When the operator activates the switch, the interface modules 1934 cooperate responsive to ensure that no electrical power is being coupled to the AC bus assembly 1942 by the generator 1920 and any other power generating devices, such that the energy storage device 1926 is the only power source coupled to the AC bus assembly 1942 (e.g., when the prime mover or engine 1918 is not moving or is not coupled to the AC bus assembly 1942, the generator 1920 does not provide electrical power to the AC bus assembly 1942). Therefore, any stored electrical power in the energy storage device 1926 dissipates to power consuming devices that are coupled to the AC bus assembly 1942. A variety of power consuming devices may be provided for this purpose. For example, an energy dissipation device 1932 (described in greater detail below) may be used for this purpose. The dissipating capacity (e.g., resistor size and power ratings) of the energy dissipation device may be determined as a function of the desired amount of discharge time. Other power consuming devices already coupled to the AC bus assembly 1942, such as an engine cooling fan, may also be used. In this configuration, the interface module 1934 to which the engine cooling fan is connected turns on the engine cooling fan when it is determined that the operator input at the capacitor discharge switch has been received.

The power storage unit 1922 may be coupled to the communication network 1976 and controlled by the interface module 1934. The combined electrical power from the principal power unit 1916 and the power storage unit 1922 will all be available on the AC power bus assembly 1942 for use by the electric motors 1928 or by any other module 1984 or auxiliary module 1986 as determined by the operator at the user interface 1936 of the interface module 1934.

In operation, the power storage unit 1922 receives power from the principal power unit 1916 over conductors 1944 of the AC power bus assembly 1942. The power received is converted into the appropriate energy mode required by the energy storage device 1926 and maintained in the energy storage device 1926 until required during the operation of the vehicle 1910. If the principal power unit 1916 is not functioning for any reason, the energy in the power storage unit can be utilized to operate, for a given period of time, the vehicle 1910 or any of the modules 1984 or auxiliary modules 1986 mounted on the vehicle 1910. In the context of a military vehicle, the power storage unit 1922 may also be used in stealth modes of operation to avoid the noise associated with the prime mover (e.g., diesel engine) 1918 and the generator 1920.

Energy storage recharge of the power storage unit 1922 by the principal power unit 1916 begins automatically and immediately after the vehicle 1910 arrives at its destination and continues during the vehicle's return run to its original location. The state of charge of the power storage unit 1922 is maintained between missions by a simple plug connection to a power receptacle in the vehicle's garage or storage location, which receptacle will automatically disconnect as the vehicle 1910 leaves such site. The power storage unit 1922 can also receive energy generated by the electric motors 1928 when the motors are configured in a regeneration mode in which case they function as a generator. Such functionality is utilized in a braking procedure for the vehicle as determined by the operator at a user interface 1936 (see FIG. 14). The electric motor 1928 and AC power bus assembly 1942 can also be configured to regenerate power back to the principal power unit 1916.

Figure 14:
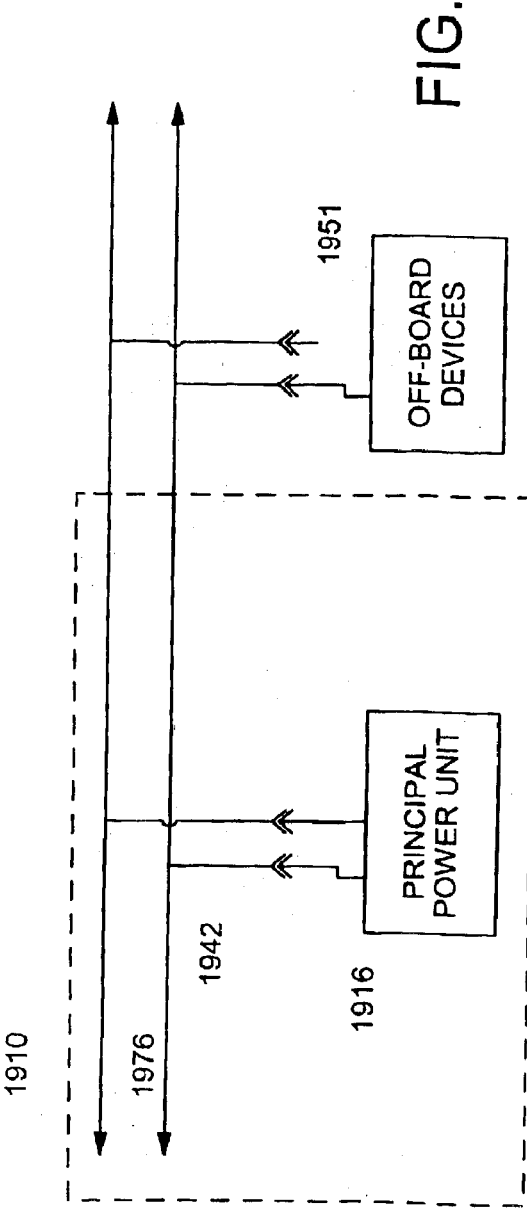
FIG. 14 is a schematic diagram showing the vehicle of FIG. 13 being used as a mobile electric power plant.

As shown in FIG. 14, the vehicle 1910 can also serve as an on-site power source for off-board electric power consuming devices 1951. For example, in the context of a military vehicle, the vehicle 1910 can serve as a mobile electric generator. When the vehicle is stationary, the electric motors 1928 consume substantially zero power. Therefore, electric power that would otherwise be used to drive movement of the vehicle 1910 can be supplied to off-board equipment. In the context of an ARFF vehicle, if an airport loses electricity due to a failure in the power grid, an ARFF vehicle that implements the system described herein can be used to generate power for the airport by connecting the power bus for the airport to the AC bus assembly 1942 through the use of a suitable connector. Likewise, at the scene of a fire, the AC bus assembly 1942 can be used to provide power for scene lighting. In one preferred embodiment, the power generating capacity of the vehicle 1910 is in the neighborhood of about 500 kilowatts of electricity, which is enough to power approximately 250–300 typical homes. Depending on the size of the vehicle 1910 and the principal power unit 1916, the power generating capacity may be smaller (e.g., 250 kilowatts) or larger (e.g., 750 kilowatts). Additionally, because the AC bus assembly 1942 provides 480V, three phase, AC 60 Hz power, which is commonly used in industrial settings, there is no need to convert the power from the AC bus assembly 1942. In this regard, in FIG. 14, the off-board power-consuming devices 1951 are shown not to be connected to the communication network 1976, because the power provided by the AC bus assembly 1942 can be provided to a variety of standard devices, including devices which are not specifically designed for use with the vehicle 1910.

Preferably, an energy dissipation device 1932 is coupled to the AC bus assembly 1942 and the communication network 1976. If it is determined that the principal power unit 1916 or the electric motors 1928 or any other auxiliary module 1986 generating too much power or are not utilizing sufficient power, the excess power can be dissipated through the energy dissipation device 1932. An example of an energy dissipation device 1932 is a resistive coil that may be additionally cooled by fans or an appropriate fluid. Another example of an energy dissipation device 1932 is a steam generator which utilizes excess heat generated in the vehicle to heat water to produce steam. Another example of an energy dissipation device is to have the system back feed the generator to act as a motor and use the engine as an air pump to pull power out of the system. The energy dissipation device, for example, may be used during regenerative braking when the level of charge in the capacitor bank forming the energy storage device 1926 is near its peak.

Figure 15:
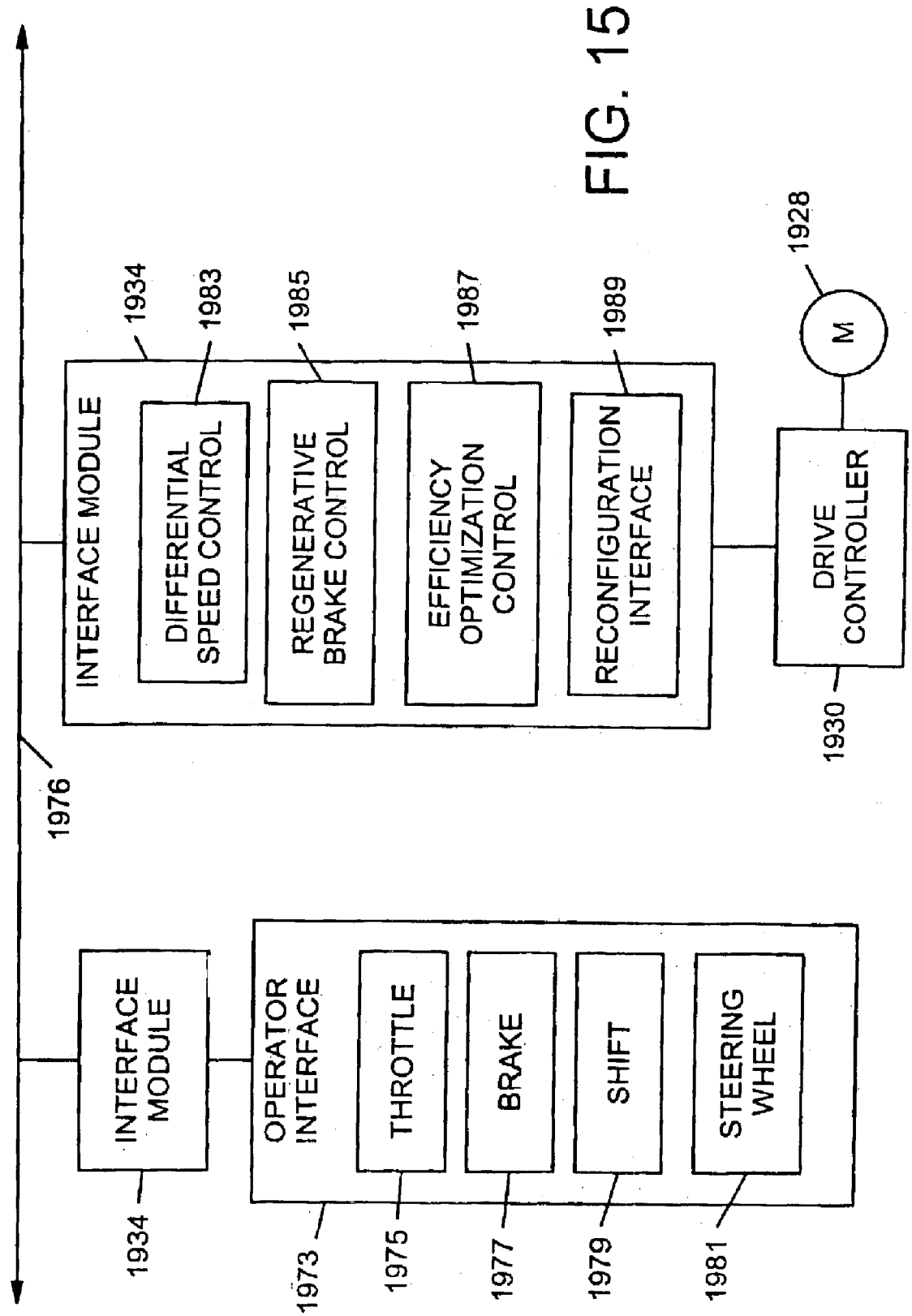
FIG. 15 is a schematic diagram showing selected aspects of a control system of FIG. 13 in greater detail.

Referring now to FIG. 15, selected aspects of the vehicle 1910 of FIG. 13 are shown in greater detail. The vehicle 1910 further comprises an operator interface 1973 which includes a throttle pedal 1975, brake pedal 1977, shift control 1979, and steering wheel 1981. In FIG. 15, these input devices are shown as being connected to a common interface module 1934 which is connected to the communication network 1976 along with the interface modules 1934 coupled to the electric motors 1928 (only one of which is shown in FIG. 14). Although the input devices 1975–1981 are shown as being coupled to a common same interface module, the input devices may also be coupled to different interface modules. The operator interface may also receive inputs from other input devices to raise or lower the vehicle, lock the suspension, control a load-handling system, and control vehicle operation in stealth modes of operation (e.g., operating exclusively on the power storage unit 1922). The operator interface 1973 may include a display that displays information to the operator such as speed, charge level of the storage unit 1922, generator efficiency, direction of travel, alarm status, fuel economy, temperatures, pressures, and data logging information.

Each interface module 1934 receives the I/O status information from the operator interface 1973. For those interface modules that are connected to a respective drive controller 1930 and electric motor 1928, the I/O status information from the operator interface 1973 is processed to provide control signals to control the electric motor 1928. This process is shown in FIG. 15.

Figure 16:
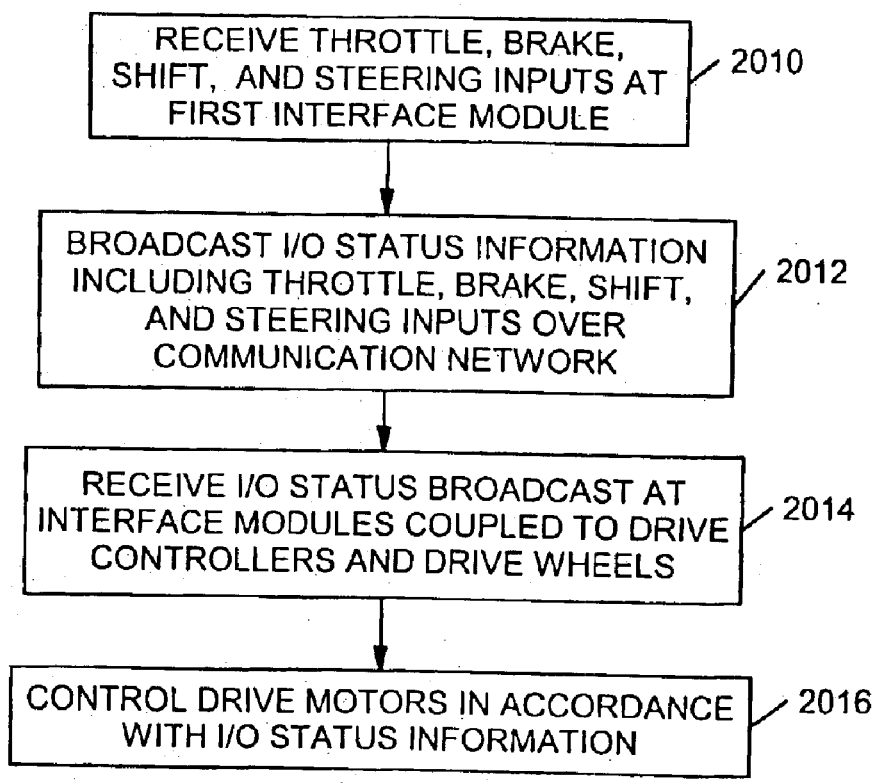
FIG. 16 is a flowchart showing the operation of a control system of FIG. 13 in greater detail.
Figure 18:
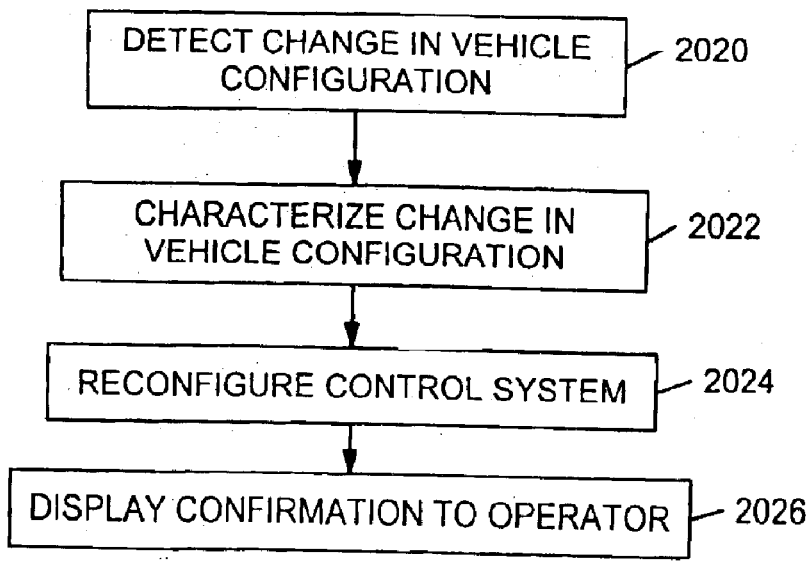
FIG. 18 is a flowchart showing another aspect of the operation of a control system of FIG. 13 in greater detail.

Referring now to FIG. 16, at step 2010, throttle, brake, shift, and steering inputs are received from the operator at the interface module 1934 which is connected to the operator interface 1973. At step 2012, the throttle, brake, shift and steering inputs are transmitted by way of the communication network 1976 (during I/O status broadcasts as previously described). At step 2014, this information is received at each of the remaining interface modules 1934. At step 2016, the interface modules 1934 that control the electric motors 1928 use the throttle, brake, shift and steering inputs to control the electric motors 1928. To this end, the interface modules 1934 determine a speed or torque command and provide this command to the drive controller 1930. Other information, such as vehicle weight, minimum desired wheel speed, wheel slip control parameters, and other information may also be used. Although the vehicle 1910 does not include a mechanical transmission, the shift input from the shift input device 1979 may be used to cause the electric motors 1928 to operate at different operating points depending on a status of the shift input device, with each of the operating points corresponding to different torque production capabilities (or different tradeoffs between vehicle responsiveness/acceleration capability and motor efficiency).

Each interface module 1934 preferably includes a number of control subprograms, including a subprogram 1983 for differential speed control, a subprogram 1985 for regenerative brake control, a subprogram 1987 for efficiency optimization control, and a configuration interface 1989. These programs provide for further control of the torque/speed command given by each interface module 1934 to the respective drive controller 1930.

The differential speed control program 1987 accepts the steering angle as an input and controls the motor speed of each motor 1928 such that the wheels 1914 rotate at slightly different speeds during vehicle turning maneuvers. The differential speed control program 1987 is an electronic implementation of a mechanical differential assembly. The steering angle input may also be used by another interface module 1934 to control a steering mechanism of the vehicle 1910 to thereby control a direction of travel of the vehicle 1910. Preferably, steering control takes into account other I/O status information (such as vehicle speed) and is optimized to avoid vehicle slippage ("scrubbing") during turn maneuvers. The differential speed control program 1987 monitors motor torque output along with other system parameters such that the speed difference between motors does not go above a predefined limit. This can be controlled both side by side and front to back and combinations of both. By commanding torque and monitoring and adjusting for speed difference, optimal tractive force can be put to ground in any traction condition.

Regenerative brake control program 85 controls the motor 1928 such that the motor provides a braking action to brake the vehicle 1910 in response a regeneration/auxiliary signal is received. For example, a signal may be received from a brake pedal request (the brake pedal 1977 is pressed), no TPS count, or other user controlled input/switch. This causes the motor 1928 to act as a generator to regenerate power back to the power storage unit 1922 or the principal power unit 1916 via the AC bus assembly 1942. In addition to regenerative braking, a standard anti-lock brake system is also used.

The efficiency optimization control program 87 controls motor speed and torque conditions to allow a first subset of the motors 1928 to operate at an optimal power for a particular speed, and a second subset of the motors 1928 to operate in a regenerative mode. Having one set of motors operate 1928 at an optimal power for a particular speed and a second set of motors 1928 operate in a regenerative mode is more efficient and draws less net power than having all of the motors 1928 operating at a non-optimal speed. Alternative power matching schemes may also be used in which optimum efficiency for some of the motors 1928 is reached by having some of the remaining motors 1928 operate in a non-torque producing mode.

Configuration interface program 1989 allows for reconfiguration of the vehicle 1910 depending on which types of auxiliary modules are mounted to the vehicle 1910. The configuration program 1989 detects what type of auxiliary modules are connected to the vehicle, and adjusts the configuration of the control program executed by the interface modules 1934 to take into account the particular configuration of the vehicle 1910 as determined by which auxiliary modules are present.

In particular, in the preferred embodiment, the principal power unit 1916, the power storage unit 1922, and the energy dissipation device 1932 are provided as auxiliary modules 1984 that are removably mounted on the vehicle platform and are removably connected to the communication network 1976 and the AC bus assembly 1942 by way of a suitable connector assembly. Other auxiliary modules 1986 may also be provided. An auxiliary module 1986 can be any type of equipment or tool required or associated with the function and operation of the vehicle 1910. For example, the auxiliary module can be a pump, a saw, a drill, a light, etc. The auxiliary module 1986 is removably connected to the communication network 1976 and the AC bus assembly 1942. A junction 1988 is used to facilitate the connection of the modules to the communication network 1976 and the AC power bus assembly 1942 and multiple junctions 1988 are located at convenient locations throughout the vehicle 1910. The junctions 1988 can accommodate various types of connections such as quick connectors, nuts and bolts, solder terminals, or clip terminals or the like. The junction 1988 can include a connector to accommodate connection to the communication network 1976 and/or the AC bus assembly 1942. Additional auxiliary modules can be added to the vehicle 1910 as circumstances and situations warrant.

Figure 17:
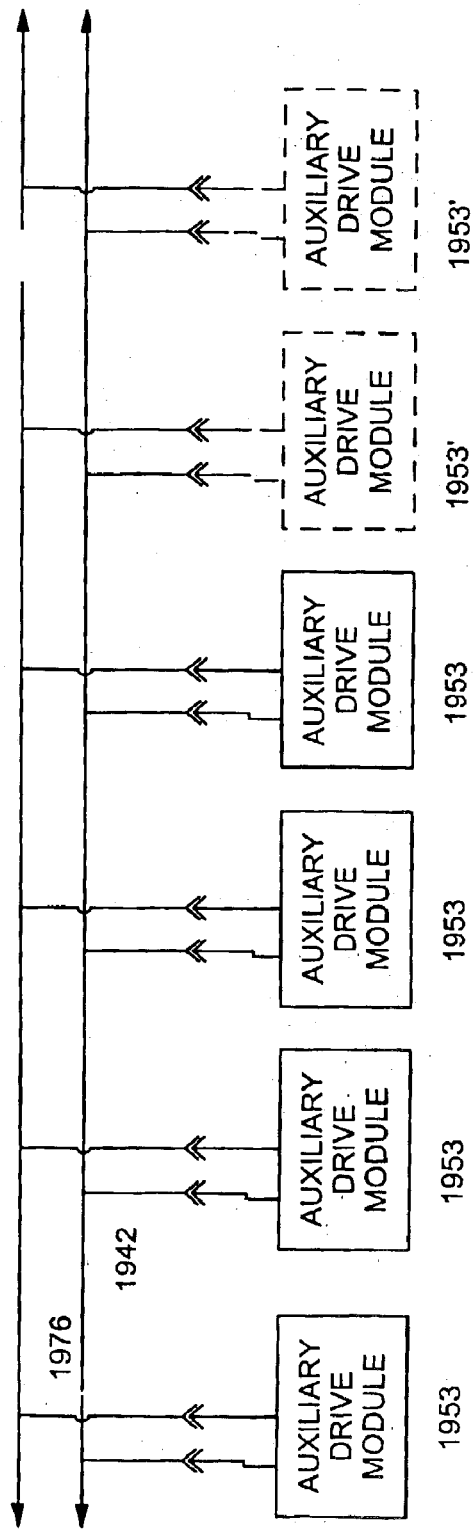
FIG. 17 is a schematic diagram showing auxiliary drive modules used in the vehicle of FIG. 13.

In the preferred embodiment, and as shown in FIG. 17, auxiliary drive modules 1953 are used that each include a respective one of the drive wheels 1914, a respective one of the electric motors 1928, a respective one of the drive controllers 1930, and a respective one of the interface modules 1934. Like the other auxiliary modules discussed above, the auxiliary drive modules 1953 are capable of being removed, replaced, and added to the vehicle 1910. To this end, each auxiliary drive module includes an electrical connector that mates with a compatible electrical connector one the vehicle platform 1912 and a mechanical mounting system (e.g., a series of bolts) that allows the auxiliary drive module 1953 to be quickly mounted to or removed from the vehicle 1910. The electrical connector connects the interface module 1934 to a communication network 1976 and connects the drive controller 1930 to the AC bus assembly 1942. Therefore, if one auxiliary drive module 1953 malfunctions, the auxiliary drive module 1953 can be removed and replaced with a properly functioning auxiliary drive module 1953. This allows the vehicle 1910 to return immediately to service while the inoperable drive module is serviced. This arrangement also allows the same vehicle to be provided with different drive capacities depending on intended usage. For example, under one usage profile, the vehicle 1910 may be provided with four auxiliary drive modules 1953. Under a second usage profile, the vehicle 1910 may be provided with two additional auxiliary drive modules 1953' for extra drive capacity. Additionally, the vehicle platform 1912 is preferably a generic vehicle platform that is used with several different types of vehicles having different application profiles requiring different drive capacities. In this regard, it may also be noted that the principal power unit 1916 is also capable of being removed and replaced with a principal power unit 1916 with a larger electric generation capacity. This feature is therefore advantageous in that auxiliary drive modules 1953 are capable of being added to and removed from the vehicle as a unit to achieve a corresponding increase or decrease in the drive capacity of the vehicle 1910, thereby giving the vehicle 1910 a reconfigurable drive capacity. As previously indicated, the system can be configured to have one of the interface modules 1934 control a single drive wheel 1914, an entire axle assembly (one or two motor configuration) as well as a tandem axle assembly (one and two motor axle configurations), as well as other permutations and combinations.

Referring to FIG. 16, FIG. 16 shows the operation of the configuration program 1989. At step 2020, it is detected that there has been a change in vehicle configuration. The auxiliary module may be any of the auxiliary modules described above. Step 2020 comprises detecting that an auxiliary module has been added in the case of an added auxiliary module, and comprises detecting that an auxiliary module has been removed in the case of a removed auxiliary module. If an auxiliary module has been rendered in operable (e.g., one of the electric motors 1928 has failed), then step 2020 comprises detecting that the inoperable auxiliary module has failed.

At step 2022, the configuration change is characterized. For example, if an auxiliary module has been added or removed, the type and location of the added/removed auxiliary module is determined. If one auxiliary module has been replaced with another auxiliary module, the location at which the change was made as well as the module type of the added and removed auxiliary modules is determined. In the case where the auxiliary module comprises an interface module 1934, the different characteristics of the different auxiliary modules may be stored in the respective interface modules 1934. As a result, step 2022 may be performed by querying the interface module 1934 of the removed auxiliary module (before it is removed) and by querying the interface module of the added auxiliary module.

At step 2024, the vehicle 1910 is reconfigured to accommodate the added auxiliary drive module. Step 2024 comprises updating control algorithms in the interface modules 1934. For example, if two auxiliary drive modules are added, the control algorithms may be updated to decrease the horsepower produced by the original motors 1928 in response to a particular throttle input to take into account the additional horsepower provided by the added electric motors 1928. Alternatively, if one of the electric motors 1928 fails or is otherwise rendered inoperable, then the updating compensates for less than all drive wheels being driven by causing the remaining electric motors to be controlled to provide additional horsepower. This gives the vehicle 1910 different modes of operation, for example, a first mode of operation in which the electric motors are controlled such that all of the plurality of drive wheels are driven, and a second mode of operation in which the electric motors are controlled such that less than all of the plurality of drive wheels are driven.

At step 2026, a confirmation is sent to the operator of the vehicle 1910 via a display of the operator interface 1973 to confirm that the vehicle has been reconfigured. It may also be desirable to transmit this information to other systems. For example, one of the interface modules 1934 may be provided with a wireless modem, and the change in configuration information may be transmitted wireless to an off-board computer using a radio frequency (RF) communication link. Indeed, any of the information stored in any of the interface modules or any of the other vehicle computers (e.g., engine control system, transmission control system, and so on) may be transmitted to an off-board computer system in this manner to allow off-board vehicle monitoring and/or off-board vehicle troubleshooting. The transfer of information may occur through a direct modem link with the off-board vehicle computer or through an Internet connection.

Thus, the vehicle 1910 has a modular construction, with the principal power unit 1916, the power storage unit 1922, the energy dissipation device 1932, the auxiliary drive modules 1953, other drive modules 1984 and 1986, and so on, being provided as modules that can be easily added to or removed from the vehicle. Any number of such modules can be added and is limited only by the extent to which suitable locations which connections to the communication network and AC bus assembly 1942 exist on the vehicle 1910. Once such a device is added, the control system is automatically reconfigured by the interface modules 1934.

Figure 19A:
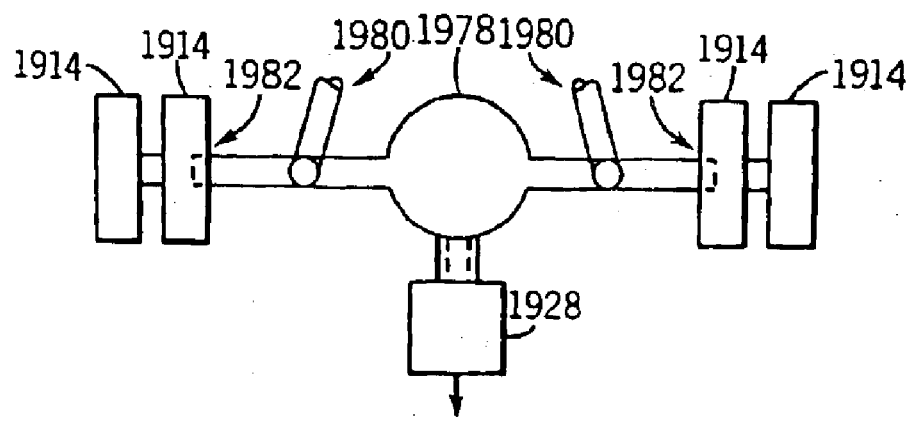
FIG. 19A is a top plan view illustration of an exemplary embodiment of a differential assembly coupled to an electric motor for driving at least two wheels and supported by a suspension assembly.
Figure 19B:
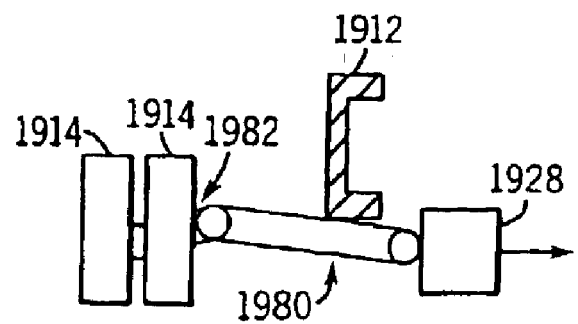
FIG. 19B is an end view partial sectional view of an exemplary embodiment of an electric traction vehicle support structure coupled to a suspension assembly which suspends at least one wheel relative to the vehicle support structure.

FIG. 13 illustrates the wheels 1914 being driven directly by an electric motor 1928 through an appropriate wheel-end reduction assembly 1982 if necessary. Referring now to FIGS. 19A–19B, a wheel-end reduction assembly 1982 can also couple the wheels 1914 to a differential assembly 1978 via drive shafts. A plurality of wheel-end reduction assemblies 1982 can couple the wheels 1914 to their respective electric motors 1928. Another embodiment of the vehicle 1910 includes a differential assembly 1978 coupled to the electric motor 1928 for driving at least two wheels 1914 as shown in FIG. 15. Additional differential assemblies 1978, such as three assemblies 1978, with each differential assembly coupled to an electric motor 1928 for driving at least two wheels, can also be configured in the vehicle 1910.

Figure 21:
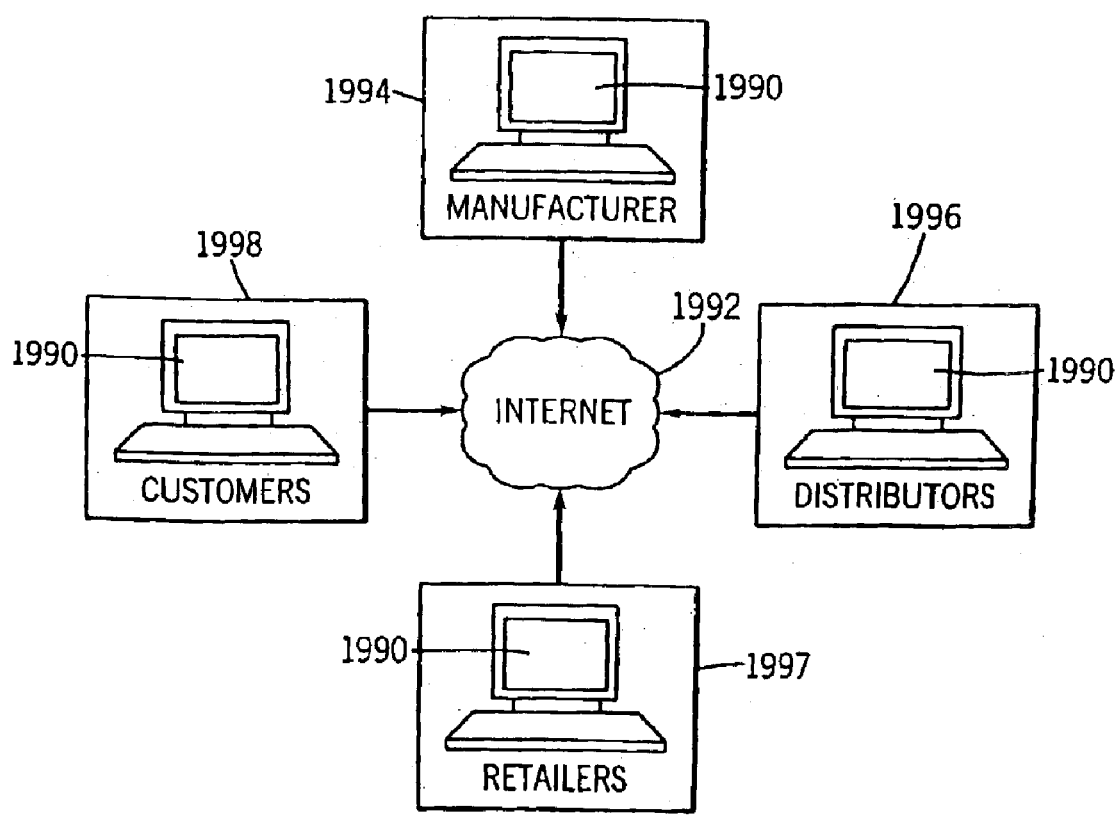
FIG. 21 is a schematic block diagram illustrating various entities connected to the Internet for the transmission of data indicative of an electric traction vehicle.

Referring now to FIG. 21, a method of transferring data indicative of an electric traction vehicle 1910 to potential customers over the Internet 1992 includes obtaining information on an electric traction vehicle 1910 including dates, prices, shipping times, shipping locations, general shipping data, module type, inventory, specification information, graphics, source data, trademarks, certification marks and combinations thereof. The method further includes entering the information on to a terminal 1990 that is operationally connected to an Internet server. Terminal 1990 may be microprocessor, a computer, or other conventionally known device capable of operationally connecting to a conventionally known Internet server. The method further includes transmitting to the information from terminal 1990 to the Internet server that is operationally connected to Internet 1992. Information be transmitted to the internet from the interface modules 1934 and may include any of the information stored in the interface modules 1934 or any other vehicle computer, as previously noted. The method allows manufacturers 1994, distributors 1996, retailers 1997 and customers 1998, throughout the use of terminals 1990, to transmit information, regarding the electric traction vehicle 1910 and the potential sale of the electric traction vehicle 1910 to customers, to one another individually, collectively or by any combination thereof.

Thus, there is provided an electric traction vehicle of modular design with the modules interconnected by an AC bus assembly and a data bus network. Other embodiments using other types of vehicles are possible. For example, an electric traction vehicle using a modular component design can be utilized as a fire truck for use at an airport or one that can negotiate severe off-road terrain. The vehicle can also be used in a military configuration with the ability to negotiate extreme side slopes and negotiate extreme maneuvers at high speeds. The modular aspect of the vehicle architecture will allow for optimum placement of components to maximize performance with regard to center of gravity which will facilitate its operational capabilities.

D. Network Assisted Monitoring, Service, and Repair

Figure 22:
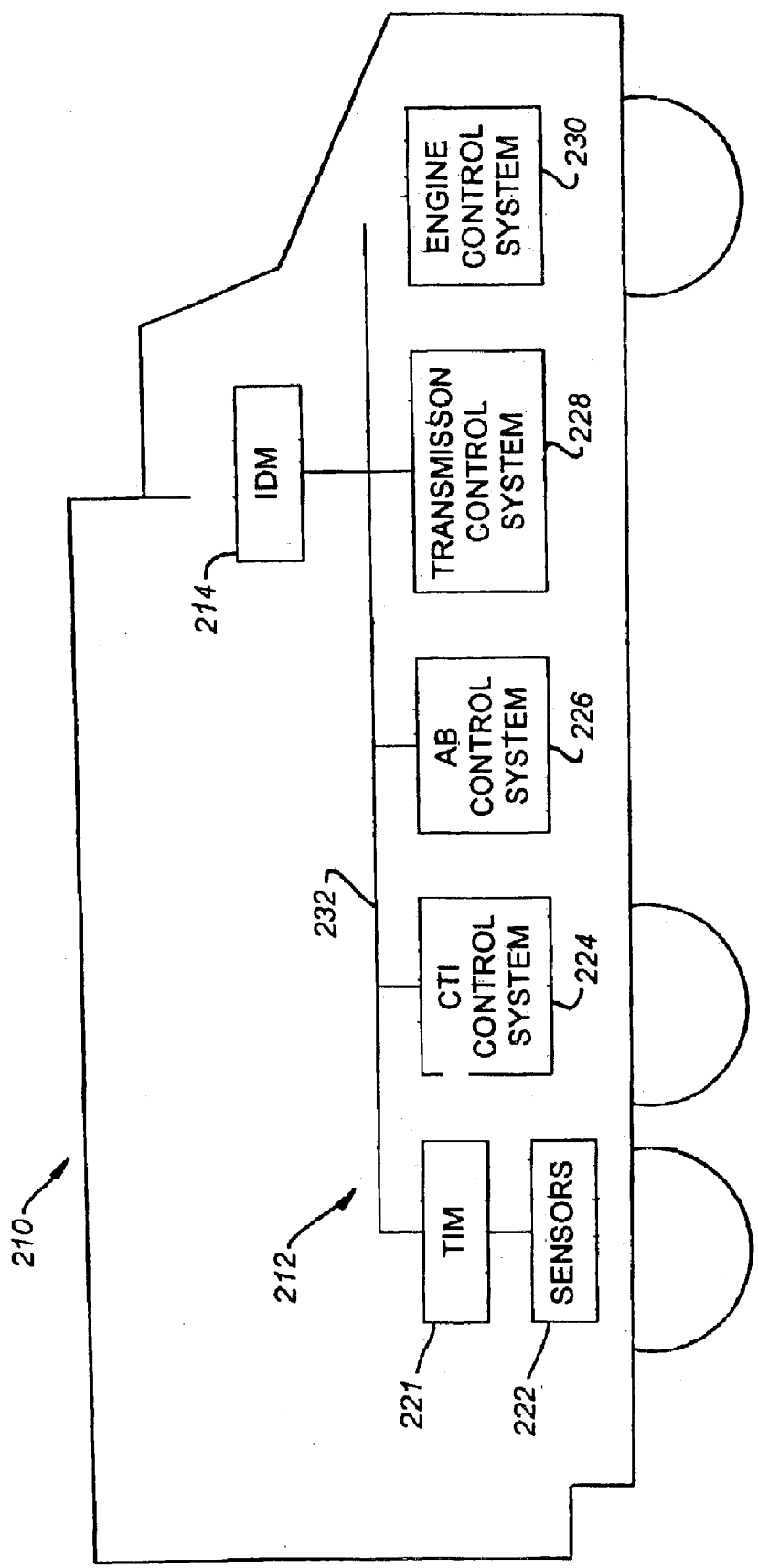
FIG. 22 is a schematic view of a military vehicle having a diagnostic system according to one embodiment of the present invention.

Referring now to FIG. 22, a preferred embodiment of an equipment service vehicle 210 having a diagnostic system 212 according to an embodiment of the invention is illustrated. By way of overview, the diagnostic system 212 comprises an intelligent display module 214, a test interface module 221 connected to a plurality of sensors 222, and a plurality of additional vehicle control systems 224–230. The intelligent display module 214, the test interface module 221, and the plurality of additional vehicle control systems 224–230 are interconnected with each other by way of a communication network 232.

More specifically, the vehicle 210 is a military vehicle and, in particular, a medium tactical vehicle. However, it should be understood that the diagnostic system 212 of FIG. 22 could also be used with other types of military vehicles. For example, the diagnostic system 212 could be used in connection with heavy equipment transporter vehicles, which are used to transport battle tanks, fighting and recovery vehicles, self-propelled howitzers, construction equipment and other types of equipment. These types of vehicles are useable on primary, secondary, and unimproved roads and trails, and are able to transport in excess of 100,000 pounds or even in the range of 200,000 pounds or more. The diagnostic system 212 can also be used in connection with palletized load transport vehicles, in which a mobile truck and trailer form a self-contained system capable of loading and unloading a wide range of cargo without the need for forklifts or other material handling equipment. Such trucks are provided with a demountable cargo bed and a hydraulically powered arm with a hook that lifts the cargo bed on or off the truck. These trucks may be also provided with a crane to drop off the pallets individually if the entire load is not needed. Further, the diagnostic system 212 can also be used in connection with trucks designed for carrying payloads for cross country military missions. Such trucks may include, for example, cargo trucks, tractors, fuel servicing trucks, portable water trucks, and recovery vehicles (with crane and winch). Such trucks are capable of passing through water crossings three or four or more feet deep. These trucks can also be used for missile transports/launchers, resupply of fueled artillery ammunition and forward area rearm vehicles, refueling of tracked and wheeled vehicles and helicopters, and recovery of disabled wheeled and tracked vehicles. The diagnostic system 212 can be used in connection with a wide range of other military vehicles as well.

The intelligent display module 214 provides an operator interface to the diagnostic system 212 and also provides intelligence used to conduct diagnostic tests and other services. In particular, the intelligent display module 214 includes a test control module 215 (which further includes a microprocessor 216 and a diagnostic program 217) and an operator interface 218 (which further includes a display 219 and a keypad 220) (see FIG. 23).

In the preferred embodiment, the test control module 215 and the operator interface 218 are provided as a single, integrated unit (namely, the intelligent display module 214) and share the same housing as well as at least some of the internal electronics. Other arrangements are possible, however. For example, as can be easily imagined, it would also be possible to provide the test control module 215 and the operator interface 218 in the form of separate physical units, although this arrangement is not preferred for reasons of increased cost and parts count. Both the test control module 215 and the operator interface 218 can be obtained in the form of a single, integrated unit from Advanced Technology, Inc., Elkhart, Ind. 46517. This product provides a generic flat panel 4 line×20 character display 219, four button keypad 220, microprocessor 216, and memory that is capable of being programmed with a program (such as the diagnostic program 217) to customize the intelligent display module for a particular application. Of course, a more (or less) elaborate intelligent display module could also be utilized. For example, if on-line parts ordering capability is incorporated as detailed below, then a display module with an SVGA flat touch screen monitor with a microprocessor and memory may be preferred. Also, the test control module 215 may be implemented using one of the interface modules 20, 30, 1420 previously described, providing that the interface module has sufficient graphics capability to drive a display.

Also in the preferred embodiment, the intelligent display module 214 is semi-permanently mounted within the vehicle 210. By semi-permanently mounted, it is meant that the intelligent display module 214 is mounted within the vehicle 210 in a manner that is sufficiently rugged to withstand normal operation of the vehicle for extended periods of time (at least days or weeks) and still remain operational. However, that is not to say that the intelligent display module 214 is mounted such that it can never be removed (e.g., for servicing of the intelligent display module) without significantly degrading the structural integrity of the mounting structure employed to mount the intelligent display module 214 to the remainder of the vehicle 210. The intelligent display module 214 is preferably mounted in an operator compartment of the vehicle 210, for example, in a storage compartment within the operator compartment or on an operator panel provided on the dashboard.

The operation of the test control module 215, and in particular of the microprocessor 216 to execute the diagnostic program 217, is shown and described in greater detail below in conjunction with the flowchart of FIG. 25. In general, the microprocessor 216 executes the diagnostic program 217 to diagnose subsystem faults, to display fault information, to maintain vehicle maintenance records, and to perform data logging for system diagnosis and/or for accident reconstruction. Depending on the application, it may be desirable to incorporate additional services as well, or to incorporate fewer than all of these services.

The operator interface 218 includes the display 219 which is used to communicate (and, in particular, to display) information to the operator. For example, the display 219 is used to prompt the operator to enter information into the keypad 220, or to take certain actions with respect to the vehicle during testing (e.g., bring the engine to a specified RPM level). The display 219 is also used to display a menu or series of menus to allow the operator to select a test to be performed or to select another service of the intelligent display module 214 to be utilized. The display 219 is also used to display status information during system startup and during testing, and to display any error messages that arise during system startup or during testing. The display 219 is also used to display input data and fault mode indicators from control systems 224–230, and any other information from additional vehicle subsystems. The display 219 is also used to display information from discrete sensors such as the sensors 222. The display 219 is also used to display the results of diagnostic tests that are performed (e.g., a pass/fail message or other message).

Preferably, the display 219 displays all of this information to the operator in a user-friendly format as opposed to in the form of codes that must be interpreted by reference to a separate test or service manual. This is achieved in straightforward fashion by storing in the memory of the intelligent display module 214 information of the type commonly published in such manuals to facilitate manual interpretation of such codes, and using this information to perform the translation automatically. Likewise, as previously noted, the display 219 is used to prompt the operator to take certain actions with respect to the vehicle during testing and to otherwise step the operator through any test procedures, without reference to a test manual. This allows the amount of operator training to be reduced.

The operator interface 218 also includes the keypad 220 which is used to accept or receive operator inputs. For example, the keypad 220 is used to allow the user to scroll through and otherwise navigate menus displayed by the display 219 (e.g., menus of possible tests to be performed on the vehicle 210), and to select menu items from those menus.

As previously noted, it would also be possible to utilize a more elaborate intelligent display module. For example, a more elaborate keypad 220 could be utilized if more data entry capability is desired. In this regard, however, it is noted that the intelligent display module 214 also preferably includes a communication port that allows the display module to communicate with a personal computer 233 by way of a communication network 232 (see FIG. 23). The personal computer 233 can be used to retrieve, manipulate and examine data stored within the intelligent display module 214. For example, if the intelligent display module 214 includes a data logger as described below, the personal computer can be used to retrieve and examine the information stored by the data logger. Likewise, if the intelligent display module 214 implements a vehicle maintenance jacket, the personal computer 233 can be used to retrieve and modify data stored in the vehicle maintenance jacket. Further, using the personal computer 233, it is possible to integrate the diagnostic system 212 with an interactive electronic technical manual (IETM), to allow the interactive electronic technical manual to access the data available from the diagnostic system 212.

The test interface module 221 accepts requests from the intelligent display module 214 for information from the sensors 222, retrieves the requested information from the respective sensor 222, converts input signals from the respective sensor 222 into a format that is compatible with the communication network 232, and transmits the information from the respective sensor 222 to the intelligent display module 214 via the communication network 232. The test interface module 221 is therefore implemented as a passive unit with no standard broadcasts that burden the communication network 232. As a result, in operation, the test interface module 221 does not regularly transmit data on the communication network 232. Rather, the test interface module 221 passively monitors the communication network 232 for information requests directed to the interface module 221. When an information request is received, the test interface module 221 obtains the requested information from the relevant sensor 222, and then transmits the requested information on the communication network 232 to the intelligent display module 214. Alternatively, in accordance with the arrangement described in FIGS. 9–12, it may be desirable to implement the test interface module 221 as an active unit that broadcasts input status information in the same manner as the interface modules 1420.

The test interface module 221 may, for example, include as many inputs as there are sensors 222. Each input may include associated switches for configuring the input, an analog-to-digital converter to convert analog signals to a digital format, and any other signal processing circuitry. The number of inputs is not important, since it is possible to use fewer test interface modules each with a larger number of inputs, or more test interface modules each with a smaller number of inputs. The number of inputs is not limited in any particular way and is determined by need.

In practice, the test interface module 221 may be a commercially available unit capable of putting information from discrete sensors onto a communication network such as SAE (Society of Automotive Engineers) J1708. The test interface module 221 preferably also meets applicable standards for underhood installation, such as SAE J1455, to allow the test interface module to be located in close proximity to the sensors 222 to reduce wiring. The test interface module may, for example, be obtained from Advanced Technology Inc., Elkhart, Ind. 46517 (PN 3246282). Again, however, a wide range of devices of varying construction and complexity could be utilized to implement the test interface module 221.

Figure 23:
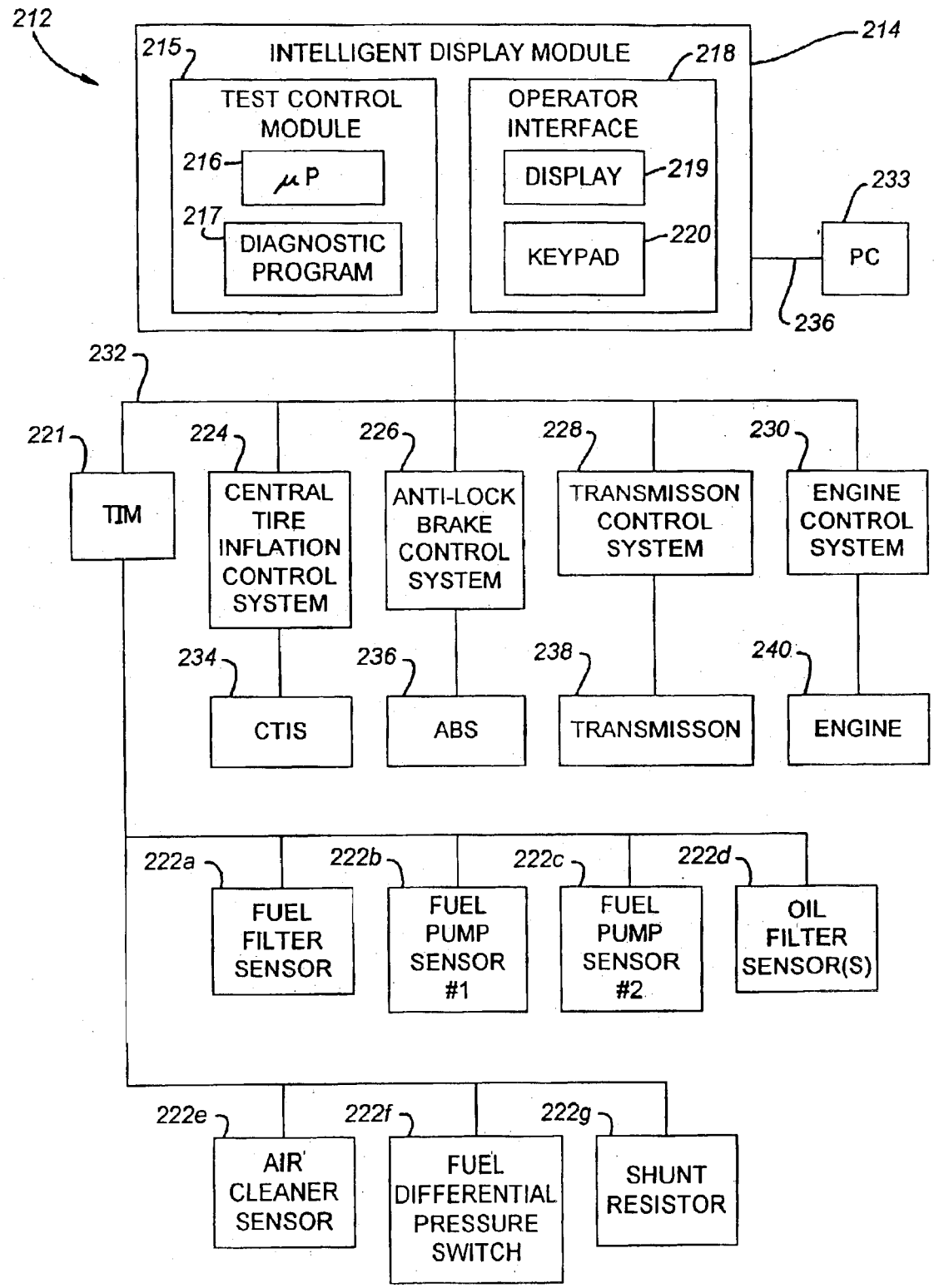
FIG. 23 is a block diagram of the diagnostic system of FIG. 22 showing selected aspects of the diagnostic system in greater detail.

The test interface module 221 is connected to the plurality of sensors 222 which are each capable of obtaining information pertaining to the health and operation of a vehicle subsystem. "Health" and "operation" are interrelated and information that pertains to one will, at least to some extent, pertain to the other as well. The sensors 222 are discrete sensors in the sense that they are not integrally provided with the control systems 224–230 and associated controlled mechanical systems (e.g., engine, transmission, and so on) 234–240. The sensors are add-on devices that are used only in connection with the intelligent display module 214. In general, discrete sensors are preferably only used when the information provided by the sensor is not otherwise available on the communication network 232. In FIG. 23, the sensors 222 are shown to include a fuel filter inlet pressure sensor 222a, fuel pump outlet pressure sensor 222b, fuel return pressure sensor 222c, oil filter sensors 222d, an air cleaner pressure sensor 222e, a fuel differential pressure switch 222f, and a shunt resistor 222g (used to determine compression imbalance based on unequal current peaks in the starter current).

In addition to the intelligent display module 214 and the test interface module 221, the diagnostic system 212 also includes a plurality of additional vehicle control systems 224–230, as previously noted. As shown in FIG. 23, the control system 240 is a central tire inflation control system that controls a central tire inflation system (CTIS) 34, the control system 226 is an anti-lock brake control system that controls an anti-lock brake system (ABS) 236, the control system 228 is a transmission control system that controls a transmission 238, and the control system 230 is an engine control system that controls an engine 240. The vehicle subsystems formed by the mechanical systems 234–240 and associated control systems 224–230 are conventional and are chosen in accordance with the intended use of the vehicle 210.

The control systems 224–230 each store information pertaining to the health and operation of a respective controlled system. The control systems 224–230 are capable of being queried and, in response, making the requested information available on the communication network 232. Because the vast amount of information required for performing most diagnostic tests of interest is available from the control systems 224–230 by way of the communication network 232, it is possible to drastically reduce the number of discrete sensors 222 that are required. Thus, as just noted, discrete sensors are preferably only used when the information provided by the sensor is not otherwise available on the communication network 232.

Typically, each of the control systems 224–230 comprises a microprocessor-based electronic control unit (ECU) that is connected to the communication network 232. When the intelligent display module 214 requires status information pertaining to one of the mechanical systems 234–240, the intelligent display module 214 issues a request for the information to the respective one of the control systems 224–230. The respective control system then responds by making the requested information available on the communication network 232.

Typical ECUs for transmission and engine control systems are capable of producing fault codes and transmitting the fault codes on the communication network 232. Depending on the type of fault, the fault codes may be transmitted automatically or alternative only in response to a specific request for fault information. Typical ECUs for central tire inflation systems and anti-lock brake systems also transmit fault codes but, in most commercially available systems, fault codes are transmitted only in response to specific requests for fault information. When a fault code is transmitted on the communication network 232, the intelligent display module 214 receives the fault codes from the communication network 232, interprets the fault codes, and displays the interpreted fault codes to a human operator using the display 219.

It may be noted that the diagnostic system 212 may be implemented as a stand-alone system or in the context of the control systems 12 and 1412 described in connection with FIGS. 1–12. For example, in the context of the control system 1412, the communication network 232 and the communication network 1460 may be the same network, such that the intelligent display module 214 and the test interface module 221 are disposed on the communication network 1460 along with the interface modules 1420. When combined in this manner, the anti-lock brake control system 226 and anti-lock brake control system 1495 are in practice the same devices, as are the transmission control system 228 and the transmission control system 1493, and the engine control system 230 and the engine control system 1491, and also as are the respective controlled subsystems. The intelligent display module 214 maintains a dynamically updated I/O status table 1520 by listening to the I/O status broadcasts made by the interface modules 1420 and the control systems 224–230, as described in connection with FIGS. 9–12. This makes it possible to connect the sensors 222 to the communication network 232 by way of one or more of the interface modules 1420 rather than through the use of a separate dedicated test interface module, and making it possible to eliminate redundant sensors. A further advantage of this arrangement is that the intelligent display module 214 has access to all of the I/O status information provided by the interface modules 1420.

Figure 24:
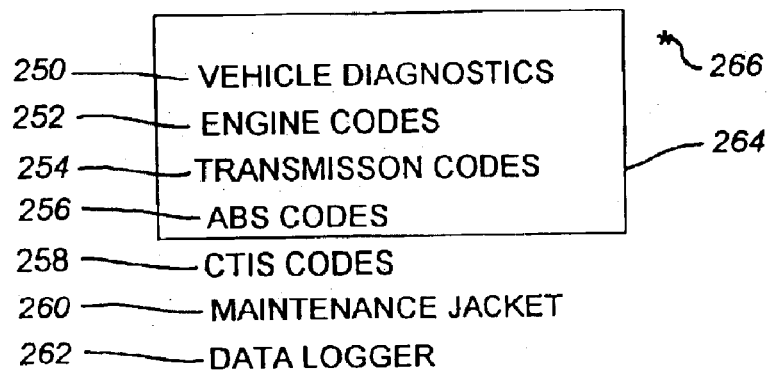
FIG. 24 is a menu displayed by a display of the diagnostic system of FIG. 22 showing various services offered by the diagnostic system.

Referring now to FIG. 24, in general, during operation, the display 219 displays menus to the operator and the keypad receives operator inputs used to navigate the menu, make menu selections, and begin testing. Assuming other services are also provided, the operator is first prompted to select an option from among a list of options that includes options of other services provided by the intelligent display module 214. The list of options may include, for example, an option 250 to perform vehicle diagnostic testing, an option 252 to view engine codes, an option 254 to view transmission codes, an option 256 to view ABS codes, an option 258 to view CTIS codes, an option 260 to view and/or modify data in the vehicle maintenance jacket, and an option 262 to view information stored in a data logger. Given that the display 219 is a four line display in the preferred embodiment, a vertically sliding winding 264 is used to scroll through the options, and the user presses a select button on the keypad 220 when a cursor 266 is positioned on the desired option. As previously noted, other options may also be provided.

Figure 25:
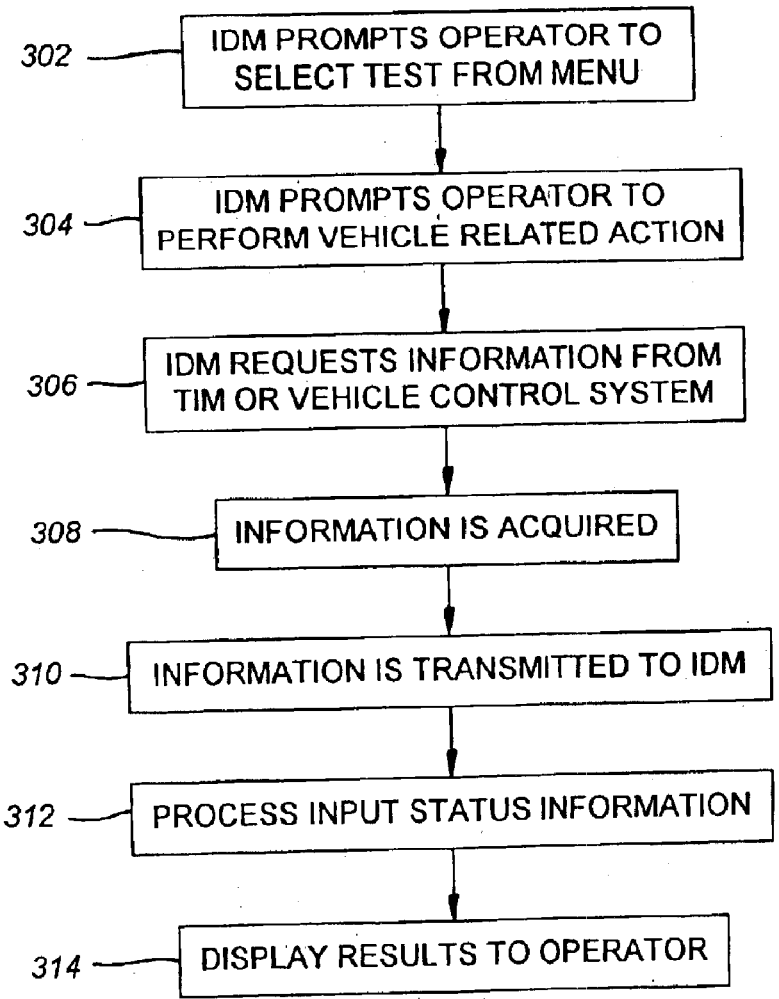
FIG. 25 is a flow chart showing the operation of the diagnostic system of FIG. 22 to perform a diagnostic test procedure.

Referring now to FIG. 25, a flowchart showing the operation of the diagnostic system of FIGS. 22–23 to perform a diagnostic test is illustrated. In connection with military vehicles, the diagnostic system 212 may for example be made capable of performing the following diagnostic tests, all of which provide information pertaining to the health and operation of the tested subsystem:

| Test | Test Description and Application | Exemplary Measurement Range(s) |
| --- | --- | --- |
| | ENGINE TESTS | |
| Engine RPM (AVE) | Measures average speed of engine crankshaft. | 50–5000 RPM |
| Engine RPM, Cranking SI only | Measures cranking RPM. Performed with ignition ON. Inhibit spark plug firing allowing cranking without starting. | 50–1500 RPM |
| Power Test (RPM/SEC) | Measures engine's power producing potential in units of RPM/SEC. Used when programmed engine constants and corresponding Vehicle Identification Number (VID) have not been established. | 500–3500 RPM/s |
| Power Test (% Power) | Measures percentage of engine's power producing potential compared to full power of a new engine. | 0–100% |
| Compression Unbalance (%) | Evaluates relative cylinder compression and displays percent difference between the highest and the lowest compression values in an engine cycle. | 0–90% |

-continued

| Test | Test Description and Application | Exemplary Measurement Range(s) |
|---|---|---|
| IGNITION TESTS | | |
| Dwell Angle (TDC) | Measures number of degrees that the points are closed. | 10–72 @ 2000 RPM |
| Points Voltage (VDC) | Measures voltage drop across the points (points positive to battery return). | 0–2 VDC |
| Coil Primary | Measures voltage available at the coil positive terminal of the operating condition of the coil. | 0–32 VDC |
| FUEL/AIR SYSTEM TESTS | | |
| Fuel Supply Pressure (psi) | | 0–100 psi |
| Fuel Supply Pressure (psi) | This test measures the outlet pressure of the fuel pump. | 0–10 psi<br>0–30 psi<br>0–100 psi<br>0–300 psi |
| Fuel Return Pressure (psi) | Measures return pressure to detect return line blockage, leaks, or insufficient restrictor back pressure. | 0–100 psi |
| Fuel Filter Pressure Drop (PASS/FAIL) | Detects clogging via opening of a differential pressure switch across the secondary fuel filter. | PASS/FAIL |
| Fuel Solenoid Voltage (VDC) | Measures the voltage present at the fuel shutoff solenoid positive terminal. | 0–32 VDC |
| Air Cleaner Pressure Drop (RIGHT) (In H₂O) | Measures suction vacuum in air intake after the air cleaner relative to ambient air pressure to detect extent of air cleaner clogging. | 0–60 in. H₂O |
| Air Cleaner Pressure Drop (LEFT) (In H₂O) | Second air cleaner on dual intake systems. | 0–60 in. H₂O |
| Turbocharger Outlet Pressure (RIGHT) (In Hg) | Measures discharge pressure of the turbocharger. | 0–50 in. Hg |
| Turbocharger Outlet Pressure (LEFT) (In Hg) | Second turbocharger on dual intake systems. | 0–50 in. Hg |
| Airbox Pressure (In Hg) | Measures the airbox pressure of two stroke engines. This measurement is useful in detecting air induction path obstructions or leaks. | 0–20 in. Hg<br>0–50 in. Hg |
| Intake Manifold Vacuum (In Hg) | Spark ignition engine intake system evaluation. | 0–30 in. Hg |
| Intake Manifold Vacuum Variation (In Hg) | Spark ignition engine intake system evaluation. | 0–30 in. Hg |
| LUBRICATION/COOLING SYSTEM TESTS | | |
| Engine Oil Pressure (psi) | Measures engine oil pressure. | 0–100 psi |
| Engine Oil Filter | Measures the pressure drop across the engine oil filter as | 0–25 psi |

| Test | Test Description and Application | Exemplary Measurement Range(s) |
|---|---|---|
| | indicator of filter element clogging. | |
| Engine Oil Temperature (° F.) | Primarily applicable to air cooled engines. Requires transducer output shorting switch on vehicle to perform system zero offset test. | 120–300° F. |
| Engine Coolant Temperature (° F.) | Transducer output shorting switch on vehicle required. | 120–300° F. |
| STARTING/CHARGING SYSTEM TESTS | | |
| Battery Voltage (VDC) | Measure battery voltage at or near battery terminals. | 0–32 VDC |
| Starter Motor Voltage (VDC) | Measures the voltage present at the starter motor positive terminal. | 0–32 VDC |
| Starter Negative Cable Voltage Drop (VDC) | Measures voltage drop on starter path. A high voltage indicates excessive ground path resistance. | 0–2 VDC |
| Starter Solenoid Volts (VDC) | Measures voltage present at the starter solenoid's positive terminal. Measures current through battery ground path shunt. | 0–32 VDC |
| Starter Current, Average (amps) | Measures starter current. | 0–1000 A<br>0–2000 A |
| Starter Current First Peak (Peak Amps, DC) | Provides a good overall assessment of complete starting system. Tests condition of the starting circuit and battery's ability to deliver starting current. The measurement is made at the moment the starter is engaged and prior to armature movement. Peak currents less than nominal indicate relatively high resistance caused by poor connections, faulty wiring, or low battery voltage. | 0–1000 A<br>0–2000 A |
| Battery Internal Resistance (Milliohms) | Evaluate battery condition by measuring battery voltage and current simultaneously. | 0–999.9 mohm |
| Starter Circuit Resistance (Milliohms) | Measures the combined resistance of the starter circuit internal to the batteries. | 0–999.9 mohm |
| Battery Resistance Change (Milliohms/sec) | Measures rate of change of battery resistance as an indicator of battery condition. | 0–999.9 mohm/s |
| Battery Current | Measures current to or from the battery. | −999–1000 A<br>−999–2000 A |
| Battery Electrolyte Level (PASS/FAIL) | Determines whether electrolyte in the sensed cell is of sufficient level (i.e., in contact with electrolyte probe). | PASS/FAIL |
| Alternator/Generator Output Voltage (VDC) | Measures output voltage of generator/alternator. | 0–32 VDC |
| Alternator/Generator Field Voltage (VDC) | Measures voltage present at alternator/generator field windings. | 0–32 VDC |
| Alternator/Generator Negative Cable Voltage Drop (VDC) | Measures voltage drop in ground cable and connection between alternator/generator ground terminal and battery negative terminal. | 0–2 VDC |
| Alternator Output Current Sense (VAC-RMS) | Measures voltage output at the current transformer in 650 ampere alternator. | 0–3 VAC |
| Alternator AC Voltage Sense (VAC-RMS) | Measures alternator output voltage. | 0–22 VAC |

In general, the specific diagnostic tests that are performed will be selected depending on the application, including the type of equipment utilized by the vehicle 210. Most or all tests may be simple in nature from a data acquisition standpoint, involving primarily bringing the vehicle to a particular operating condition (e.g., engine speed), if necessary, and obtaining information from a suitable transducer constructed and placed to measure the parameter of interest, although more elaborate tests could also be utilized. Any number of different vehicle parameters can be measured, each providing a separate data point regarding the operational health of the vehicle. By providing an operator with enough data points regarding the operational health of the vehicle, the operator can use this information in a known way to determine whether the vehicle is in good working order, or whether some subsystem or component thereof needs to be repaired or replaced.

At step 302, once the vehicle diagnostic option is selected, the display 219 displays a menu of various tests that are available to the operator, and the operator is prompted to select a test from the test menu. Again, the list of options may comprise dozens of options, such as some or all of those listed above, and/or tests other than those listed above, and the operator can scroll through the menu and selected the desired option.

At Step 304, the operator is prompted to perform a vehicle related action. This step, which may or may not be necessary depending on the type of test performed, may be used to prompt the operator to start the engine to develop fuel pressure, oil pressure, and so on, depending on which vehicle parameter is tested. For example, if it is desired to test the operational health of the battery, then the operator may be prompted to engage the starter for a predetermined amount of time to establish a current draw on the battery.

At Step 306, the intelligent display module 214 issues a request for information from the test interface module 221 and/or from one or more of the control systems 224–230. As previously noted, the test interface module 221 does not continually broadcast information on the communication network 232, because the sensors 222 connected to the test interface module are used only for diagnostic testing and because presumably diagnostic testing will be performed only infrequently. Therefore, when the intelligent display module 214 needs information from one of the sensors 222 pursuant to a test requested to be performed by the operator at the operator interface 218, the intelligent display module 214 requests the test interface module 221 for this information.

Alternatively, the needed information may be of a type that is available from one of the control systems 224–230. The control systems 224–230 are not only able to acquire information from sensors located within the systems 234–240, but are also able to maintain information derived from sensors located within the systems 234–240. For example, the engine control system 230 may maintain information pertaining to the average RPM of the engine, which is a parameter that is not directly measurable but that can be easily calculated based on parameters that are directly measurable. Through the communication network 232, all of this information is made available to the diagnostic system 212. When the intelligent display module 214 needs information from one of the control systems 224–230 pursuant to a test requested to be performed by the operator at the operator interface 218, the intelligent display module 214 requests the respective control system for this information.

At Step 308, the requested information is retrieved from one of the sensors 222 by the test interface module 221, or from memory or an internal sensor by the respective control system 224–230. At step 309, the information is transmitted from the test interface module 221 or from one of the control systems 224–230 to the intelligent display module 214 by way of the communication network 232.

Alternatively, the needed information may be of a type that is available from one of the interface modules 1420. In this case, the information is readily available in the I/O status table 1520 maintained by the intelligent display module 214, without there being a need to specifically request the information.

At step 312, the input status information is processed at the intelligent display module 214. For example, if fuel supply pressure is measured by one of the sensors 222, then the measured fuel supply pressure may be compared with upper and lower benchmark values to determine whether the fuel pressure is at an acceptable level, or whether it is too high or too low. Finally, at step 314, the results of the test are displayed to the operator.

As has been previously noted, in addition to performing diagnostic tests, the intelligent display module 214 can also be used to provide other services to an operator. For example, the intelligent display module 214 can be used to allow the operator to view engine codes, to view transmission codes, to view ABS codes, and to view CTIS codes. In practice, these services can be implemented simply by allowing acquiring the respective codes from the respective control system 224–230, and displaying the codes to the operator. Additionally, the control systems 224–230 may automatically transmit fault information on the communication network 232, and the intelligent display module 214 can listen for such fault information and display the fault information to the user when it appears on the communication network 232.

The intelligent display module 214 also includes sufficient memory to allow maintenance information to be stored therein to implement maintenance jacket functionality. The maintenance log may consist of a table comprising a variety of fields, such as registration numbers, chassis serial number, vehicle codes, and dates and descriptions of maintenance actions performed. This information may be retrieved and manipulated utilizing the computer 234 when the vehicle 210 is taken to a maintenance depot. If the computer 234 is provided with an interactive electronic technical manual (IETM) for the vehicle 210, this allows the IETM to have access to all of the diagnostic data acquired by the intelligent display module 214 as well as all of the maintenance data stored by the intelligent display module 214. This greatly enhances the ability to perform vehicle maintenance and diagnostics on the vehicle 210.

Additionally, sufficient memory capacity is preferably provided so that status information from the test interface module 221 as well as the control systems 224–230 can be sampled and stored at frequent, regular intervals in a circular data queue (i.e., with new data eventually replacing old data in the circular queue). This allows the intelligent display module 214 to provide a data logger service so that input data acquired over a period of time can be viewed to allow an assessment of dynamic conditions leading to a fault to be evaluated. Additionally, the vehicle is preferably provided with one more sensors that indicate whether a severe malfunction (e.g., the vehicle being involved in an accident) has occurred. When inputs from these sensors indicates that a severe malfunction has occurred, data logging is stopped, so that data leading up to the severe malfunction is stored in a manner similar to a so-called "black box recorder."

Referring now to FIGS. 26–29, as previously mentioned, the control systems 12 and 1412 can be used in connection with a variety of different types of equipment service vehicles. The same is true of the diagnostic system 212. FIGS. 26–29 show some of the vehicles that can employ the control systems 12 and 1412 and/or the diagnostic system 212.

Figure 26:
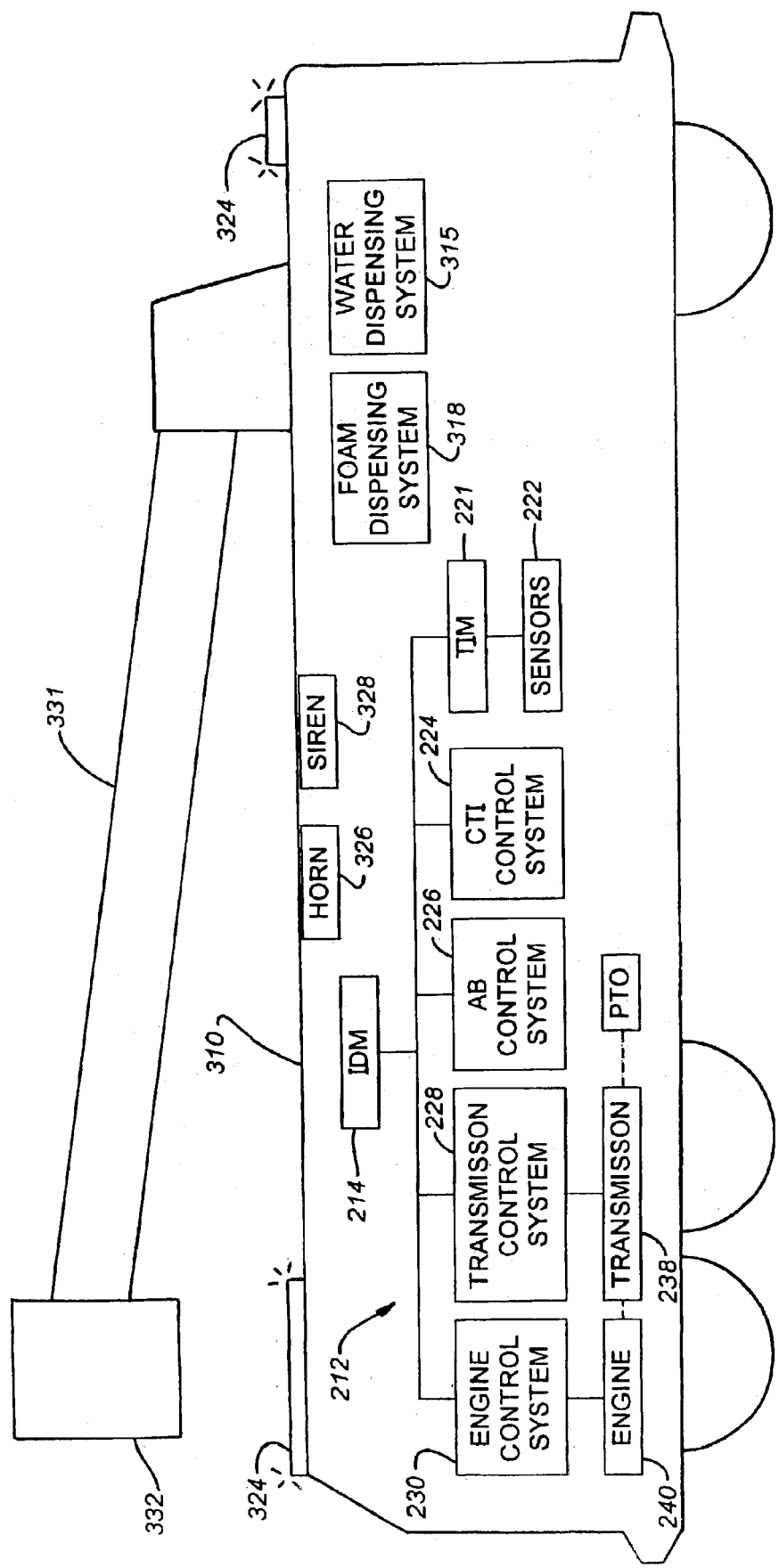
FIG. 26 is a schematic view of a firefighting vehicle having a diagnostic system in accordance with FIGS. 22–25.

Referring first to FIG. 26, FIG. 26 is a schematic view of a fire fighting vehicle 310 that utilizes the diagnostic system 212. The fire fighting vehicle 310 comprises a water dispensing system 315 including water hoses, pumps, control valves, and so on, used to direct water at the scene of a fire. The fire fighting vehicle 310 may also comprise a foam dispensing system 318 as an alternative fire extinguishing system. The fire fighting vehicle 310 also comprises emergency lighting 324, which may in practice be red and white or red, white and blue flashing lights, as well as an emergency horn 326 and an emergency siren 328 used, among other things, for alerting motorists to the presence of the fire fighting vehicle 310 in transit to or at the scene of a fire. The fire fighting vehicle 310 may also comprise an extendable aerial 331 that supports a basket 332 used to vertically carry fire fighting personnel to an emergency situation at the scene of a fire. The diagnostic system 212 may be used to diagnose vehicle malfunctions in the manner described above in connection with the vehicle 210, as well as to diagnose malfunctions of the specialized systems described above found on fire fighting vehicles. Of course, the features of the fire fighting vehicle 310 in FIG. 26 and the fire fighting vehicle 10 of FIGS. 1–2 (including the features pertaining to the I/O status table 1520 described in connection with FIGS. 9–12) may be combined.

Figure 27:
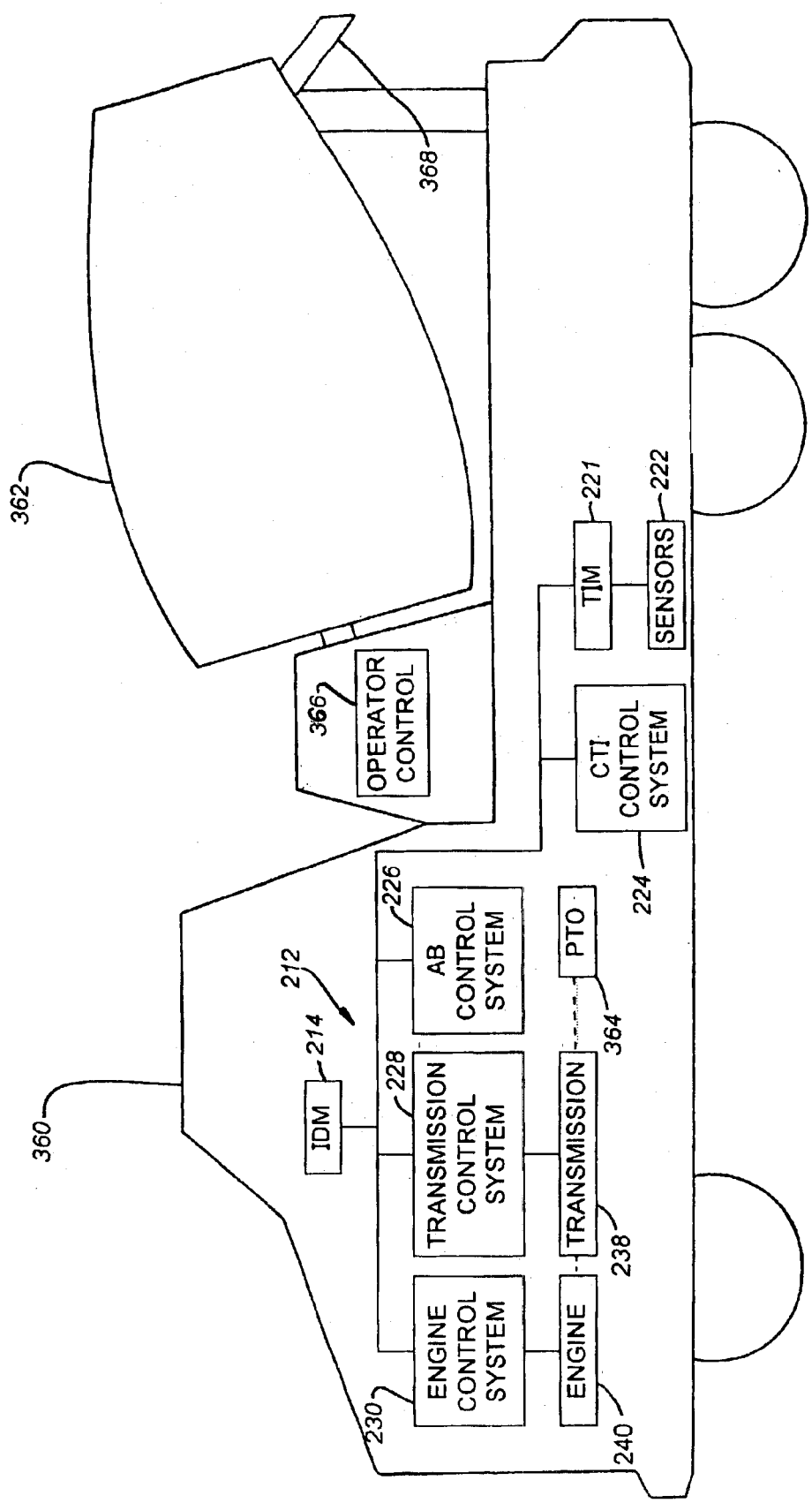
FIG. 27 is a schematic view of a mixing vehicle having a diagnostic system in accordance with FIGS. 22–25.

Referring now to FIG. 27, a schematic view of another type of equipment service vehicle 360 that utilizes the diagnostic system 212 of FIGS. 22–25 is shown. The equipment service vehicle 360 is a mixing vehicle such as a cement mixing vehicle. The mixing vehicle 360 comprises a rotatable mixing drum 362 that is driven by engine power from the engine 240 via a power takeoff mechanism 364. The mixing vehicle 360 also includes a dispenser or chute 368 that dispenses the mixed matter or material, for example, mixed cement. The chute 368 is moveable to allow the mixed cement to be placed at different locations. The chute 368 may swing from one side of the concrete mixing vehicle 360 to the other side. Rotation of the mixing drum 362 is controlled under operator control using an operator control panel 366 including chute and drum controls comprising one or more joysticks or input devices. Additional controls may be provided inside the operator compartment for driver or passenger control of the drum 362 and chute 368, for example, a dash-mounted control lever to control drum rotation direction, a console-mounted joystick to control external hydraulic valves for chute up/down and swing right/left. Drum rotation start/stop may be controlled using a switch on top of the joystick lever. Outside controls mounted may include chute up/down and swing right/left and remote engine throttle. Drum rotation direction controls may be mounted on right side of front fender. The diagnostic system 212 is used to diagnose vehicle malfunctions in the manner described above in connection with the vehicle 210, as well as to diagnose malfunctions of the specialized systems described above found on mixing vehicles.

The mixing vehicle 360 may also include the control system 1412 described above. In such an arrangement, for example, an interface module 1420 is located near the operator control panel 366 receiving operator inputs which the control system 1412 uses to control of the mixing drum 362. An additional interface module 1420 may also be provided in an operator compartment of the mixing vehicle 360 to interface with input devices inside the operator compartment which permit driver control of the mixing drum 362. Interface modules 1420 are also connected to output devices such as a drive mechanism that controls rotation of the mixing drum 362 and a drive mechanism that controls movement of the chute 368. For example, if drum and chute movement are driven by engine power from the engine 240 via a power takeoff mechanism 364, the interface modules 1420 may be used to control output devices 1450 in the form of electronically controlled hydraulic valves that control the flow of hydraulic power from the engine to the mixing drum and electronically controlled hydraulic valves that control the flow of hydraulic power from the engine to the chute. Alternatively, if electric drive motors are used to drive drum and chute movement (for example, in the context of a mixing vehicle implemented using the electric vehicle 1910 as described above), then the interface modules 1420 may be used to control the drive motors. In operation, inputs are received from the operator controls at one interface module 1420 may be transmitted to the interface modules 1420 that control the valves during I/O status broadcasts, which in turn control operation of the drum 362 and chute 368 based on the operator inputs. Other devices, such as air dryers, air compressors, and a large capacity (e.g., 150 gallon) water system may be connected to interface modules 1420 and controlled in accordance with operator inputs received from similar input devices at the operator panels and transmitted over the communication network. Additional interface modules 1420 may be used to receive inputs from input devices 1440 in the operator compartment and control output devices 1450 such as FMVSS lighting as described above.

Figure 28:
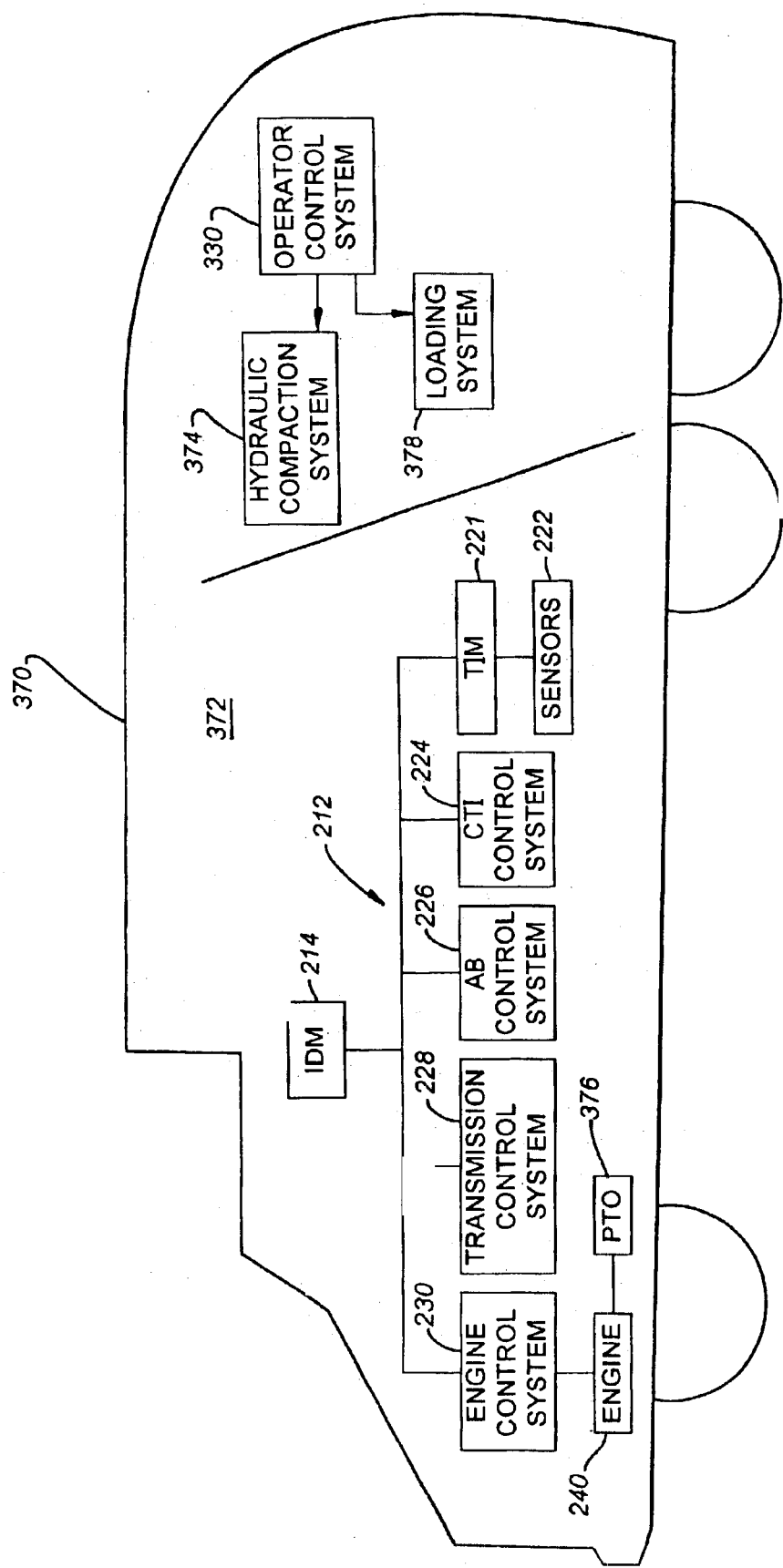
FIG. 28 is a schematic view of a refuse handling vehicle having a diagnostic system in accordance with FIGS. 22–25.

Referring now to FIG. 28, a schematic view of another type of equipment service vehicle 370 that utilizes the diagnostic system 212 of FIGS. 22–25 is shown. The equipment service vehicle 370 is a refuse handling vehicle and comprises one or more refuse compartments 372 for storing collected refuse and other materials such as goods for recycling. The refuse handling vehicle 370 also includes a hydraulic compactor 374 for compacting collected refuse. The hydraulic compactor 374 is driven by engine power from the engine 240 via a power takeoff mechanism 376. The refuse handling vehicle may also include an automatic loading or tipping system 378 for loading large refuse containers and for transferring the contents of the refuse containers into one of the compartments 372. The loading system 378 as well as the hydraulic compactor may controlled under operator control using a control panel 379. The diagnostic system 212 may be used to diagnose vehicle malfunctions in the manner described above in connection with the vehicle 210, as well as to diagnose malfunctions of the specialized systems described above found on refuse handling vehicles.

The refuse handling vehicle 370 may also include the control system 1412 described above. In such an arrangement, an interface module 1420 is located near the hydraulic compactor 374 and controls valves associated with the hydraulic compactor 374. Another interface module 1420 located adjacent the automatic loading or tipping system 378 controls hydraulic valves associated with the system 378. Again, the interface modules 1420 may be used to control the drive motors instead of hydraulic valves in the context of. Another interface module 1420 is located adjacent the operator control panel 379 and is connected to receive operator inputs from input devices 1440 which are part of the control panel 379. In operation, inputs are received from the operator controls at one interface module 1420 and are transmitted to the interface modules 1420 that control the hydraulic valves during I/O status broadcasts, which in turn control operation of the hydraulic compactor 374 and loading system 378 based on the operator inputs. Additional interface modules may be used to receive inputs from input devices 1440 in the operator compartment and control output devices 1450 such as FMVSS lighting as described above.

Figure 29:
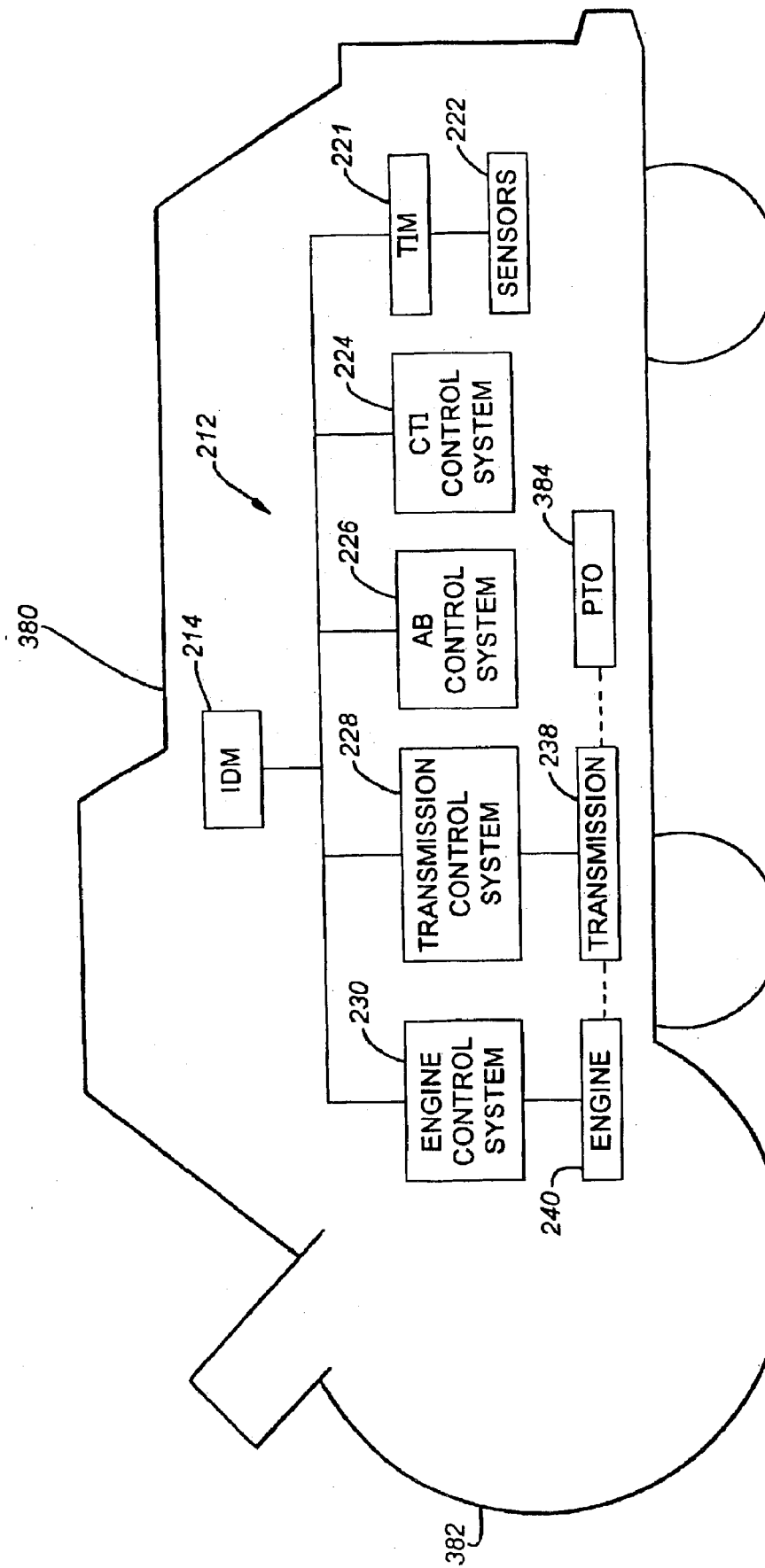
FIG. 29 is a schematic view of a snow removal vehicle having a diagnostic system in accordance with FIGS. 22–25.

Referring now to FIG. 29, a schematic view of another type of equipment service vehicle 380 that utilizes the diagnostic system 212 of FIGS. 22–25 is shown. The equipment service vehicle 380 is a snow removal vehicle and comprises a snow removal device 382 which may, for example, be a rotary blower, plow, or sweeper. The snow removal device 382 may be driven by engine power from the engine 240 via a power takeoff mechanism 384 to remove snow from a region near the snow removal vehicle 380 as the snow removal vehicle 380 is moving. The diagnostic system 212 may be used to diagnose vehicle malfunctions in the manner described above in connection with the vehicle 210, as well as to diagnose malfunctions of the specialized systems described above found on snow removal vehicles.

The snow removal vehicle 380 may also include the control system 1412 described above. An interface module 1420 located adjacent an operator compartment receives operator inputs from input devices 1440 located in the operator compartment. One or more additional interface modules 1420 receive the operator input during I/O status broadcasts, and in response controls various output devices 1450 such as FMVSS lighting as described above. Preferably, the snow removal vehicle 380 employs the teachings of U.S. Pat. No. 6,266,598, entitled "Control System and Method for a Snow Removal Vehicle," hereby expressly incorporated by reference. The preferred snow removal vehicle disclosed therein comprises an impeller, an engine system, and an engine control system. The engine system includes a traction engine which is coupled to drive wheels of the snow removal vehicle, and is adapted to drive the drive wheels to drive movement of the snow removal vehicle. The engine system also includes an impeller engine which is coupled to the impeller and is adapted to drive the impeller to drive snow removal. The engine control system receives feedback information pertaining to operation of the impeller, and controls the engine system based on the feedback information. The engine control system includes a communication network, a microprocessor-based traction engine control unit which is coupled to the traction engine and is adapted to control the traction engine, a microprocessor-based impeller engine control unit which is coupled to the impeller engine and is adapted to control the impeller engine, and a microprocessor-based system control unit. The system control unit is coupled to the traction engine control unit and the impeller engine control unit by way of the network communication link. The system control unit is adapted to receive the feedback information pertaining to the operation of the impeller, and to generate a control signal for the traction engine control unit based on the feedback information.

Advantageously, due to the utilization of a network architecture in the preferred embodiment, the diagnostic system is able to use sensors and other sources of information that are already provided on the vehicle, because it is able to interact with other vehicle control systems such as the engine control system, the anti-lock brake control system, the central tire inflation control system, and so on, via a communication network. The fact that the diagnostic system is connected to these other systems, which are all typically capable of providing a vast array of status information, puts this status information at the disposal of the diagnostic system.

Further, due to the utilization of an intelligent display module in the preferred embodiment, it is possible for the intelligent display module to be connected to the communication network and collect information as necessary for a variety of purposes. Thus, the preferred intelligent display module is microprocessor-based and is capable of executing firmware to provide additional functionality such as data logging, accident reconstruction, and a vehicle maintenance record. Again, this functionality can be achieved by taking advantage of the information available from the vehicle subsystems by way of the network architecture.

Moreover, by mounting the intelligent display module on board the vehicle in the preferred embodiment, for example, in an operator compartment, it is not necessary to bring the vehicle to a maintenance depot to have vehicle malfunctions diagnosed. The services offered by the intelligent display module are available wherever and whenever the vehicle is in operation.

Figure 30:
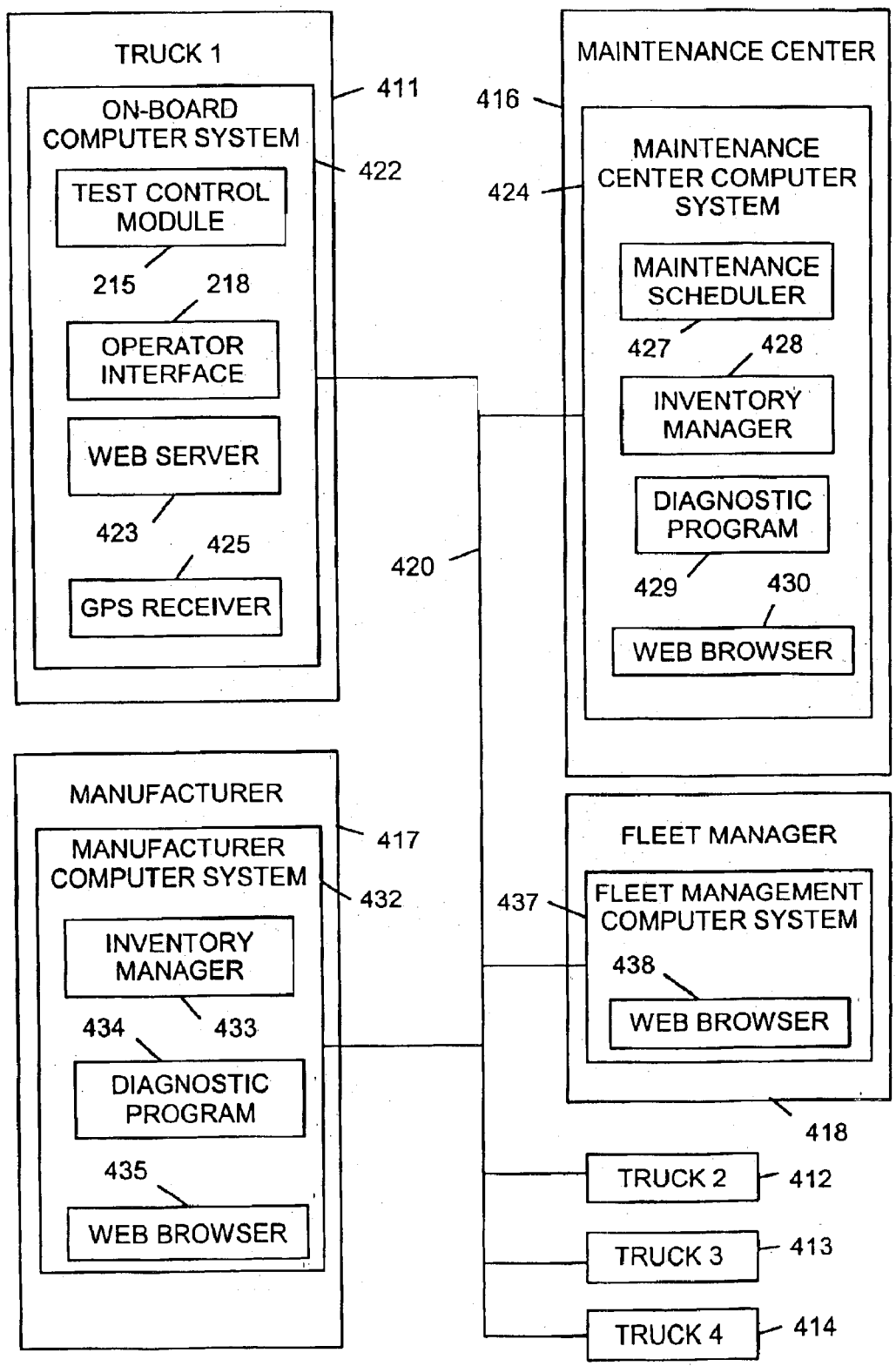
FIG. 30 is a schematic view of vehicle maintenance, monitoring, parts ordering, readiness assessment, and deployment system according to another embodiment of the present invention.

Referring now to FIG. 30, an overview of a system 410 that utilizes the diagnostic system 212 is illustrated. The system 410 interconnects the computing resources of a plurality of vehicles 411–414 with those of a maintenance center 416, a manufacturer facility 417, and a fleet manager 418 using a communication network 420. Of course, although four vehicles are shown, it is possible to use the system 410 in connection with fewer or additional vehicles. Also, although in the preferred embodiment the system 410 includes all of the devices shown in FIG. 30, it is also possible to construct a system that uses only some of the devices in FIG. 30.

The vehicles 411–414 are assumed to be military vehicles, although the vehicles could also be any of a variety of other types of vehicles including the other types of equipment service vehicles described herein (e.g., fire fighting vehicles, concrete transport and delivery vehicles, military vehicles, ambulances, refuse transport vehicles, liquid transport vehicles, snow removal vehicles, and so on). The vehicles 411 each have a control system 1412 as previously described, and therefore the on-board computer system 422 includes a plurality of interface modules 1420. The vehicles 411–414 each include an on-board computer system 422 which further includes the test control module 215 and the operator interface 218 previously described above in connection with FIGS. 22–29. The on-board computer system 422 also includes a web server program 423 and is coupled to a global positioning system (GPS) receiver 425. Although these features are discussed in connection with the vehicle 411 in FIG. 30, it should be noted that the vehicles 412–414 include these features as well (although the vehicles 411–414 need not all be the same type of vehicle).

The web server program 423, which is executed on the intelligent display module 214 or on another computer connected to the network 232, allows an operator using the maintenance center computer system 424, the manufacturer computer system 432 and/or the fleet management computer system 437 to access vehicle information. For example, the operator is given access to the information in the I/O status table 1520 maintained by the intelligent display module 214 using a web interface. Thus, the operator can click on depictions of individual input devices 40, 1440 and output devices 50, 1550, and the web server 423 responds by providing information as to the status of those devices. Additionally, the operator is also given access to information from the control systems 224–230. Thus, the operator can click on a depiction of the central tire inflation system 234 to obtain central tire inflation system information, can click on a depiction of the brake system 236 to obtain brake system information, can click on a depiction of the transmission system 238 to obtain transmission system information, and/or can click on a depiction of the engine 240 to obtain engine information. When the web server 423 receives these operator inputs, the web server 423 provides the requested information to the operator by way of the communication network 420. It may also be desirable to provide the on-board computer system 422 with web-browser functionality to allow the on-board computer system 422 to obtain information from the maintenance center computer system 424 and/or the manufacturer computer system 432.

Rather than clicking on various vehicle components, a list of I/O states for all or some of the I/O devices 1440 and 1450 and/or I/O status information from the control systems 224–230 may be displayed to the operator. For example, a particular input or output may be identified with a descriptive identifier (e.g., "PTO Solenoid") with an indication as to whether the input/output is on or off (e.g., by placing the words "on" or "off" next to the descriptive identifier, or through the use of a color indicator whose color varies according to I/O state). For analog I/O devices, meters, gauges, or other image corresponding to the I/O device may be displayed, without displaying the entire vehicle and without use of the web server 423 and web browsers 430, 435, 438. Various examples are shown in FIGS. 37–47. All of the I/O status information is preferably capable of being transferred automatically and on a real-time basis for real-time remote monitoring of any aspect of operation of the vehicle 411.

In an alternative embodiment, the web server 423 may be provided in an off-board computer system and the on-board computer system 422 can post information to the web server 423. The off-board computer system used to implement the web server may for example be any of the computer systems 424, 432, 437 discussed below. This would allow the same functionality to be achieved while at the same time reducing the amount of communication required between the on-board computer system 422 and the off-board computer systems that wish to view information from the on-board computer system 422.

The GPS receiver 425 permits vehicle position to be determined. The on-board computer system 422 can then transmit the vehicle position information to the computer systems 424, 432, 437 along with the other I/O status information.

The maintenance center 416 is a facility to which the vehicles 411–414 may be taken for maintenance. For example, in the context of a fleet of military vehicles, the maintenance center 416 may be a maintenance depot that is used to service the military vehicles. For a fleet of municipal vehicles, the maintenance center may be a municipal facility where the vehicles are stored and maintained. Alternatively, the maintenance center 416 may be operated by a private outside contractor such as a service station hired to maintain and service municipal vehicles. Likewise, where the fleet of vehicles is privately owned, the maintenance center 416 may be internally operated or operated by an outside contractor. The structure and functions of the maintenance center computer system 424 may be combined with those of the computer systems 432 or 437, for example, where the maintenance center is owned/operated by the manufacturer 417 or the fleet manager 418.

The computer system 416 of the maintenance center 416 further includes a maintenance scheduling system 427, an inventory management system 428, a diagnostic program 429 and a browser and/or server program 430. The maintenance scheduling system 427 is a program executed by the maintenance center computer system 424 that develops and maintains a schedule (typically, at specified time slots) for vehicle servicing at the maintenance center 416. The inventory management system 428 is a program that monitors in-stock inventory of replacement parts for the maintenance center 416. A "part" is any device or substance (system, subsystem, component, fluid, and so on) that is part of the vehicle and not cargo. Typically, each part has an associated part number that facilitates ordering and inventory management. The diagnostic program 429 may be the same as the diagnostic program 217 previously described. In this regard, it may be noted that the computer system 416 is capable of manipulating the I/O devices of the vehicle 411 by sending appropriate commands to the control system 1420 of the vehicle 411.

The web browser 430 allows an operator of the maintenance center computer system 424 to access the information content of the web site provided by the web server 423 of the vehicle 411. Thus, as previously described, the operator can click on various vehicle subsystems or input/output devices, and the web server 423 will receive these inputs and provide the operator with the requested information. The Internet browsing program may be any one of many different types of software from a full scale browser down to a simple browser that is commonly used for Internet enabled wireless phones, depending on how information is presented to the operator.

The manufacturer 417 is a manufacturer of the vehicles 411–414 and/or a manufacturer of replacement parts for the vehicles 411–414. The manufacturer 417 has a manufacturer computer system 432 which includes an inventory management system 433, a diagnostic program 434, and a web browser 435. The inventory management system 434 is a program that monitors in-stock inventory for the manufacturer 417. The web browser 435 and the diagnostic program 434 may be the same as described in connection with the diagnostic program 429 and the web browser 430 of the maintenance center computer system 424.

The fleet manager 418 is the entity that owns or leases the vehicles 411–414, for example, a municipality, the military, and so on. The fleet manager 418 has a fleet manager computer system 437 that includes a web browser 438. The web browser 438 allows the fleet manager 418 to monitor the status and position of the vehicle 411 as previously described in connection with the web browser 430.

The computer systems 422, 424, 432 and 437 of the vehicles 411–414, the maintenance center 416, the manufacturer 417, and the fleet manager 418, respectively, are all connected to the communication network 420. The communication network 420 is preferably the Internet. The Internet is preferred because it is a convenient and inexpensive network that provides worldwide communication capability between the computer systems 422, 424, 432 and 437. Additionally, the Internet permits communication between the on-board computer system 422 and the maintenance center computer system 424 using electronic mail format or other commonly used Internet communication formats. Preferably, security/encryption techniques are used which allow the Internet to be used as a secure proprietary wide area network. A variety of other types of networks may also be used, such as a wireless local area network, a wireless wide area network, a wireless metropolitan area network, a wireless long-haul network, a secure military network, or a mobile telephone network.

The on-board computer system 422 is preferably connected to the Internet by way of a wireless modem. Preferably, the on-board computer system 422 uses a cellular telephone modem with coverage in the geographic region in which the vehicle 411 operates and capable of establishing a dial-up connection to the Internet by way of a telephone link to an Internet service provider. Other communication networks and devices may be used, such as a satellite link, infrared link, RF link, microwave link, either through the Internet or by way of other secure networks as mentioned above. Additionally, the on-board computer system 422 may use some other form of custom or commercially available software to connect to the computer systems 424, 432 and 437, especially if an Internet connection is not used.

Figure 31:
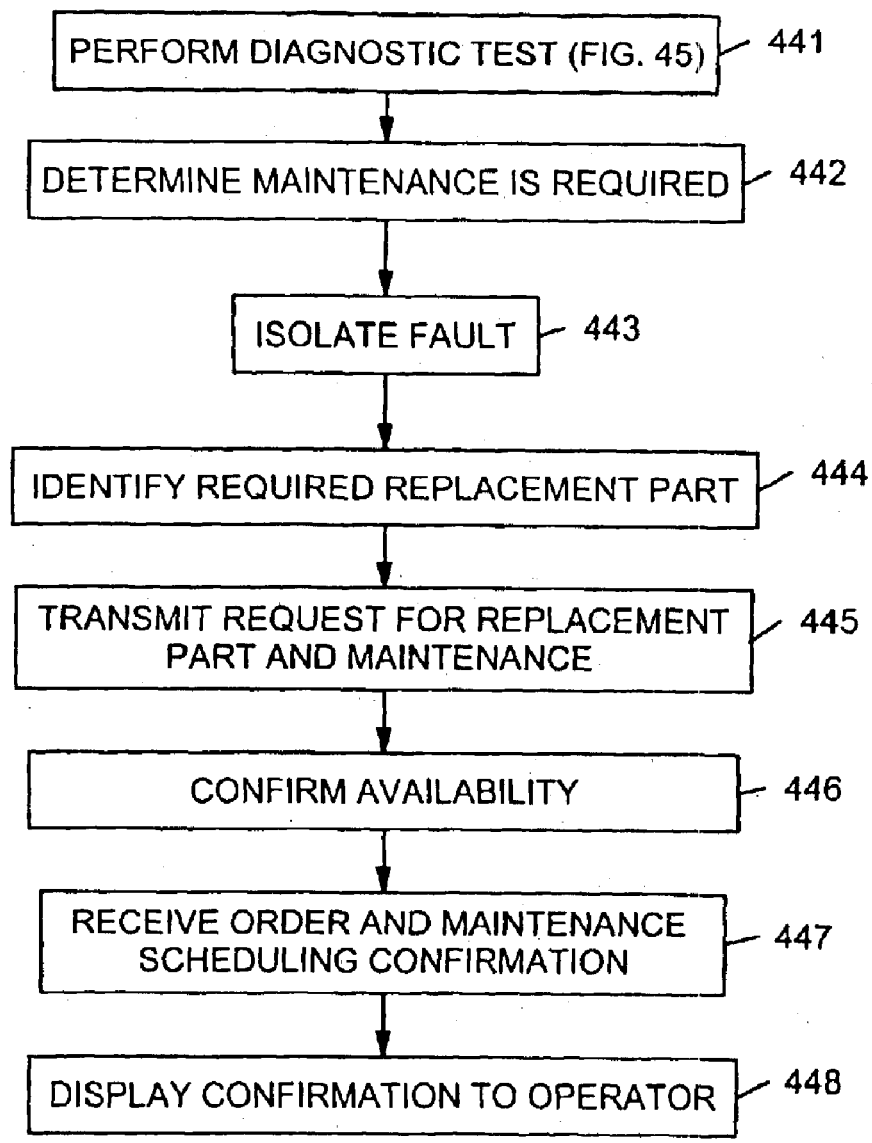
FIG. 31 is a flowchart showing the operation of an on-board vehicle computer system in the system of FIG. 30 during a parts ordering process.
Figure 32:
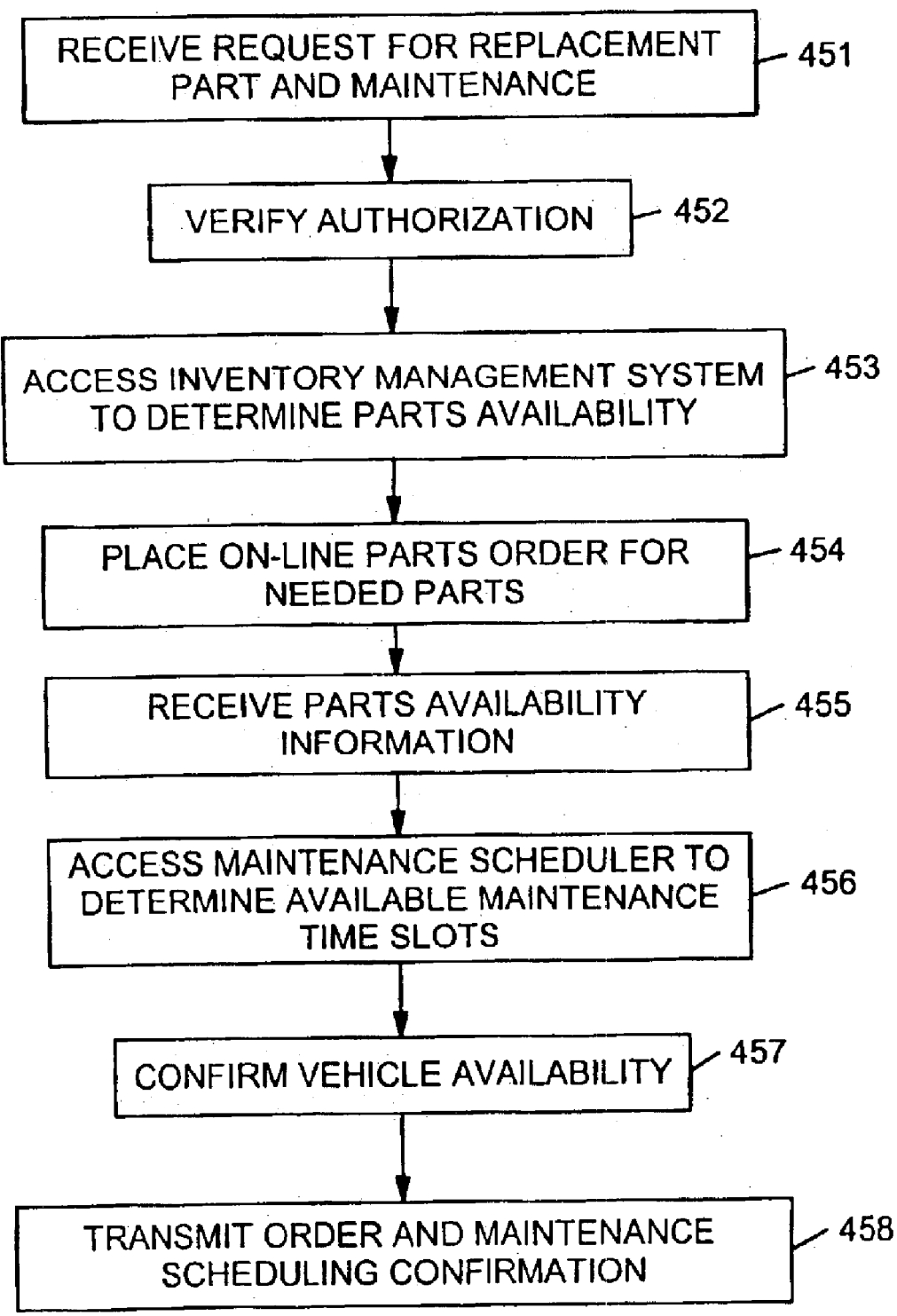
FIG. 32 is a flowchart showing the operation of a maintenance center computer system in the system of FIG. 30 during a parts ordering process.

Referring now to FIGS. 31–32, the operation of the system 410 to order a replacement part and schedule maintenance for the vehicle 411 is illustrated. FIG. 31 shows the operation of the on-board computer system 422. FIG. 32 shows the operation of the maintenance center computer system 424 which cooperates with the on-board computer system 422. Referring first to FIG. 31, at step 441, a diagnostic test is performed to measure a vehicle parameter. As previously mentioned, the system 411 is preferably used in connection with the diagnostic system 212 described in connection with FIGS. 22–29, and the diagnostic test may be any of the tests described in connection with FIGS. 22–29 or other tests.

Preferably, step 441 is performed continuously throughout normal operation of the vehicle 441. Thus, as the vehicle 411 travels on the highway, for example, vehicle operating conditions are monitored and the tests identified in Table II are performed without operator involvement.

At step 442, the test control module 215 determines that maintenance is required, for example, by comparing the measured operating parameters to reference values for the operating parameters. The operating parameters may, for example, include temperatures, pressures, electric loads, volumetric flow of material, and so on, as described above. Upper and/or lower reference values are stored in a database or table in the test control module 215. The reference values for the operating parameters may be stored based on values provided by the manufacturer of the vehicle 411 or are set based on information provided by the manufacturer and based on actual usage conditions. In addition, the reference values may be updated periodically when the on-board computer system 422 connects to the appropriate maintenance center computer system 424. If the measured operating parameter is outside an acceptable range as defined by the reference values, then maintenance is required.

At step 443, when it is determined that an operating parameter is outside an acceptable range at step 442, the diagnostic system 212 fault isolates to a replaceable part. The manner in which step 443 is performed depends on the parameter that is out of range. Many types of vehicle parts wear out regularly, and the fact that a particular parameter is out of range often has a high correlation with a particular part being in need of replacement. For example, and with reference to Table II, if the measured parameter is battery resistance change, and the battery resistance change is out of range, then this indicates that the battery needs to be replaced. If the measured parameter is starter current, and the starter current is low, then this indicates that the starter needs to be replaced. If the measured parameter is current through an output device (e.g., a light bulb), and no current flows through the output device, then this indicates that the output device needs to be replaced. If the measured parameter is a fluid level, and the fluid level is below a predetermined level as indicated by a fuel gauge, then this indicates that additional fluid is required to replace lost fluid. Additionally, a significant number of routine maintenance items may be identified in this manner. Thus, the diagnostic system 212 preferably monitors actual usage (e.g., distance traveled, engine hours, and so on) to determine when routine maintenance (e.g., a tire change, an oil change) is required, indicating that one or more parts (e.g., one or more tires, or the oil and the oil filter) of the vehicle are in need of replacing. (In this regard, it may be noted that the process of FIG. 31 may also be used even where no replacement part is ordered, for example, to schedule a preventive maintenance checkup based on actual vehicle usage.)

Further, the I/O states of the input devices 1440 and output devices 1450 may be compared to detect inconsistencies and thereby locate devices that are in need of replacing. For example, if the input state of a particular input device 1440 is inconsistent with I/O status information received from one or more other (possibly, redundant) devices, then this indicates that the particular input device 1440 is in need of replacing. Moreover, the I/O circuitry of the interface modules 1420 provides additional health and operation information regarding the I/O devices 1440 and 1450. For example, if the voltage across a particular input device is zero volts, and the expected input range for that input device is +1.0 volt to +5.0 volts, then this indicates that the input device 1440 is in need of replacement. Alternatively, if a given output device 1450 never draws any power regardless of the perceived output state of the output device 1450, then this indicates that the output device 1450 is in need of replacing. Thus, by testing voltage and current conditions in the I/O circuitry of the interface modules 1420, an indication of particular input devices 1440 or output devices 1450 that are in need of replacing may be obtained.

In a limited number of circumstances, it is desirable for the fault isolating step 443 to be performed at least partially in response to operator inputs. Specifically, operator inputs are desirable when an out-of-range parameter indicates that maintenance is required, but the parameter (or combination of parameters) that is out-of-range is not highly correlated with failure of a particular part. In this case, then operator inputs may be used in combination with other inputs to identify which part is in need of replacing. For example, the diagnostic system 212 may be able to fault isolate to a limited number of parts or groups of parts which potentially need to be replaced. The parameters that are out of range, along with other diagnostic data and the parts or groups of parts that potentially need to be replaced, are then displayed to the operator using the display 219. The operator may for example be the driver of the vehicle or maintenance personnel assigned to maintain or repair the vehicle. Operator inputs are then acquired which make a final selection of the parts or groups of parts to be replaced based on the operator's professional judgment or other information.

Additionally, operator input may also be desirable in the case of replacement parts that have a cost which exceeds a predetermined threshold level (e.g., replacement parts that are considered to be particularly expensive). In this case, the results of the fault isolating step 443 are preferably displayed to the operator, and the operator is requested to confirm that the fault isolating step 443 has been performed correctly. In a particularly preferred embodiment, the operator is further requested to provide an identification code (to identify the operator and confirm that the operator has the requisite authority to make such a determination) and/or an authorization code (to provide a paper trail and confirm that any required authorizations for order the replacement part have been received). The on-board computer system 424 then verifies that the identification code identifies an operator having the requisite authority to order such a part and request such maintenance, and/or confirms that the authorization code is valid and therefore any required authorizations for order the replacement part have been received.

The health and operation information that is used by the diagnostic system 212 to perform step 443 may be derived from a variety of sources. First, as previously noted, the control systems 224–230 have built in test capability and are able to provide health and operation information regarding the respective controlled subsystems 234–240. Additionally, numerous sensors may be located throughout the vehicle and connected to one of the interface modules 1420. Further, the I/O circuitry of the interface modules 1420 provides additional health and operation information regarding the I/O devices 1440 and 1450 to which it is connected. To the extent that the amount of health and operation information available to the diagnostic system 212 is increased (e.g., through the use of improved built-in test capabilities or the use of additional sensors), the ability of the diagnostic system 212 to fault isolate will be improved.

At step 444, which may be performed concurrently with step 443, the diagnostic system 212 identifies the part number of the replacement part required to return the vehicle 411 to operating condition. Thus, if the diagnostic system 212 determines that the battery needs to be replaced at step 443, then at step 444 the diagnostic system identifies the part number of the battery to be replaced. Step 444 is preferably performed using a database that identifies all parts on-board the vehicle 411, including part numbers and pricing information. The data base is preferably located on the on-board computer system 422 and is integrated with the previously-discussed maintenance jacket which is stored in the computer system 422 and which comprises a log of maintenance activities performed on the vehicle 411. In order for the data base to be kept current, the database is updated periodically by establishing an Internet link with the manufacturer computer system 432. Alternatively, the database may be stored at the fleet manager computer system 437 and accessed via network connection over the communication link 420. For example, this is advantageous if the functionality of the fleet manager computer system 437 is combined with the functionality of the maintenance center computer system 424 in a single computer system. In this situation, the inventory management system 428 can maintain inventory levels in a manner that takes into account how many vehicles use a particular part. The inventory management system 428 can also query the diagnostic systems 212 of particular vehicles to assess how soon particular parts may need to be replaced.

At step 445, after the fault has been isolated and the replacement part has been identified, a request for a replacement part along with a request for maintenance is transmitted to the maintenance center computer system 424. If the parts data base is stored at the on-board computer system 422, then the request for the replacement part may simply comprises a request for a part identified by a particular part number (e.g., "Battery, part no. 1234"). If the parts data base is stored at the maintenance center computer system 424, then the request for the replacement part simply comprises a request for a new part without specifying a part number. The operator identification code and/or authorization code are preferably also transmitted.

Step 445 is preferably performed whenever a part is identified that is in need of replacing. However, step 445 may also be performed in delayed fashion after the maintenance center computer system 424 initiates contact with the on-board computer system 422 and queries whether any parts and maintenance are required.

Referring now also to FIG. 32, FIG. 32 shows the operation of the maintenance center computer system 424 after the parts and maintenance request is transmitted from the on-board computer system 422. At step 451, the maintenance center computer system receives the request for the parts and maintenance request from the on-board computer system 422. At step 452, the maintenance center computer system 424 verifies the authorization for the ordered part. For example, the maintenance center computer system 424 confirms that the identification code identifies an operator having the requisite authority to order such a part and request such maintenance, and/or confirms that the authorization code is valid and therefore any required authorizations for order the replacement part have been received.

At step 453, the maintenance computer system 424 accesses the inventory management system 428 for the maintenance center 416 to determine if the requested part is available in on-site inventory. For example, for low dollar value or common parts, the part is likely to already be available on-site. For high dollar value or irregular parts, the part may have to be ordered from the manufacturer 417.

At step 454, assuming the requested part is determined to be not available on-site in step 453, then the maintenance center computer system 424 places an on-line order for the part with the manufacturer computer system 432. When the manufacturer computer system 432 receives the order, it accesses the inventory management system 433. If the part is on-hand at the manufacturer 417, the part can be shipped to the maintenance center for next day delivery. If the part is not on-hand, the manufacturer computer system 432 determines the amount of time until the part will be available (taking into account any backlog of orders). The manufacturer computer system 432 then transmits a message to the maintenance center computer system 424 confirming the order and indicating an expected delivery date for the part to the maintenance center. This information may, for example, be sent in the form of e-mail message that is received by automatic scheduling program as well as a personal e-mail account associated with a supervisor or manager of the maintenance center 416.

At step 455, the maintenance center computer system 424 receives the message from the manufacturer computer system 432 confirming the order and indicating the expected delivery date. At step 456, the maintenance center computer system 424 accesses the maintenance scheduler 427 to determine the next available maintenance slot after the replacement part is delivered.

At step 457, the maintenance center computer system 424 confirms availability of the vehicle 411, for example, by transmitting a message to the fleet management computer system 437 to confirm vehicle availability. Alternatively, a message may be sent to the operator of the vehicle 411 and displayed using the 219 to prompt the operator to confirm vehicle availability (shown as step 446 in FIG. 31). As a further alternative, the vehicle 411 may be programmed with usage scheduling information, so that the vehicle is able to determine whether it is available during a given time slot. If the vehicle 411 is not available during a given time slot, then another time slot is considered.

At step 458, the maintenance center computer system 424 transmits an order and maintenance scheduling confirmation message to the on-board computer system 422. Referring back to FIG. 31, at step 447, the order and maintenance scheduling confirmation message is then received by the on-board computer system and, at step 448, displayed to the operator of the vehicle 411.

In some situations, after connecting, the maintenance center computer system 424 may completely control diagnosis of the problem, for example, under the control of an operator at the maintenance center 416. Thus, the operator can execute a diagnostic program that directly manipulates I/O states of the input devices 1440 and output devices 1450, and/or that interfaces with the control systems 224–230 to control a respective one of the systems 234–240. In this regard, it may be noted that, in the preferred embodiment, all electric/electronic devices that are not directly connected to one of the control systems 224–230 are directly connected to one of the interface modules 1420. Therefore, a remote operator at the maintenance center 416 can have complete control of all electric devices on board the vehicle 411, and can control such things as engine ignition, engine cranking, and so on.

The maintenance center computer system 424 may also download a diagnostic program that is then used by the on-board computer system 422. Also, diagnostic data can be transmitted to the maintenance center computer system 424 to create a record of the tests performed and routines run for use in diagnosing future problems or for analyzing past problems.

Figure 33:
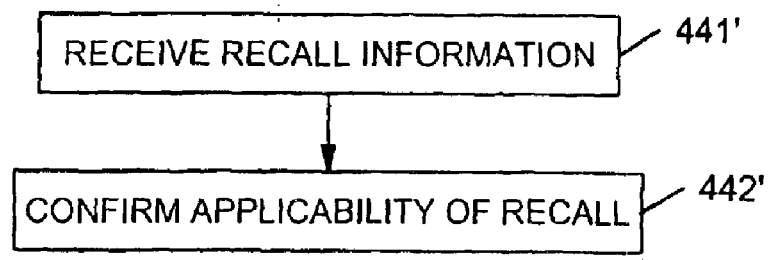
FIG. 33 is another flowchart showing the operation of an on-board computer system in the system of FIG. 30 during a parts ordering process.

Referring now to FIG. 33, in another embodiment, the system 400 is used to distribute recall information for the vehicle 411 and to schedule maintenance in connection with the recall. The recall notice information is transmitted from the maintenance center computer system 424 and, at step 441', is received at the on-board computer system 422. At step 442', the on-board computer system 422 confirms the applicability of the recall. For example, the on-board computer system 422 confirms that the vehicle 411 is configured in such a manner that it utilizes the part that is the subject of the recall. Steps 441' and 442' roughly correspond to steps 441–444 in FIG. 31, in as much as both groups of steps identify a part that is in need of replacing. Thereafter, the operation of the on-board computer system 422 and the maintenance center computer system 424 is generally the same as previously described, with the two computer systems 422 cooperating to schedule the vehicle 411 for maintenance to replace the part that is the subject of the recall.

In an alternative embodiment, the recall information may be transmitted directly from the manufacturer computer system 432 to the on-board computer system 422. For example, if the vehicle 411 is not part of a fleet of vehicles, and may be serviced at any one of a plurality of different repair centers, the recall notice information may be simply displayed to the operator of the vehicle 411 using the display 219. The information sent to the operator preferably includes a notice that the vehicle 411 is the subject of a recall, information regarding compliance such as nearby service centers available to perform the recall maintenance, and other information. The operator then has the option of scheduling maintenance to comply with the recall. However, it is necessary for an operator input to be received (e.g., a key press) indicating that the recall information has been considered in order to remove the recall information from the display 219. When the operator input is received, a message is transmitted back to the manufacturer computer system 432 confirming that the operator received the recall information. This arrangement allows a manufacturer of the vehicle 411 to verify that the recall information was received by the operator of the vehicle 411, even if the recall information is ultimately ignored.

The system 410 is also useable for firmware upgrades. Firmware may be updated on a periodic or aperiodic basis any time the on-board computer system 422 and the maintenance center computer system 424 establish communication. For example, the on-board computer system 422 may connect to the maintenance center computer system 424 to order a replacement part. If a certain period of time has expired since the last firmware upgrade then at the time the computer systems connect to order the part, the on-board computer system 422 may check for an available firmware upgrade. Many embodiments for upgrading firmware are within the scope of the present equipment service vehicle system. For example, the operator may initiate the firmware upgrade process or the on-board computer system 422 may initiate the process independent of any other need to connect to the maintenance center computer system 424. Also, there may be situations where the firmware upgrade is sufficiently important that the maintenance center computer system 424 connects to the on-board computer system 422 for the express purpose of upgrading the firmware. Once transferred to the on-board computer system 422, the firmware is then transmitted to and installed by each of the interface modules 1420 within the on-board computer system 422. This arrangement may also be used to install firmware for the control systems 224–230.

Figure 34:
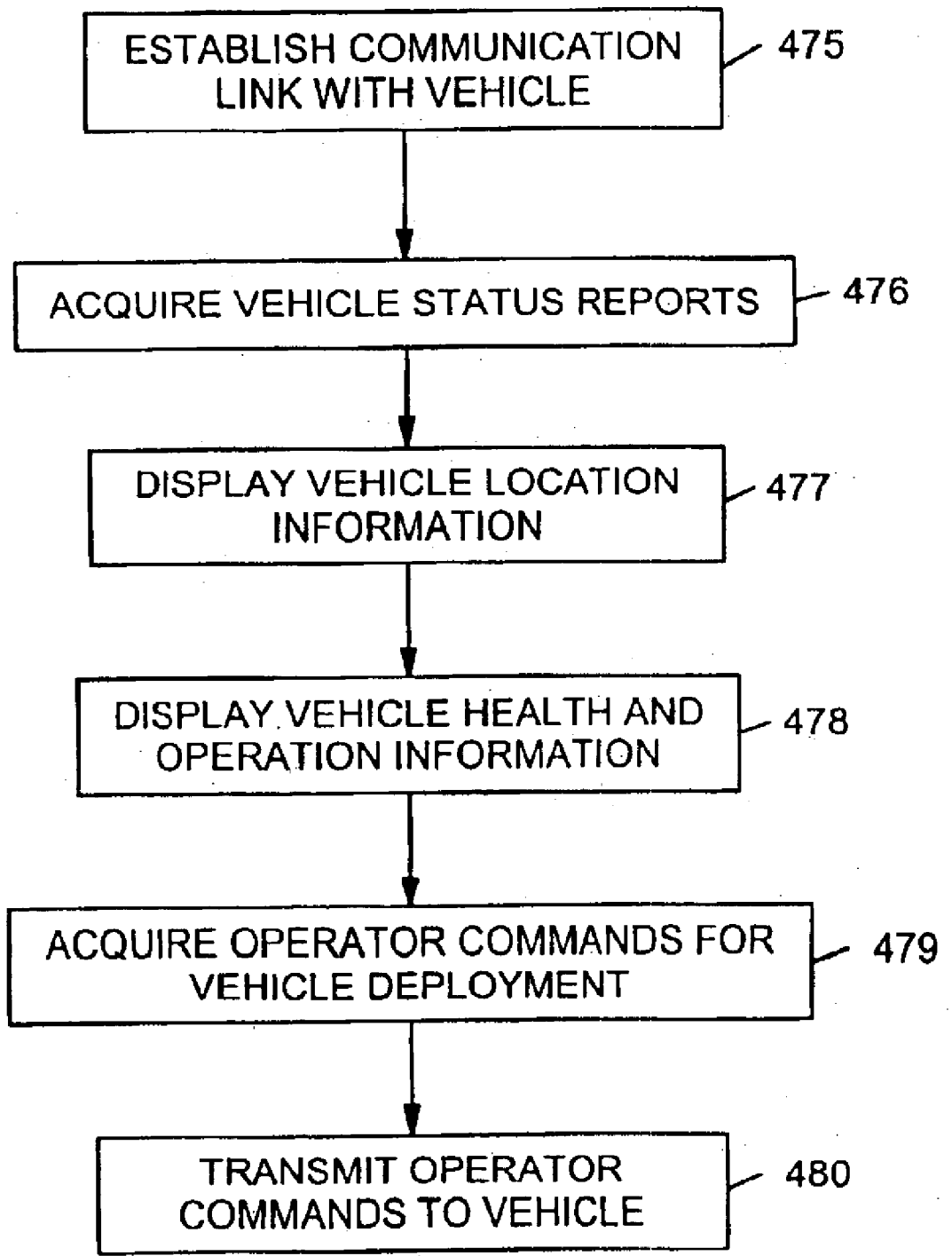
FIG. 34 is a flowchart showing the operation of a maintenance center computer system in the system of FIG. 30 during a readiness assessment process.
Figure 35:
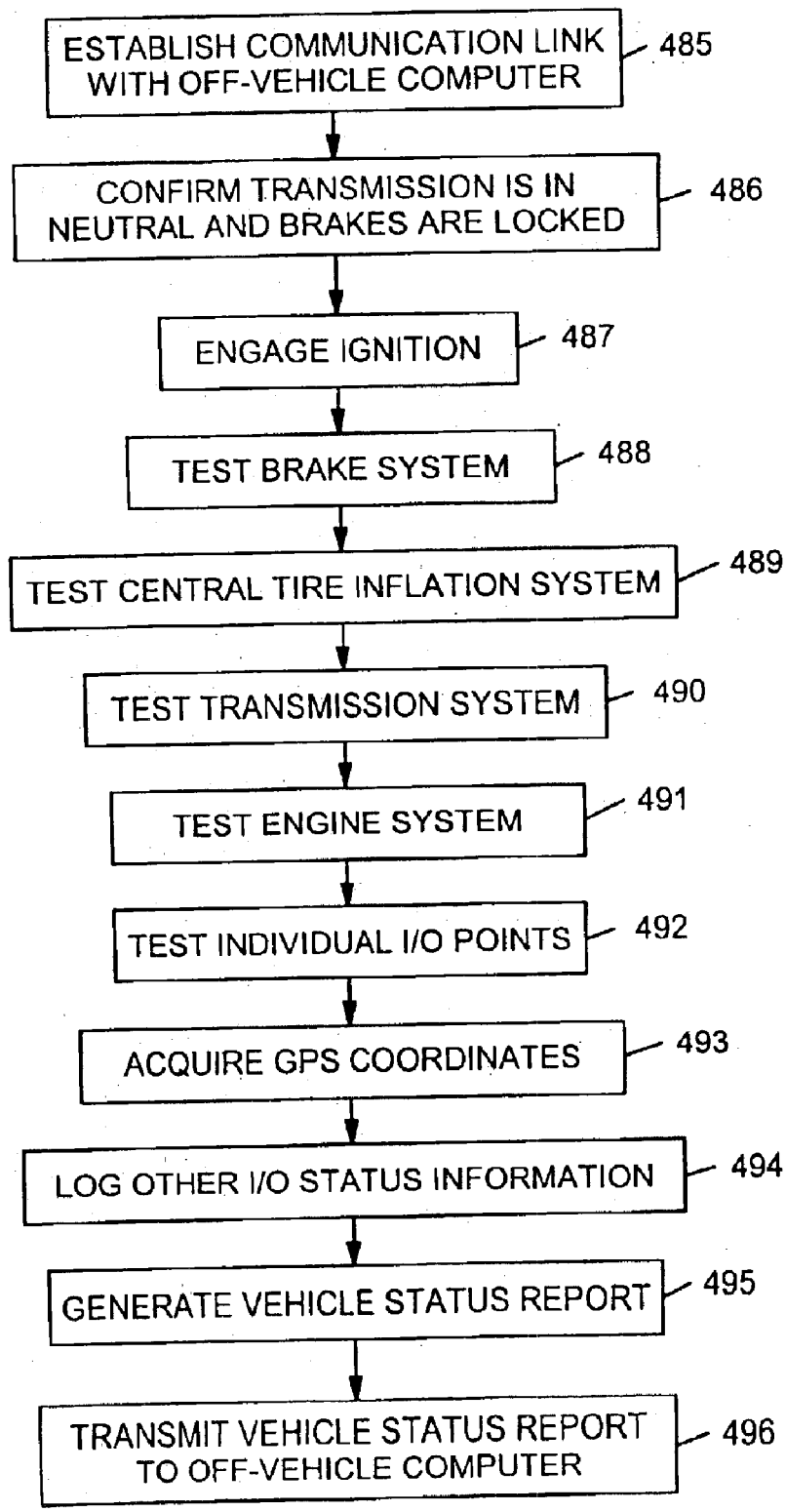
FIG. 35 is a flowchart showing the operation of an on-board vehicle computer system in the system of FIG. 30 during a readiness assessment.

Referring now also to FIGS. 34–35, a preferred fleet monitoring, real time mission readiness assessment, and vehicle deployment method is shown. The method shown in FIGS. 34–35 is useable to obtain a real time assessment of each vehicle in a fleet of vehicles. This is useful, for example, in the context of a natural disaster or other emergency when it is not known which vehicles are operational, and the locations of the vehicles is not known. Again, by way of example, the method is described in the context of the system 400 of FIG. 30. FIG. 34 shows the operation of the fleet management 437. FIG. 35 shows the operation of the on-board computer system 422. Although FIGS. 34–35 are discussed in the context of the vehicle 411, the process of FIGS. 34–35 are preferably performed in connection with all of the vehicles in the fleet.

Referring first to FIG. 34, at step 475, the fleet management computer system 437 establishes a communication link with the vehicle 411 using the communication network 420. In the context of municipal applications, a cellular telephone modem may be used to connect the vehicle to a secure area of the Internet, allowing the fleet management computer 437 to communicate with the vehicles 411–414 by way of the Internet. In the context of military applications, a secure military network is used to implement the communication network 420. At step 476, a vehicle status report is acquired from the vehicles 411.

Referring now also to FIG. 35, the operation of the on-board computer system 422 of the vehicle 411 to generate such a status report is shown. At step 485, a communication link is established with the fleet management computer system 437. Step 485 corresponds to step 475 in FIG. 34. At steps 486–494, the on-board computer system 422 performs a series of tests that assess the operability of various vehicle subsystems. By testing each of the individual subsystems, an overall assessment of the mission readiness of the vehicle 411–414 is obtained.

Thus, at step 486, the test control module confirms that the transmission is in neutral and the brakes are locked. Step 486 is performed so that when the ignition is engaged at step 487, it is known that the vehicle will remain stationary. More complete health and operational testing may be performed when the engine is turned on, however, the vehicle may be completely unattended and therefore vehicle movement should be avoided for safety reasons. For example, in the context of military vehicles, in which vehicles may be rendered inoperable if a storage site or other stockpile of equipment and vehicles is bombed, it is desirable for the vehicle health and operation to be ascertained even though no operator is present. Likewise, in the context of municipal applications, in which vehicles may be rendered inoperable in the event of a natural disaster (such as a tornado or hurricane) or a man-made disaster (such as a large scale industrial accident or a terrorist attack), it is again desirable for the vehicle health and operation to be ascertained even though no operator is present.

At step 487, as previously noted, the ignition is engaged. The ignition input device which receives an input from the operator (in the form of an ignition key turning) is preferably one of the input devices 1440. Therefore, by manipulating the I/O states in the I/O status table 1520, the vehicle 411 is commanded to behave as though the ignition key is turned even though no operator is in fact present at the vehicle. The ignition key input state can be manipulated remotely in the same manner as any other input state for an input device 1440 connected to an interface module 1420.

At step 488, the anti-lock brake control system 226 tests the brakes 236. The control system 226 performs built-in self tests to ensure the operability of the control system 226 and of the mechanical components of the brake system 236. If no response is received by the on-board computer system 422 from the brake control system 226, then it is assumed that the brake system 226 has been rendered inoperable. At steps 489, 490, and 491, respectively, the central tire inflation system, the transmission system 238, and the engine system 240 are tested in generally the same manner that the anti-lock brake system 236 is tested, specifically, through the use of built-in self test capabilities. Additionally, the tests set forth above in Table II may also be performed. It should be noted that the systems 234–240 need not be tested one after the other as shown in FIG. 35 but, in practice, may be tested concurrently. Further, in addition to employing the built-in self test capabilities of the control systems 224–230, it may also desirable to employ additional health and operation information that is attainable by way of any sensors that are connected to the interface modules 1420. Information pertaining to the operational health of the systems 234–240, such as whether respective system 234–240 passed or failed particular tests, is then logged.

In step 492, the interface modules 1420 test individual input devices 1440 and output devices 1450. For example, the input devices 1440 can be tested by ensuring that redundant input sensors provide the same input information, and by ensuring that the input devices provide input signals that are within an expected range. The output devices 1450 may be tested by using input devices 1440 which are feedback sensors to evaluate the response of the output devices 1450 to signals that are applied to the output devices 1450. Additionally, I/O drive circuitry of the interface modules 1420 may be used to determine the current through and/or the voltage across the output devices 1450. Alternatively, separate input devices 1440 may be used which are voltage or current sensors. This information can be used to assess the consumed power by each output device 1450 and determine whether the consumed power is within a predetermined range.

At step 493, the GPS coordinates of the vehicle 411 are acquired using the GPS receiver 425. At step 494, other I/O status information is acquired and logged from the I/O status table 1520. Preferably, all of the information in the I/O status table 1520 is logged. As a result, the I/O status report contains information regarding such parameters as fuel level. Additionally, in the context of multi-purpose vehicles, information regarding the configuration of the vehicle 411 may be stored in the I/O status table 1520. Therefore, after a natural disaster, it will be known whether a particular vehicle is presently configured with a dump truck variant module, a wrecker variant module, or a snow removal variant module, for example.

At step 495, the information which logged during steps 487–494 is compiled into the vehicle status report. Of course, step 495 may also be performed concurrently as each of the steps 486–493 is completed. Preferably, during step 495, a summary conclusion is also generated based on the results of the tests performed during steps 487–494. For example, the summary conclusion may be "fully operational" if the results of the tests performed during steps 487–494 determine that all subsystems are at or near a level of full operability, "operational with limited damage" if the test results indicate that one or more subsystems has sustained significant damage but the vehicle is still useful for at least some intended purposes, "inoperable" if the test results indicate that one or more subsystems has sustained significant damage and the vehicle is not useful for any intended purpose, and "inconclusive" if the tests could not be performed or if the test results provide conflicting information regarding the operability of the vehicle 411. At step 496, the vehicle status report is then transmitted from the on-board computer system 422 to the fleet management computer system 437.

Referring back to FIG. 34, after the vehicle status report is acquired by the fleet management computer 437, the fleet management computer system 437 displays to an operator the vehicle location information at step 477 and the vehicle health and operation information at step 478. Preferably, steps 477–478 are performed in the following manner. Specifically, the vehicle location, health, and operation information is displayed to the operator of the fleet management computer system 437 using the web browser 438. For example, in the context of a fleet of municipal vehicles, the web browser 438 displays a city map with icons representing the vehicles superimposed on the city map at locations corresponding to the actual position of the vehicles. The icons are displayed in a manner which is indicative of the level of health and operation of the vehicle. For example, a red icon indicates an inoperable vehicle, a yellow icon indicates a semi-operable vehicle, and a green icon represents a vehicle which is substantially fully operable. Alternatively, only two colors may be used (e.g., green and red), with varying levels of gradations between red and green being used to indicate a percentage level of operability. Further, the displayed icons preferably vary according to the type of vehicle represented. For example, an icon representing a fire truck may be displayed as a small representation of a fire truck, whereas an icon representing a wrecker vehicle may be displayed as a small representation of a wrecker vehicle. In the context of variant vehicles, the variant vehicle may be represented in different ways depending on the type of variant module mounted on the vehicle chassis. In this way, the operator is able to view the city map displayed by the web browser 438 and obtain an immediate overall picture of the real time locations of the operable vehicles available for responding to the natural disaster. Likewise, in military applications, a battlefield commander is able to view a map of the battlefield and obtain an immediate overall picture of the locations of the operable military vehicles. Again, different types of military vehicles may be represented using different icons. Further, in both military and municipal contexts, to obtain additional information, the operator of the fleet management computer system 437 can click on the iconic representation of a particular vehicle to obtain additional information as previously described.

At step 479, the fleet management computer system 437 acquires operator commands for vehicle deployment. For example, in military applications, a commander can control troop movements by clicking on particular vehicles and dragging the vehicles on the screen to new locations on the display of the battlefield map. When the operator clicks on a particular vehicle and moves the vehicle to a new location on the battlefield or city map, the new location of the vehicle on the map is converted to GPS coordinates, and the new GPS coordinates are transmitted at step 480 to the vehicle as part of a command from the operator to move the vehicle to the new location. In similar fashion, in municipal applications, a fire chief or dispatcher can cause fire trucks to be deployed to specified locations by clicking and dragging the icon to the desired location on the city map. Once the icon is dragged to the new location, a shadow icon is displayed at the new location until the vehicle reaches the commanded position, allowing the operator of the fleet management computer system 437 to know the actual vehicle position as well as the vehicle's commanded position. When the vehicle reaches its commanded position, the shadow icon is no longer displayed.

As will be appreciated, various combinations of the above-described features have already been described by way of example. However, as will be appreciated, additional combinations are possible. For example, various types of equipment service vehicles have been described, including fire fighting vehicles, mixing vehicles, snow removal vehicles, refuse handling vehicles, wrecker vehicles, and various types of military vehicles. All of the features described in connection with one of these vehicles may also be used in connection with any of the remaining types of vehicles.

Figure 36:
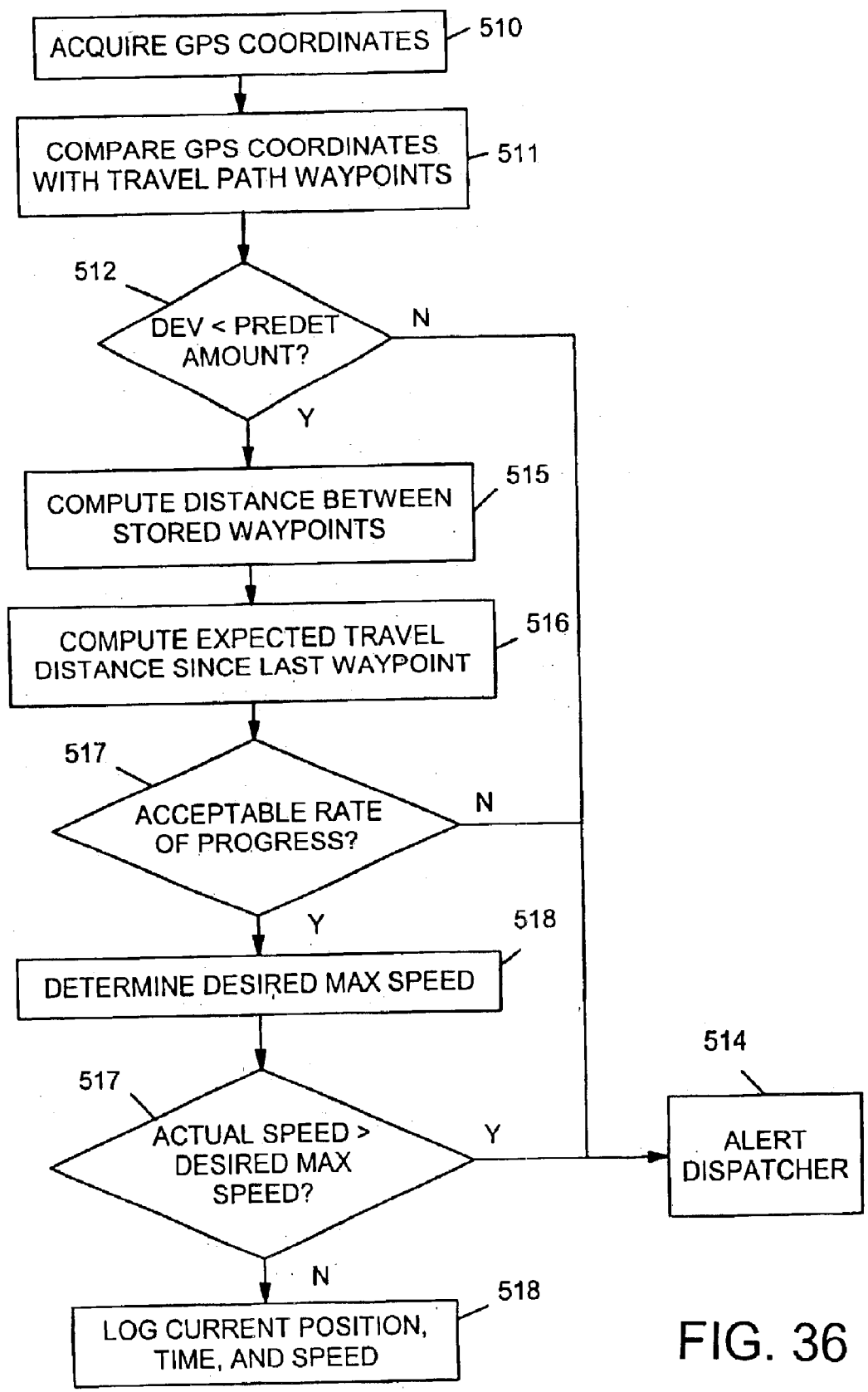
FIG. 36 is a flowchart showing the operation of the system of FIG. 30 to detect non-conformance to a predetermined route.
Figure 37:
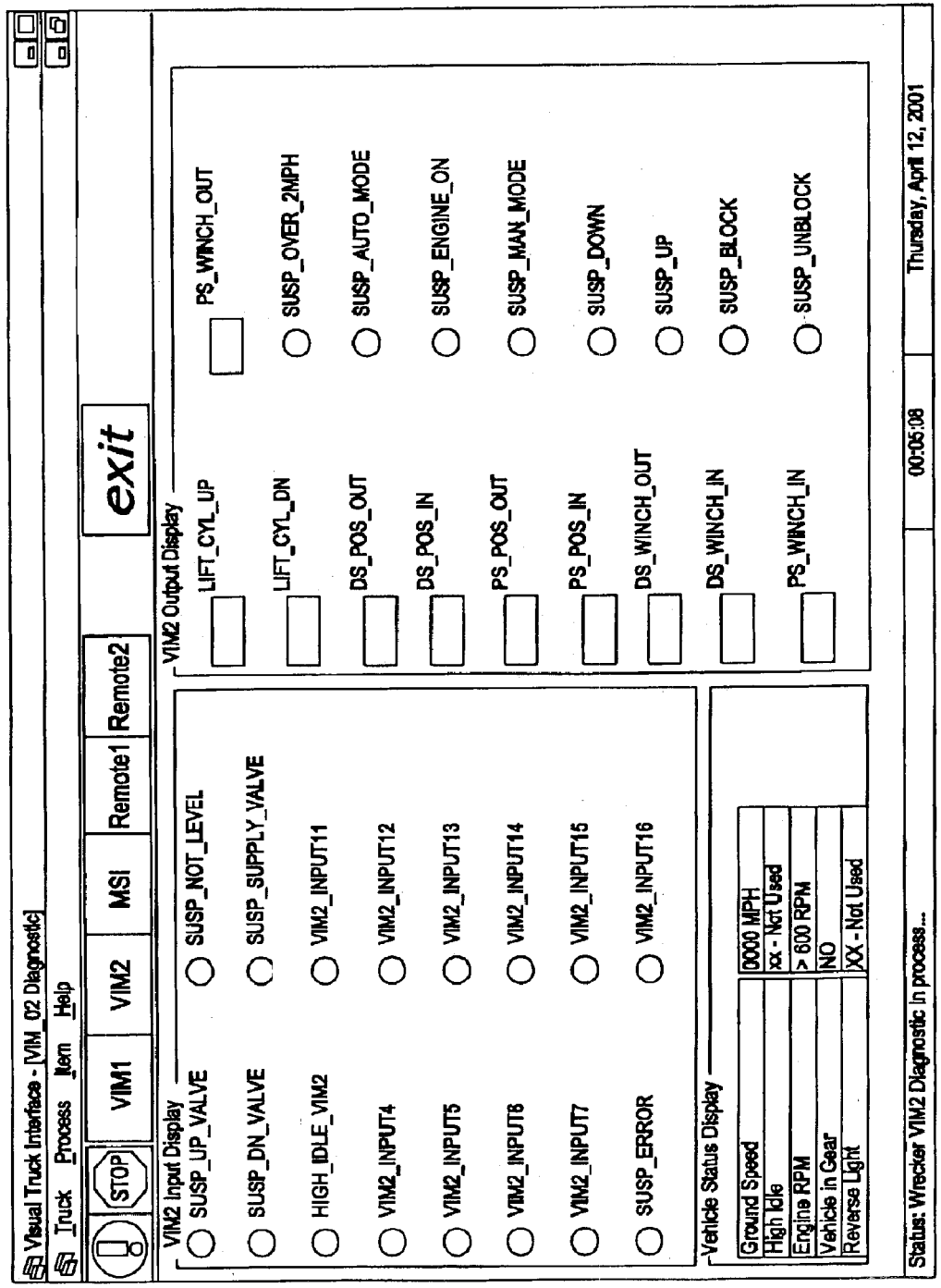
FIGS. 37–47 are various examples of screen display for real time remote monitoring of vehicle I/O status information.
Figure 38:
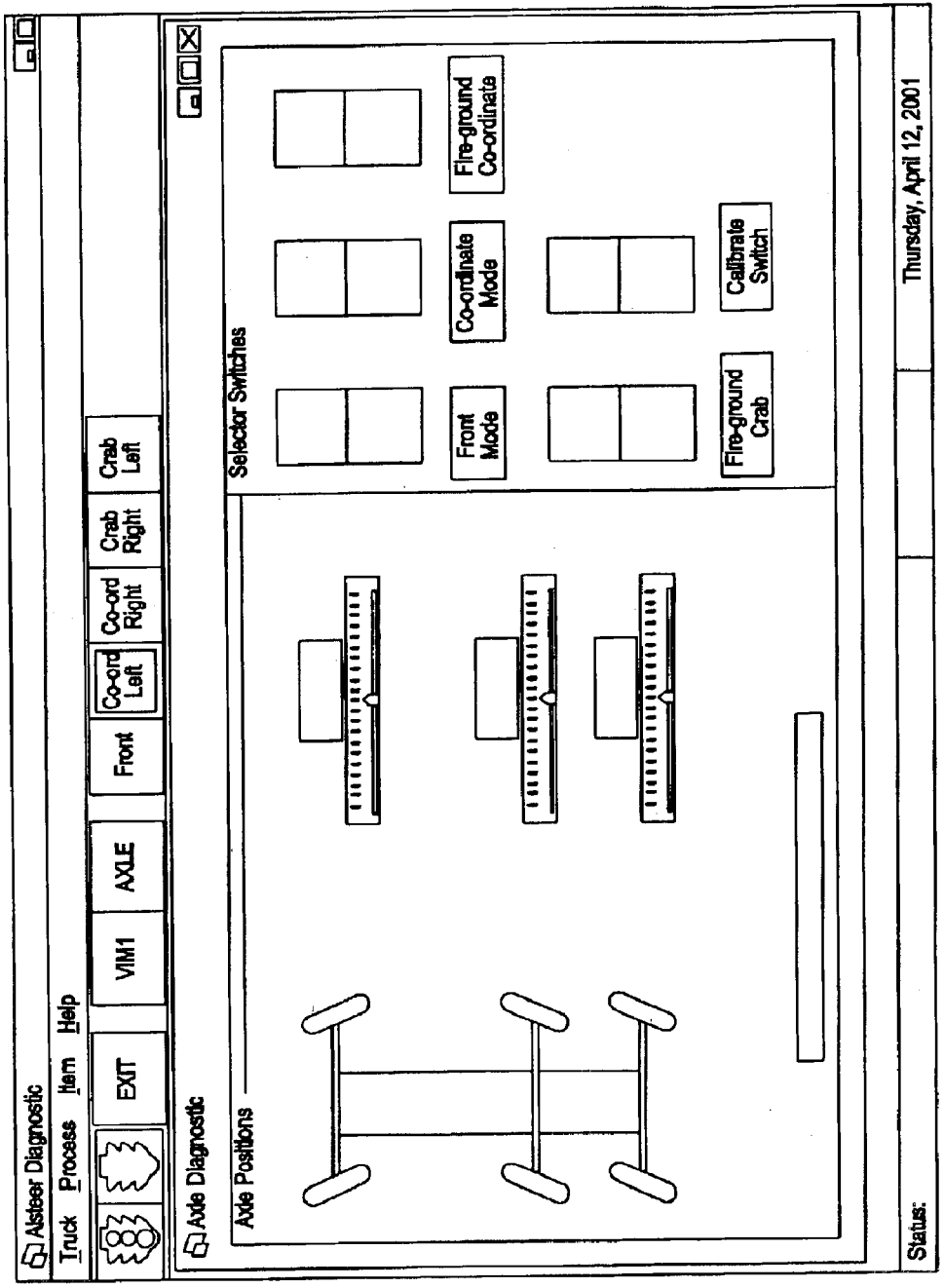
Figure 39:
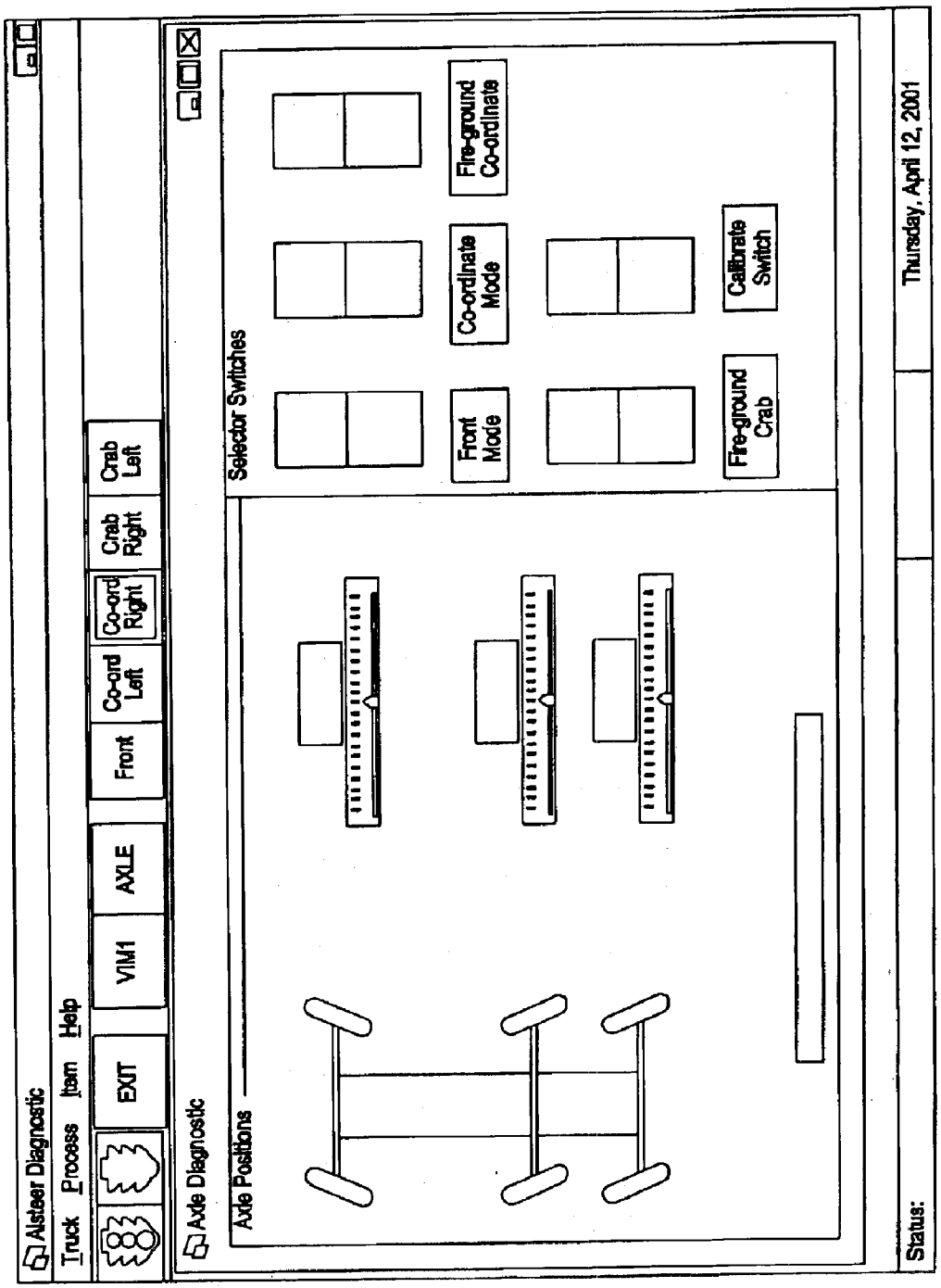
Figure 40:
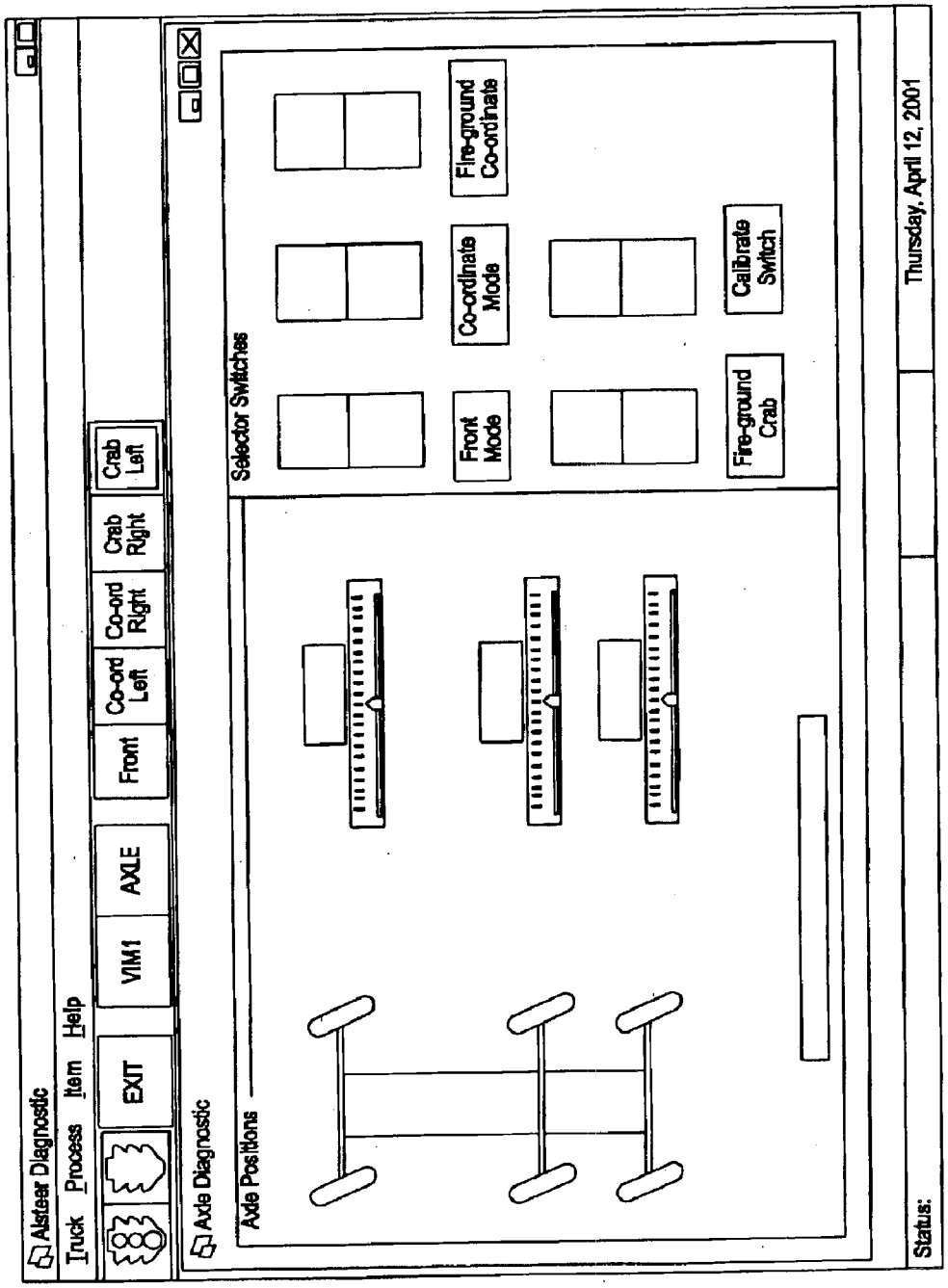
Figure 41:
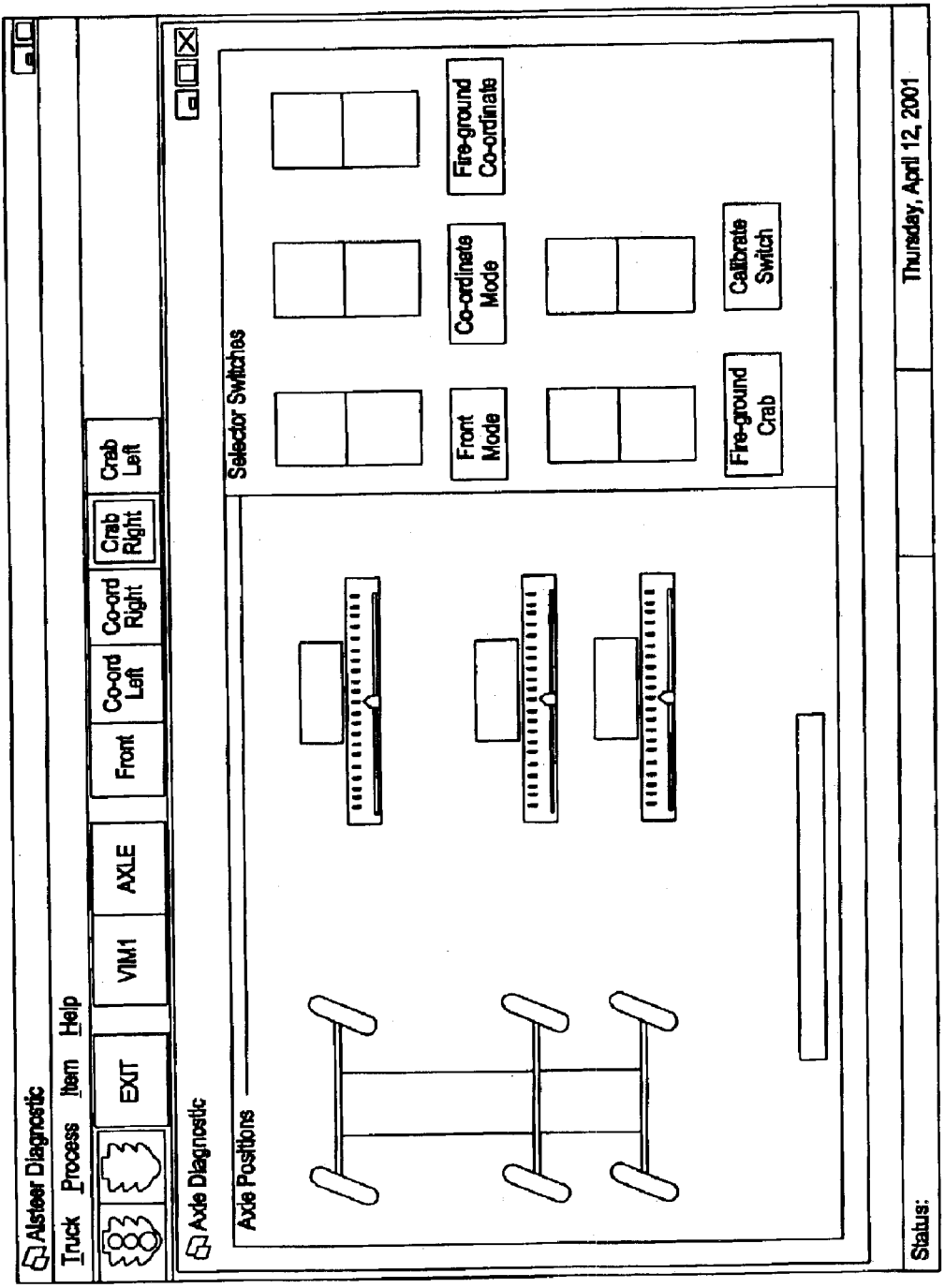
Figure 42:
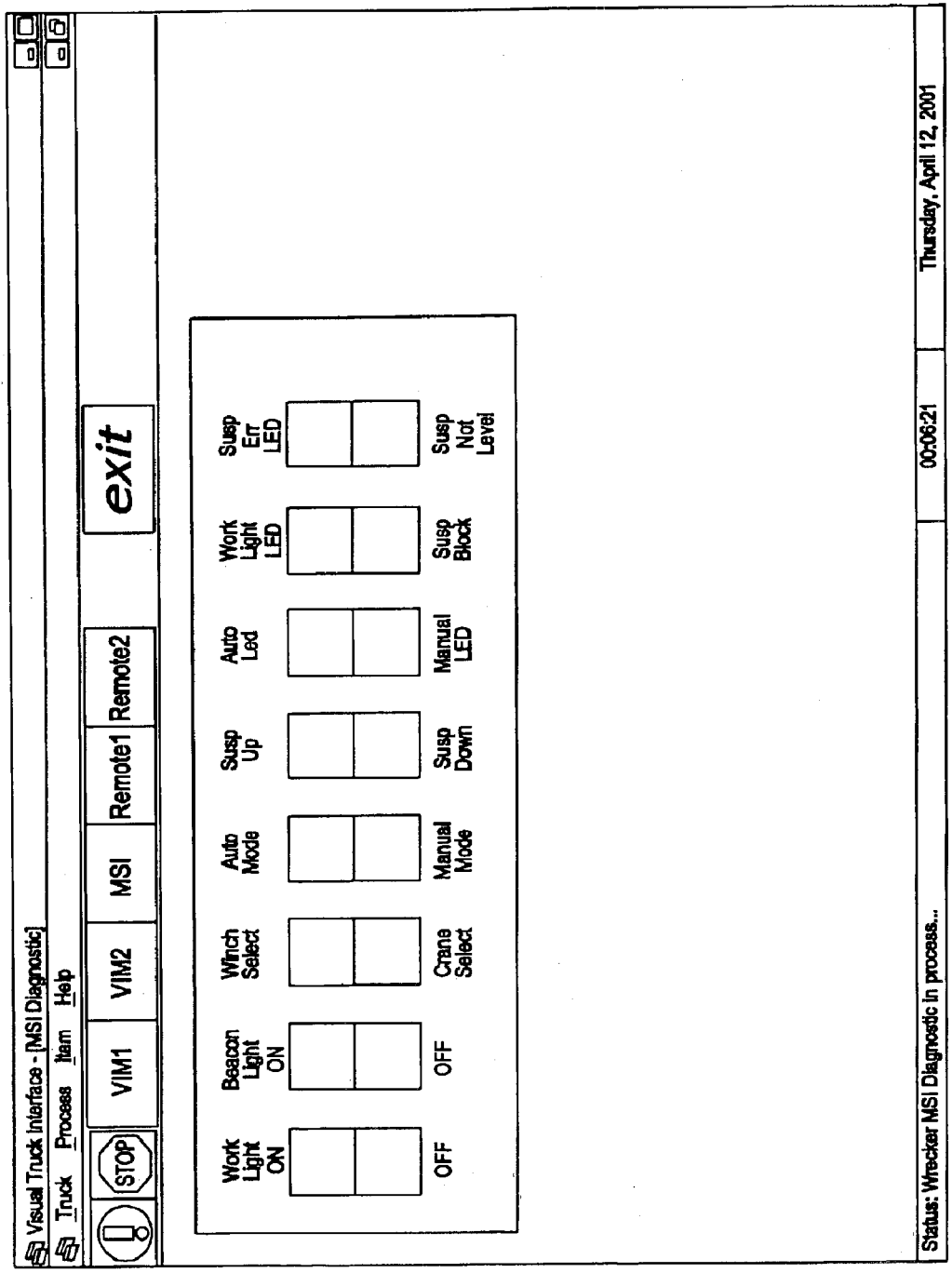
Figure 43:
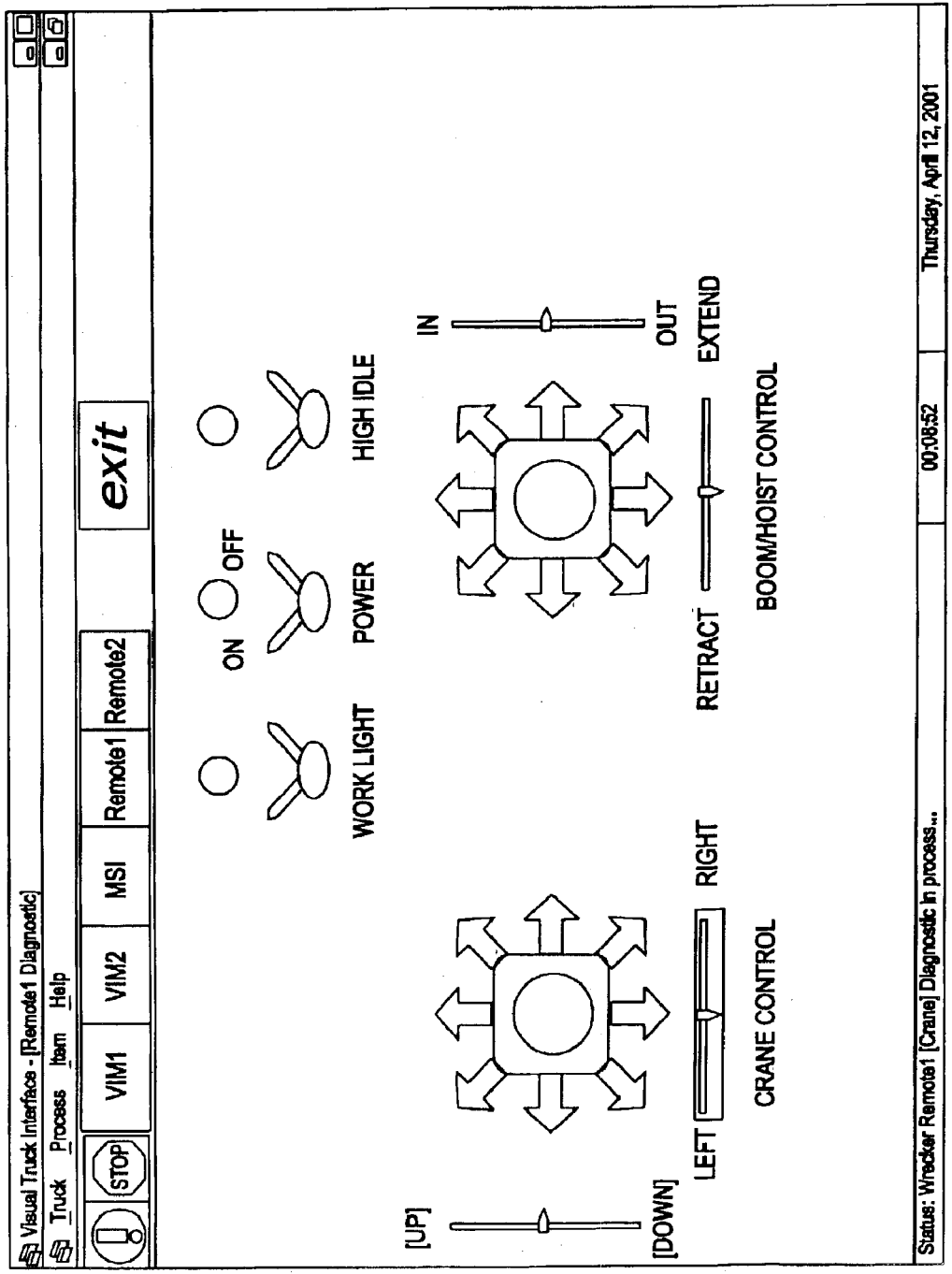
Figure 44:
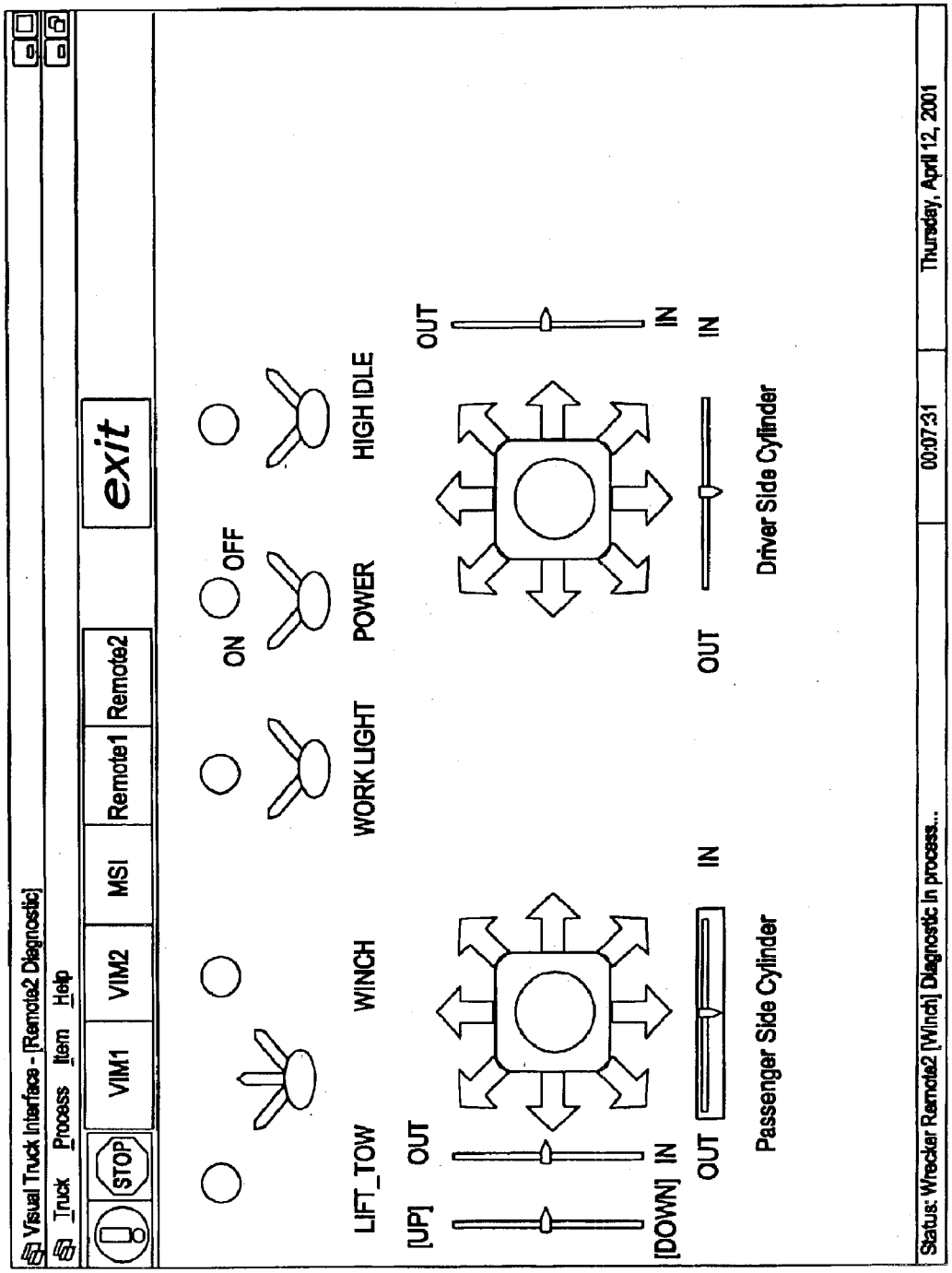
Figure 45:
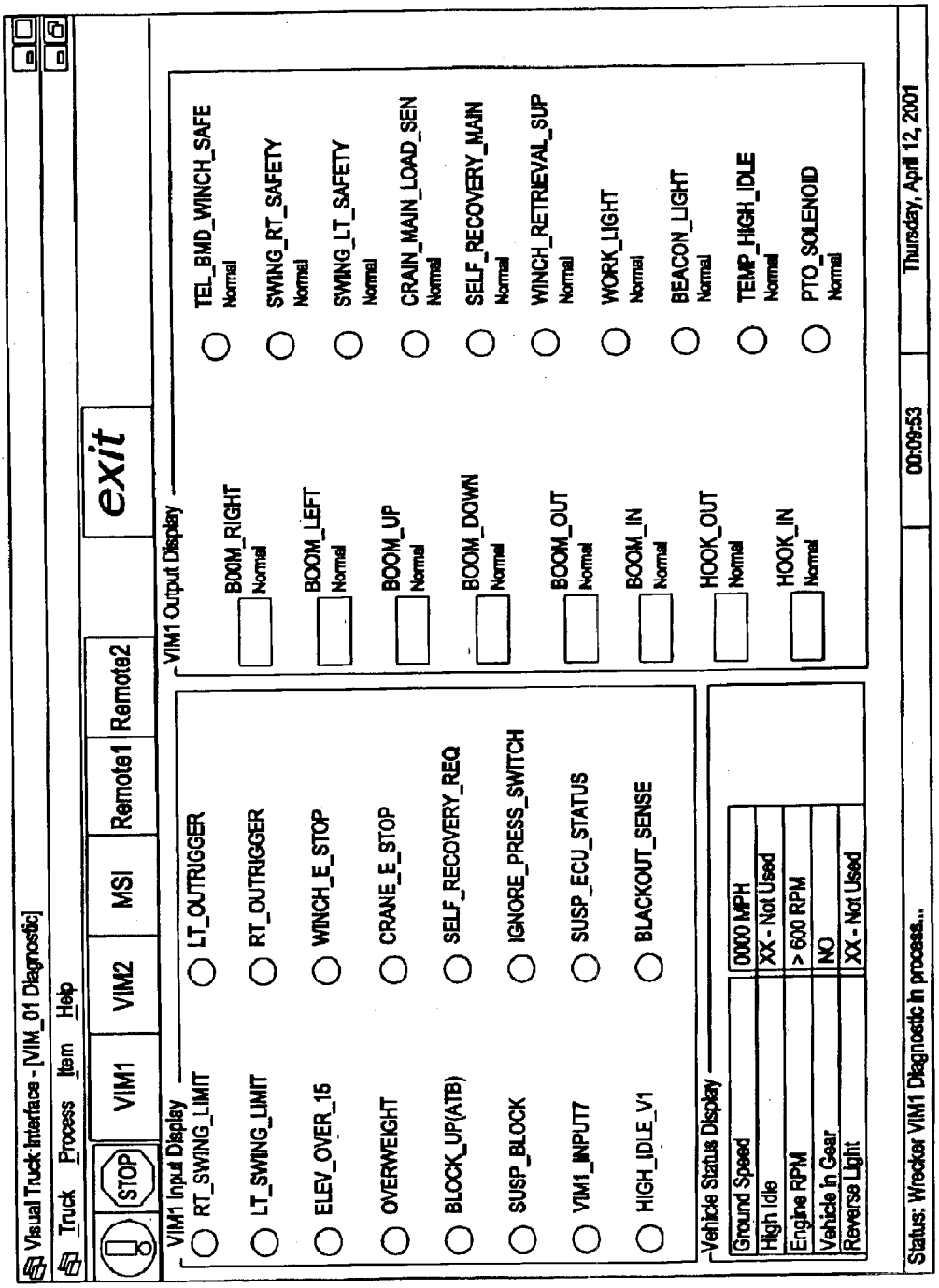
Figure 46:
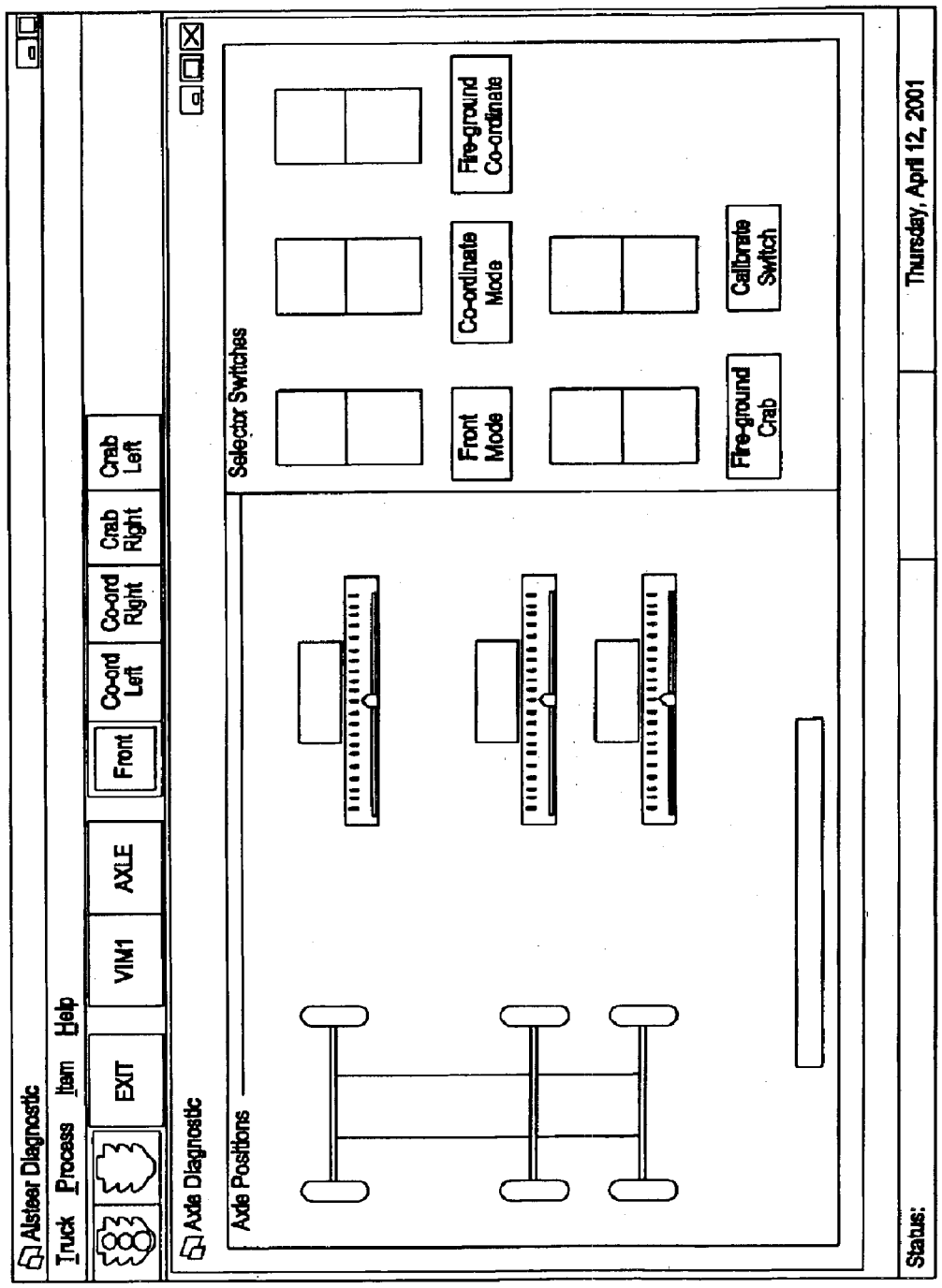
Figure 47:
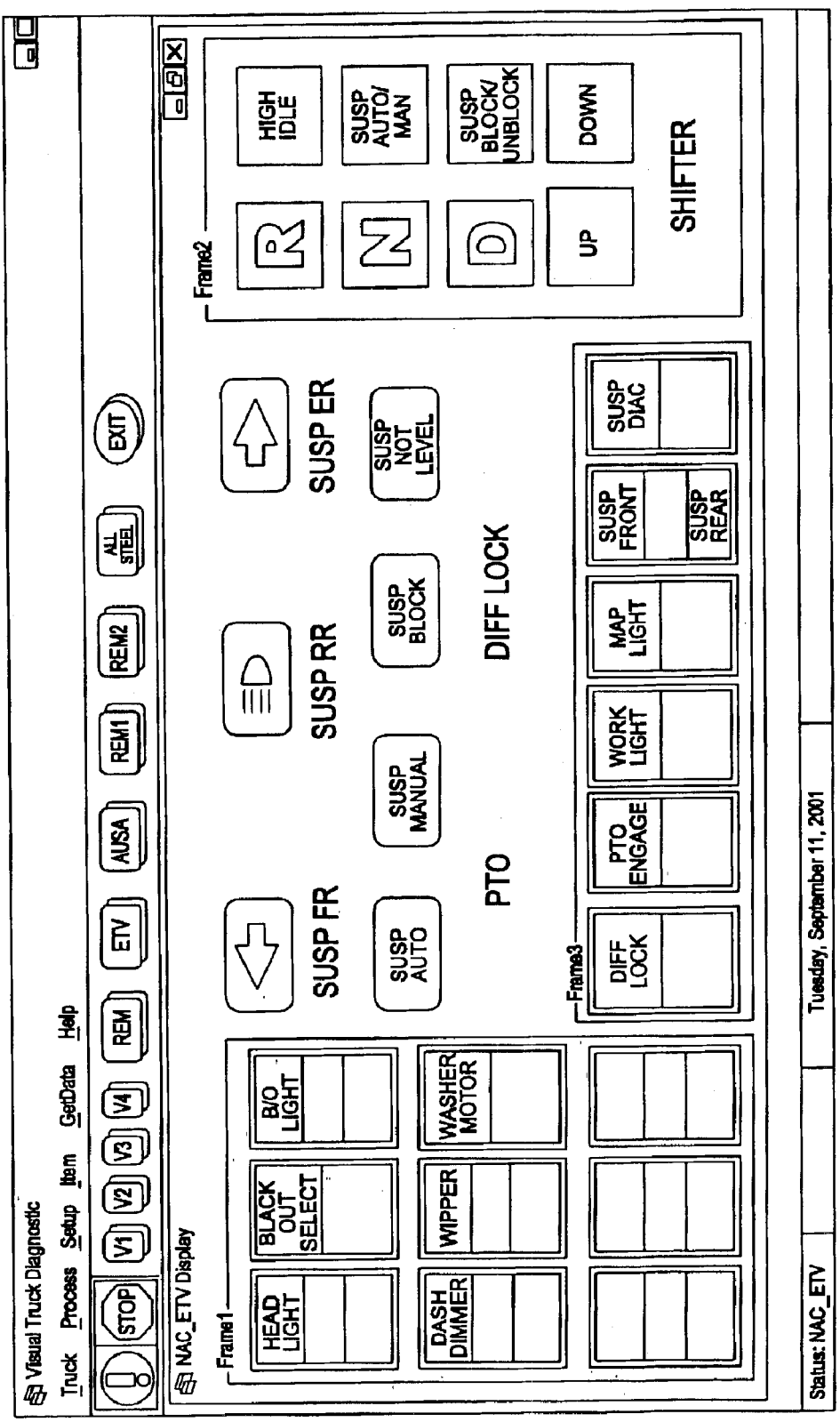

Referring now to FIG. 36, owners of equipment service vehicles often devise particular routes or other practices which are designed to enhance safety of the vehicle and the general public while maintaining overall efficiency. For example, the owner of the vehicle may have a certain route laid out with a pre-determined number of pickups and deliveries, which the operator of the vehicle can accomplish in a reasonable amount of time without driving the vehicle at an excessive speed or in an otherwise unsafe manner. Given that these routes have been laid out, it is often desirable to have a way of ensuring that the driver conforms to these routes. FIG. 36 is a flowchart showing the operation of the system 410 to detect non-conformance to a predetermined route.

At step 511 the GPS receiver 425 acquires GPS coordinates for the vehicle 411. At step 512, the GPS coordinates are compared with coordinates of travel path waypoints. Preferably, either the on-board computer system 422 or the fleet management computer system 437 includes a map of the predetermined travel paths (or a series of predetermined travel paths for different tasks). The map of the predetermined travel path is defined by a series of waypoints which in turned are a defined by a GPS coordinates for specific locations along the travel path. The travel path waypoints may be spaced at any distance; however, vehicle path monitoring will be more accurate to the extent the waypoints are closer together. Waypoint manager software may be used to define travels paths and download waypoints for the travel paths into the on-board computer system 422 or the fleet management computer system 437.

If the comparing step 512 is performed at the on-board computer system 422, then the waypoints are loaded into the on-board computer system 422. If the comparing step 512 is performed at the fleet management computer system 437, then the GPS coordinates acquired during step 511 are transmitted to the fleet management computer system 437 by way of the communication network 420. The advantage of performing the comparison at the vehicle is that it eliminates the need for constant communication between the vehicle and the dispatch station. The advantage of having the comparison performed at the dispatch station is that it ensures that the dispatch station is constantly updated with the vehicle position, making real time remote monitoring possible.

At step 513, the difference between the actual GPS coordinates with the nearest travel waypoint is compared with a pre-determined amount. If the difference is greater than a pre-determined amount, then this indicates that the operator has deviated from the pre-determined travel path. Each waypoint is provided with permissible lateral and longitudinal deviation values. Alternatively, single value may be used for simplicity. If the deviation is more than a pre-determined amount, then an alert message is sent to the operator of the dispatcher display at step 514.

If the difference is less than a pre-determined amount, then the distance between stored waypoints is computed (step 515) and the expected travel distance since the last waypoint is computed (step 516). Then, at step 517, it is determined whether the vehicle is progressing at an acceptable rate. This is used to determine, for example, whether the vehicle is on the side of the road. For example, the driver may have stopped the vehicle and, therefore, still on the travel path, but the driver is not progressing at an acceptable rate. By providing real time updates to the dispatcher, the dispatcher can immediately contact the driver to ascertain the source of the problem. Additionally, the dispatcher can make a determination as to whether another vehicle should be used to complete the driver's route.

If the driver is still on the route and is progressing at an acceptable rate, then everything appears to be in order and the current position, time, and speed are logged at step 518. The process of FIG. 36 is repeated at regular intervals. Assuming vehicle position monitoring is performed by the fleet management computer 437, it is possible to construct a map showing the positions of the vehicle 411 throughout the day. Thus, as the driver operates the vehicle, the position of the vehicle is logged at different times. Based on vehicle position as a function of time, a map is constructed showing the vehicle's position over time. Additionally, it is possible to log all of the I/O status information throughout the day. Thus, a complete picture of vehicle utilization of the course of a day (or other time period) may be obtained. Additionally, vehicle parameters may be monitored in real time to diagnose equipment malfunctions, click on the vehicle to obtain additional information. For example, vehicle loading may be ascertained to determine whether the vehicle 411 has spare capacity.

According to another embodiment, configurator software may be used to configure a control system such as control system 1412 for a vehicle. Different options are often made available to purchasers of equipment service vehicles and often the different available options include significantly different amounts and/or types of hardware and hence I/O devices. In order to facilitate design and manufacture of such vehicles in such situations, the configurator software provides a vehicle designer with the ability to custom-design a control system 1412 for a particular vehicle. The configurator software may be provided, for example, on a Microsoft® Windows™ platform and be provided with a typical windows user interface. The user interface may include various buttons representing interface modules and possibly also different types of I/O devices, such as any or all of the I/O devices mentioned herein. In one embodiment, an object-oriented approach is used such that each of the icons is embedded with intelligence regarding the particular type of module or device it represents.

In order to program a new control system 1412, the designer opens up a new file and, for example, clicks on an interface module button to drag an interface module into the designer's workspace. The designer then clicks on the interface module to open a dialog box that lists inputs and outputs. For example, for an interface module that supports fifteen inputs and fifteen outputs, the dialog box lists fifteen inputs and fifteen outputs. The operator is provided with the ability to configure the various inputs and outputs of the interface module via the dialog box. Alternatively or in addition, the operator may be provided with the ability to click and drag I/O devices into the workspace and establish connections between the interface modules and the I/O devices. Individual I/O devices may be provided names (e.g., "left front headlight"). For each of the inputs and outputs, information regarding processing to be performed by the interface module is specified by the operator and received by the configurator software. For example, for inputs, parameters such as switch debounce times, input filtering, input scaling, alarm limits, and other parameters may be specified. For outputs, parameters such as PWM frequencies, output scaling, limits, and other parameters may be specified. Also, for output devices, a control algorithm or logic may be specified. For example, for an analog output device, a control algorithm such as a PID algorithm may be specified that is a function of one or more of the parameters measured by various ones of the input devices. Likewise, for a digital output device, a Boolean equation may be specified that describes the on/off state of the output device as a function of the on/off states of one or more input devices coupled to the same interface module and/or to one or more remaining interface modules. The user interface may also restate the Boolean equation to the operator using device names assigned by the operator to provide a user friendly description. This process is repeated for all of the interface modules and all of the I/O devices that are to be included on the vehicle. The data that is generated using this process is stored in a file structure that can be uploaded into the interface modules located on the vehicle. In one embodiment, the data is stored as part of an Microsoft Access® data base and the Access data base is uploaded into the interface modules.

Each interface module is provided with a generic control program that is customized by the configuration data generated during the foregoing process. Thus, each interface module is provided with information regarding the types of I/O devices to which it is connected and the I/O processing that is to be performed in connection with those I/O devices. The firmware of the interface module executes against the configuration data. Notably, there is no need to compile code and load the compiled code onto the vehicle, because only data (in most cases) is being uploaded onto the vehicle. This allows vehicle firmware to be generic for all vehicles and allows the firmware to be updated at any time. After a new revision of firmware is uploaded, the interface module may use the new firmware to execute against the old (albeit still valid) configuration data.

Preferably, for unusual I/O devices, provision is preferably made to allow the user to upload specialized code for the I/O device into the interface module. Thus, for example, the user may be provided with the ability to write an executable program for a particular output device and then upload the program with the data for that particular output device. The executable code is then executed by the interface module during operation of the control system 1412. This provides greater flexibility to employ different types of output devices.

This arrangement is advantageous because it facilitates configuration of vehicle control systems. This arrangement also allows parts of the vehicle configuration to be configured and maintained independently. For example, it is possible to upgrade the firmware without affecting the vehicle configuration. Also, it is easier to provide different users or operators (e.g., designer, field service operator) with different levels of access.

E. Steering Control System

Figure 48:
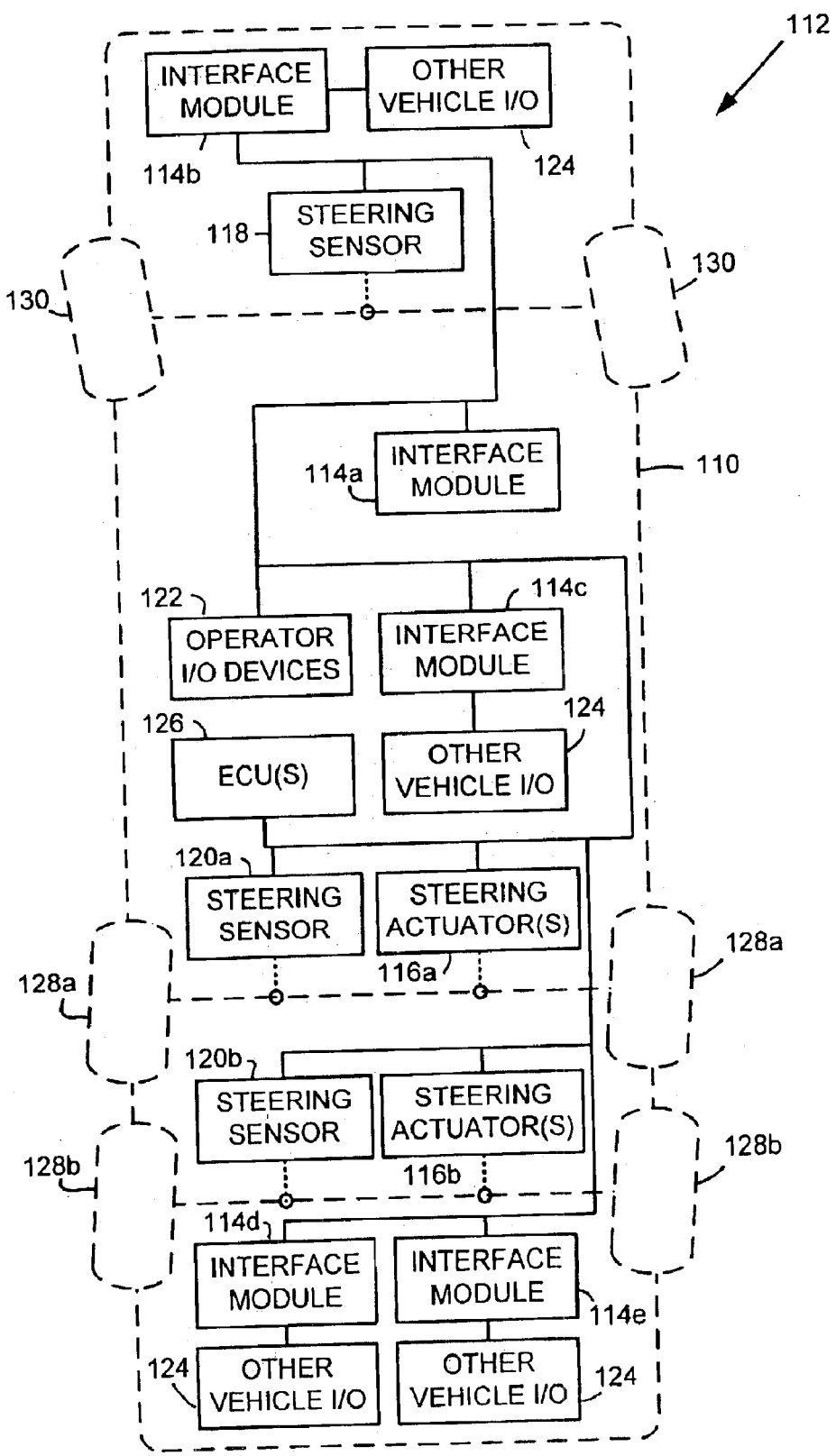
FIG. 48 is a block diagram showing a steering control system according to an embodiment of the present invention.
Figure 49:
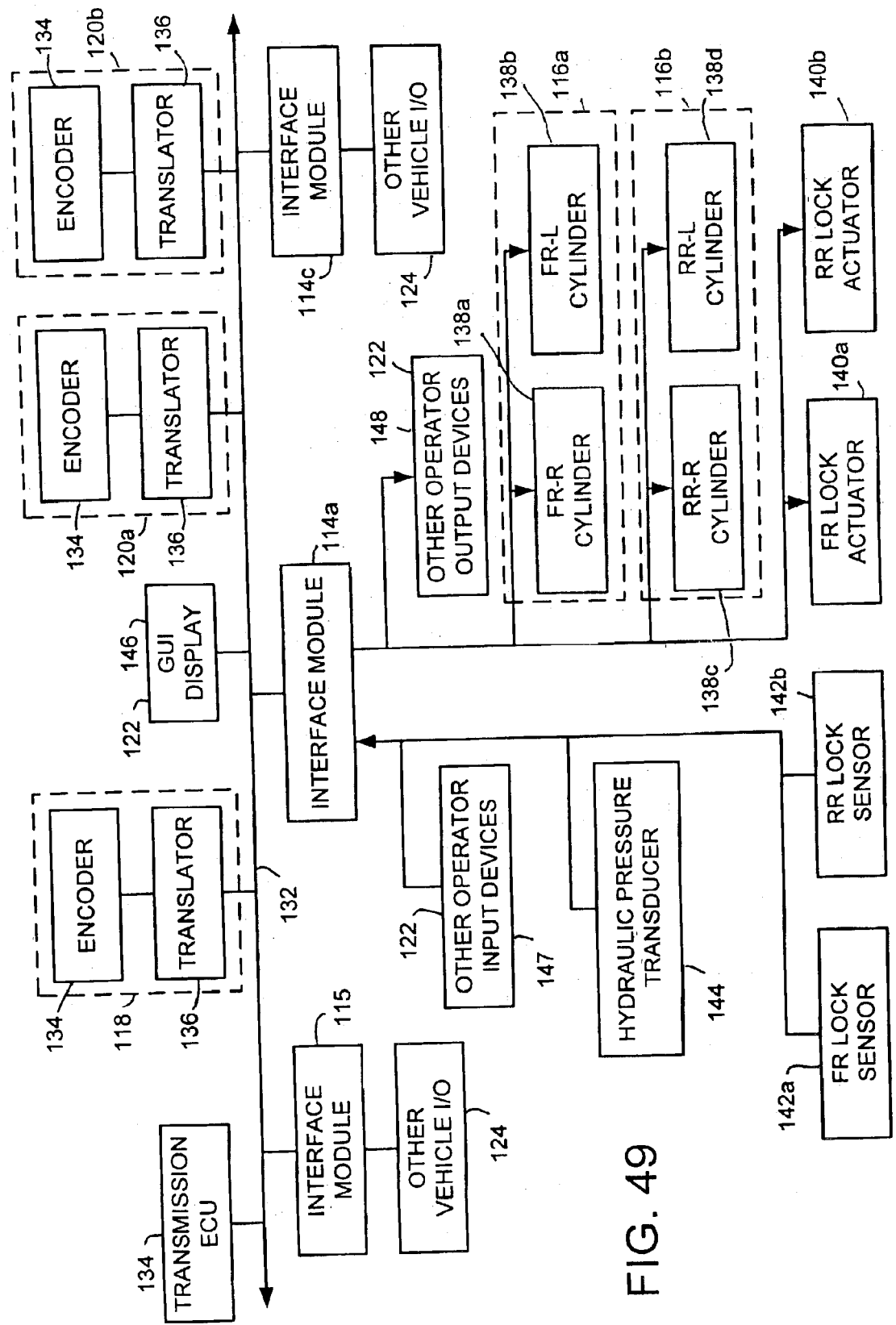
FIG. 49 is a block diagram showing selected aspects of the block diagram of FIG. 48 in greater detail.

Referring now to FIGS. 48–50, a vehicle 110 having a steering control system 112 according to another embodiment of the invention is illustrated. Referring first to FIG. 48, FIG. 48 is an overview of the preferred steering control system 112. The control system 112 includes a plurality of interface modules 114a–114e (collectively, "the interface modules 114"), front-rear steering actuator(s) 116a and rear-rear steering actuator(s) 116b (collectively, "the rear steering actuators 116"), front steering sensor 118, rear steering sensors 120a–120b (collectively, "the steering sensors 120"), operator I/O devices 122, other vehicle I/O devices 124, and one or more electronic control units 126 (e.g., engine ECU, transmission ECU, and so on). The control system 112 is used to control the steering angle of front-rear and rear-rear wheels 128a and 128b (collectively, "the rear wheels 128"), e.g., responsive to the steering angle of the front wheels 130.

In operation, the vehicle operator uses a steering wheel or joystick (not illustrated) that is mechanically coupled to the front wheels 130 to control the steering of the front wheels 130. The steering angle of the front wheels 130 is measured by a steering sensor 118, which transmits this information to the interface module 114a, which is assumed herein to be the particular one of the interface modules 114 operating as the controller for the steering control system 112. As described below, various modes of operation exist and in at least some of the modes of operation the interface module 114a uses stored control programs to generate a commanded steering angle for the rear wheels 128 as a function of the steering angle of the front wheels 130. The interface module 114a provides control signals to the steering actuators 116 configured to cause the steering actuators 116 to place the rear wheels 128 at the commanded steering angle. The actual steering angle of the rear wheels 128 is measured by the steering sensors 120, and the output of the steering sensors 120 is provided as a feedback signal to the interface module 114a. The interface module 114a implements a linear feedback control loop (e.g., a proportional-integral-derivative or "PID" control loop) to adjust the control signals provided to the steering actuators 116 to minimize the error between the commanded steering angle and the actual steering angles of the rear wheels 128.

In another embodiment, rather than use a mechanical link between the steering wheel and the front axle, an electronic link is used. Thus, the interface module 114a is used to generate steering angles for all wheels 128 and 130, and feedback control is used to minimize error between the actual steering angles of the wheels 128 and 130 and the commanded steering angles. Although the vehicle 110 is shown to comprise three axles, the control system 112 may also be used in connection with vehicles having fewer or additional axles.

In the embodiment of FIGS. 48–49, the control system 112 is implemented using the interface module 114a as a controller and the interface module 114a is one of a plurality of interface modules 114 that form an overall control system for the vehicle 110. The overall control system for the vehicle 110 is preferably constructed in accordance with the control architectures described elsewhere herein. Accordingly, as shown more clearly in FIG. 49, the interface modules 114 are connected to each other by way of a communication network 132. As previously described, the interface modules 114 are locally disposed with respect to the respective input and output devices to which each interface module is coupled so as to permit distributed data collection from the plurality of input devices and distributed power distribution to the plurality of output devices. Of course, each of the interface modules 114 may, in addition, be coupled to other non-local input devices and output devices, e.g., by way of the communication network 132. For example, the interface module 114a is connected to the steering sensors 118 and 120 by way of the communication network 132. Further, the control system 112 can also include input devices and output devices which are not connected to the interface modules 114.

The control system 112 is preferably configured such that the interface modules 114 are preferably identically constructed and programmed. Further, each of the interface modules 114 broadcasts I/O status information on the communication network 132, and each of the interface modules 114 uses the I/O status broadcasts to maintain an I/O status table 1520, as previously described. Based on the I/O status information stored in the I/O status table 1520 maintained by each respective interface module 114, the respective interface module 114 executes pertinent portions of the control programs to control the output devices to which it is directly connected. This also allows data from the steering control system 112 to be broadcast to other interface modules and devices for use by other parts of the overall vehicle control system. Also, data from the steering control system may be stored in the data logger 1485 to store information logged during a predetermined amount of time (e.g., thirty seconds) immediately prior to the occurrence of one or more trigger events (e.g., events indicating that the vehicle 110 has been involved in an accident), as previously described.

The other vehicle I/O devices 124 are I/O devices that are controlled by other ones of the interface modules 114 besides the interface module 114a. The vehicle 110 may be any of the vehicle types described elsewhere herein (e.g., fire truck, military vehicle, concrete placement vehicle, snow blower, and so on), and the other I/O devices may be I/O devices associated with those types of vehicles and/or generic I/O devices (e.g., headlights and dashboard switches) commonly found on most types of vehicles.

It may also be noted that the control system 112 may be implemented without necessarily incorporating the control architectures described elsewhere herein. For example, rather than the interface module 114a, a stand-alone controller may be used. Most/all of the features described herein (e.g., those described below relating the graphical user interface, the error reporting system, and other enhancements) may also be implemented in a system that uses a stand-alone controller rather than an interface module that is networked with other interface modules.

The control system 112 is shown in greater detail in FIG. 49. As previously indicated, the interface module 114a is connected to the other interface modules 114 and the steering sensors 118 and 120 by way of the communication network 132. As shown in FIG. 49, the steering sensors 118 and 120 each comprise an encoder 134 and a translator 136. The encoders 134 may for example be absolute encoders and are coupled to axles of the vehicle 110 to measure the steering angles of the wheels 128, 130. The translators 136 operate to convert the signals from the encoders 134 into J1939-compatible message for transmission on the communication network 132. Use of the encoders 134 is advantageous because the encoders 134 do not require adjustment but rather allows the sensor to use its current position to correspond to the straight ahead position of wheels 130, 128. Also, in the event that one of the encoders 134 fails, it typically either stops sending messages to the translator or it sends messages that are of a random count and easily deciphered as an indication that the encoder 134 has failed. The control system 112 recognizes that the encoder 134 has failed and displays a message on the graphical user interface that the details the location of the encoder and the fact that it has failed. Also, in the event of an encoder failure, the control system 112 may be configured to automatically change the steering mode to front mode only.

Also connected to the communication network 132 is the transmission ECU 135 (which is one of the ECUs 126 of FIG. 48). The transmission ECU 135 provides the interface module 114a with information regarding the speed of the vehicle 10. In other embodiments, this information may be provided by the engine or anti-lock brake system.

The steering actuators 116 comprise a plurality of hydraulic cylinder solenoids including a left front-rear cylinder solenoid 138a, a right front-left cylinder solenoid 138b, a left rear-rear cylinder solenoid 138c, and a right rear-rear cylinder solenoid 138d. The solenoids 134 are connected to the interface module 114a and to four (left/right, front/rear) cylinders respectively associated with each of the wheels 128. Alternatively, one solenoid and one cylinder may be used for each axle. In yet another embodiment, one solenoid and one cylinder is provided for each wheel and no tie rod is used, allowing the steering angle of each wheel to be independently controlled. The solenoids 134 may for example receive a PWM signal from the interface module 114a to control hydraulic pressure applied to the four and in turn control the steering angle of the wheels 128. In one embodiment, a temperature sensor is used to measure the temperature of the hydraulic fluid, and the PWM signals applied to the solenoids 134 are compensated to provide consistent operation of the hydraulic cylinders over a range of temperatures/oil viscosities.

FIG. 49 also depicts lock actuators 140a and 140b and lock sensors 142a and 142b which are not specifically depicted in FIG. 48. The lock actuators 140a and 140b are used to insert or remove a locking pin that locks the front/rear rear axles. As described below, in certain modes of operation, the rear wheels 128 are not steered and the rear axles are locked in the straight-ahead position. In one embodiment, if one cylinder per axle is used, the lock actuators 140 (and corresponding locking pins), the encoders 134, and the cylinders 138 may be located on one side of the vehicle to reduce mechanical slippage between these devices. The lock sensors 142a and 142b provide feedback to confirm that the rear axles are locked. In one embodiment, the sensors 142a and 142b comprise limit switches. In another embodiment, the sensors 142a and 142b comprise proximity switches that sense proximity of the locking pin. An advantage of using proximity switches for feedback is that proximity switches detect the actual position of the locking pin. As a result, if the vehicle 110 is out of calibration (the encoder does not accurately indicate the straight ahead wheel position), then the locking pins will not seat properly and this will be detected by the proximity sensors. Alternatively, a new centered (or "straight ahead")

encoder value could be determined by cycling the system until the locking pin seats properly and then using the encoder value at which the locking pin seats as the new centered value. In addition to or instead of proximity sensors, air pressure switches that change state when air pressure is applied to the locking mechanism may also be used (e.g., for diagnostics).

The interface module 114a confirms that the rear wheels 128 are centered before engaging the lock actuators 140a and 140b. Also shown in FIG. 49 is a hydraulic pressure transducer 144, which provides feedback to the interface module 114a regarding pressure in the hydraulic system used for steering.

Finally, FIG. 49 also depicts the operator I/O devices 122 of FIG. 48 in greater detail. The operator I/O devices include a graphical user interface (GUI) display 146. The display 146 is connected to the communication network 132 and may, for example, be located in a driver compartment of the vehicle 110 such as by being mounted on the dashboard. The display 146 may be a liquid crystal display, a VGA or SVGA display, a heads up display system, or other display system. The display 146 preferably comprises one or more operator input devices to receive operator inputs, such as a plurality of keys/pushbuttons, touch screen system, voice recognition system, and so on. In one embodiment, a display with five keys/pushbuttons for operator input is used. The operator input devices are used to scroll through menu options or screen displays, set values, and so on. In another embodiment, the display 146 may provide the operator with the ability to view or manipulate I/O status information from other interface modules 114 and electronic control units 126 in addition to the interface module 114a associated with the steering control system 112.

Other operator input devices 147 and output devices 148 may also be provided. The other input devices 147 may comprise, for example, a calibration/learn switch to set a calibration value, a crab alarm switch, a key switch to activate the control system 112, a fool-operated mode switch, and so on. The output devices 148 may comprise, for example, other actuators (e.g., automatic tire chain actuators), lights, indicators, alarms, and so on.

The interface module 114a may also send and receive other messages on the communication network 132. For example, an interface module 115 is shown to be connected to other vehicle I/O devices 124. The interface module 115 may be similar to the translators 136 in that its functionality is limited to receiving/transmitting J1939-compatible messages on the communication network 132. Thus, the interface module 115 may be connected to mode selector switches, and transmit the input status information for the mode selector switches to the interface module 114a. The interface module 114a then operates as though the mode selector switches are connected to the interface module 114a via dedicated, hardwired communication links. For output devices, the interface module 114a may determine the desired output state for any output devices connected to the interface module 115 and transmit this information to the interface module 115.

In another embodiment, in addition to the display 146 and other operator I/O devices 147, 148, the interface module 114a is provided with a wireless (e.g., Bluetooth) interface that allows the interface module 114a to send and receive data from a wireless handheld computer, such as a personal digital assistant ("PDA"). The PDA provides functionality that is redundant to the display 146 and other operator I/O devices 147, 148, but provides this functionality in a manner that allows the operator to interact with the control system 112 from outside the vehicle, e.g., while performing calibration or diagnostic procedures. Preferably, the PDA is able to manipulate and examine all operator I/O devices on the vehicle 110 associated with other ones of the interface modules 114, for example, to allow the operator to start the vehicle using the PDA. Rather than using a PDA, a removable switch panel with cable link to the vehicle may also be used.

In yet another embodiment, remote steering capability may be provided. For example, for a fire fighting vehicle, a wireless joystick and GUI display may be provided that allows an operator to control movement of the vehicle 110 from an aerial basket of the fire fighting vehicle (particularly if the vehicle is provided with outriggers comprising hard rollers instead of pads). Again, the wireless capability may be achieved by providing the interface module 114a and the wireless operator device with corresponding wireless communication interfaces (e.g., Bluetooth communicators). As another example, in the context of a trailered vehicle, the ability to steer the vehicle remotely from the front cab compartment provides an operator with the ability to control steering from a trailer portion of the vehicle, e.g., to control steering of the rear wheels only. Such features may be implemented for example by having the control system 112 control steering for all wheels directly responsive to operator inputs (as opposed to having the operator mechanically control steering of the front wheels using a steering wheel and having the control system 112 control steering of the rear wheels responsive to the steering of the front wheels).

Referring to FIG. 50, the control system 112 has several modes of operation including a front mode of operation, a coordinated mode of operation, and a crab mode of operation. The mode may be controlled by the interface module 114 responsive to the mode switch positions selected by the operator. The mode switches can be moved at any time; however, the mode changes will not become effective until the front axle crosses through center (straight-ahead). Thus, the new mode must first be selected and then the front axle must be steered through its center position for the new mode to become effective.

In the front mode of operation, the operator steers the front wheels 130 using a steering wheel or joystick. The lock actuators 140 engage and the rear wheels 128 are locked in the straight-ahead position, and only the front wheels 130 steer when the steering wheel is turned.

In the coordinated mode of operation, the interface module 114a controls the rear wheels 128 so as to turn in the opposite direction of the front wheels 130. A desired rear wheel steering angle may be stored in the interface module 114a as a function of the front wheel steering angle, such that for any given measured front wheel steering angle a desired rear wheel steering angle may be determined. The relationship between the rear wheel steering angle and the front wheel steering angle may also be stored in a look-up table or embodied in an equation as a function of speed. Other information may also be taken into account, such as information from one of the other ECUs 126 or one of the other interface modules 114. For example, if one of the ECUs 126 is an anti-lock brake system ECU, traction information may be used to limit or prevent sharp steering maneuvers when traction conditions are low. Information from accelerometers may also be used instead of interfacing with the anti-lock brake system ECU. Likewise, vehicle loading information may be used to similarly limit or prevent sharp steering maneuvers when the center of gravity of the vehicle 110 is believed to be higher than normal (e.g., because a fluid tank carried by the vehicle 110 is full).

Figure 51A:
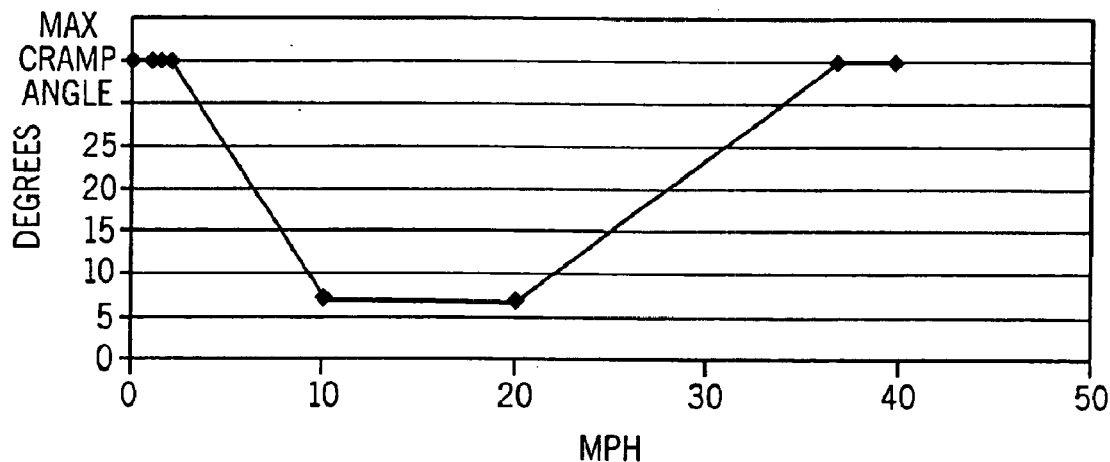
FIGS. 51A–51B is a deadband versus speed graph for the steering control system of FIG. 48.

Preferably, a deadband exists in the steering relationship, such that the interface module 114a does not turn the rear wheels 128 until after the front wheels are steered at least ±5° and preferably ±7° from a calibrated center, depending on speed (see FIG. 51A). The deadband is then the number of degrees the operator must turn the front wheels 130, right or left, before the rear wheels 128 also turn. As shown in FIG. 51A, the deadband and speed relationship from 0–10 mph are programmed to minimize the amount of rear-end-swing when making a sharp 90 degree turn. From 0–2 mph, the deadband is at its maximum and the rear axle will not steer. From 2–10 mph, the deadband decreases to ±7°. From 10–20 mph the deadband is fixed at ±7°. Once vehicle speed reaches 20 mph, the deadband progressively increases as the speed increases to reduce the possibility of making too sharp a turn. When speeds over thirty-eight mph are reached, the control system 112 reverts to front mode and engages the lock actuators 140 once the front wheels 130 reach calibrated center. In an alternative embodiment, position of the rear wheels 128 is used to determine when to revert to front mode. The control system 112 returns to coordinated mode when the vehicle 110 slows to speed below thirty-eight mph. The control system 112 steers the rear wheels 128 in coordinated mode after the axles locks are disengaged and the front axle reaches a value of at least ±7° difference from calibrated center, depending on speed. The steering angle of the rear wheels 128 is then proportional (or otherwise related) to the number of degrees that the operator steers the front wheels 130 beyond the programmed deadband for any given speed.

Figure 51B:
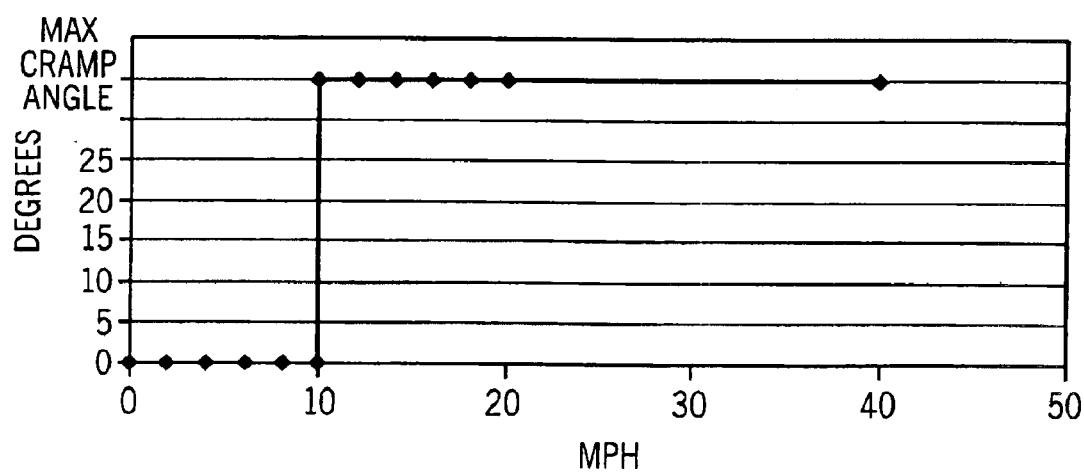

In the crab mode of operation, the interface module 114a steers the rear wheels 128 with a turn ratio of 1:1 with the front wheels 130. The rear wheels 128 turn in the same direction as the front wheels 130. When front axle crosses calibrated center and the crab mode of operation is selected, the control system 112 changes the steering configuration into crab mode. The rear cramp angles for the crab mode are capable of angles as high as 20°. The deadband graph that the interface module 114a follows for the crab mode is shown in FIG. 51B with a deadband of ⅓° on either side of calibrated center. Preferably, an audible alarm sounds when this mode is selected. When a speed greater than 6 mph is achieved and the front axle crosses calibrated center the interface module 114a switches to front mode, centers the rear wheels 128 and engages the lock actuators 140 to lock the rear wheels 128 in the straight ahead position. When a speed less than 5 mph is achieved and the front axle crosses calibrated center the interface module 114a returns to crab mode.

As previously noted, in one embodiment, one solenoid and one cylinder are provided for each wheel and no tie rod is used, allowing the steering angle of each wheel to be independently controlled. If this configuration is employed, smooth crab operation can be obtained by eliminating the Ackerman steer angles in the crab mode of operation.

Other modes of operation may also be employed. For example, additional coordinated or crab modes of operation may be employed that provide different steering characteristics for specialized modes of operation. This may be useful in situations where the vehicle 110 is of a particular type (e.g., fire fighting vehicle, military vehicle, concrete placement vehicle, and so on) and the specialized modes of operation aid the operator in performing various specialized maneuvering tasks that the particular type of vehicle is likely to encounter.

Figure 52:
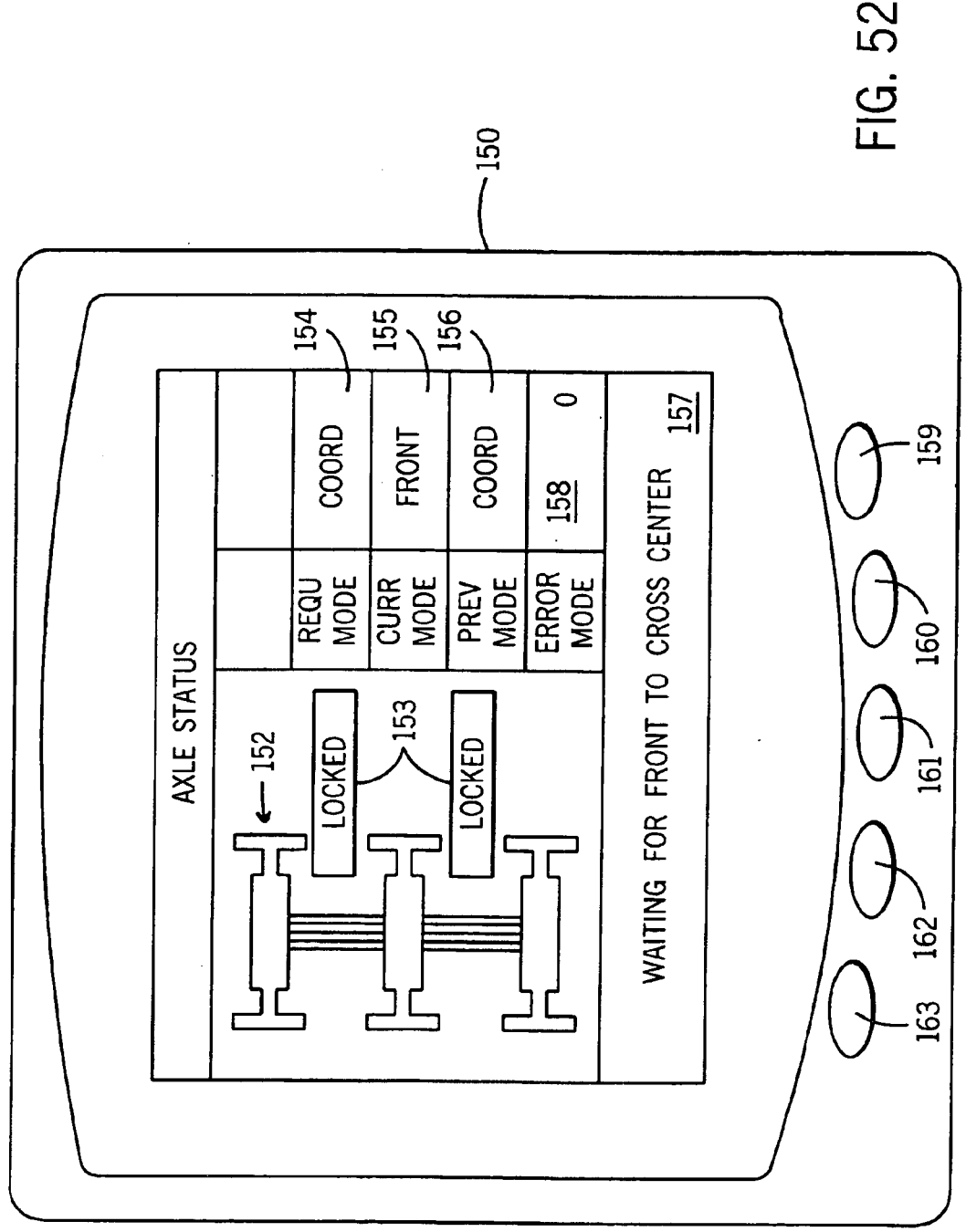
FIGS. 52–54 are screens of a graphical user interface for the steering control system of FIG. 48.
Figure 53:
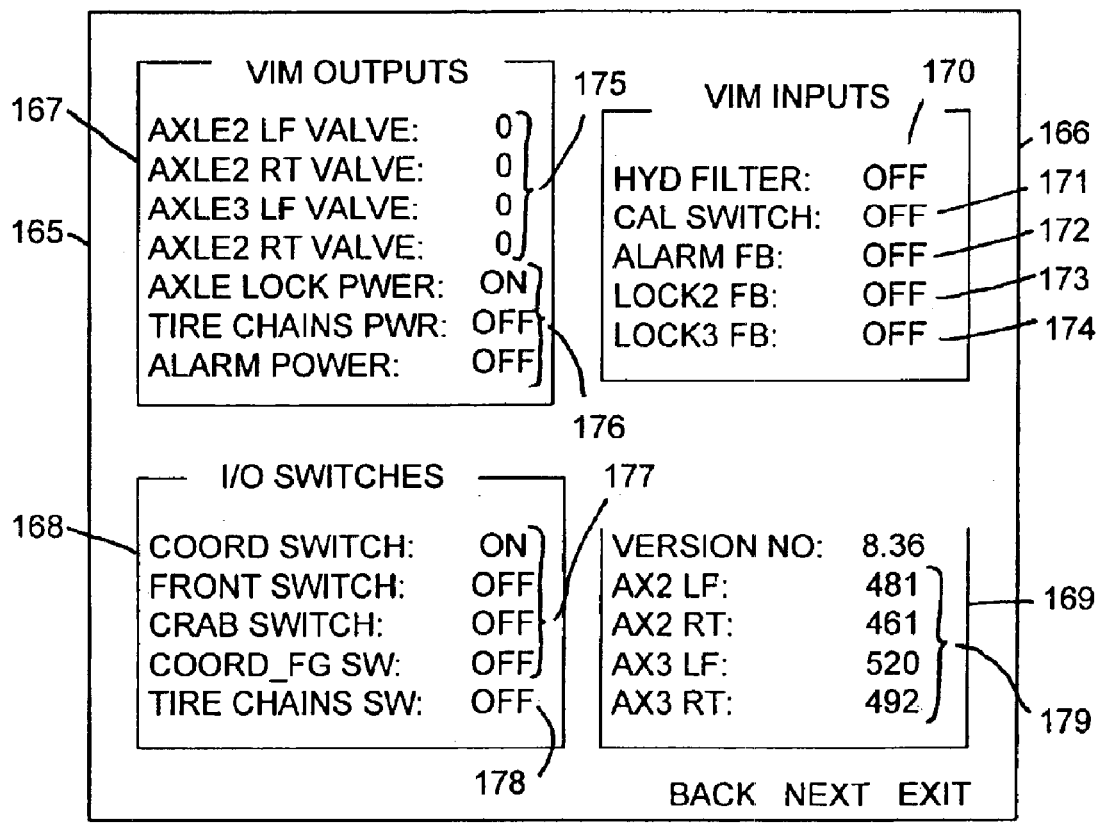
Figure 54:
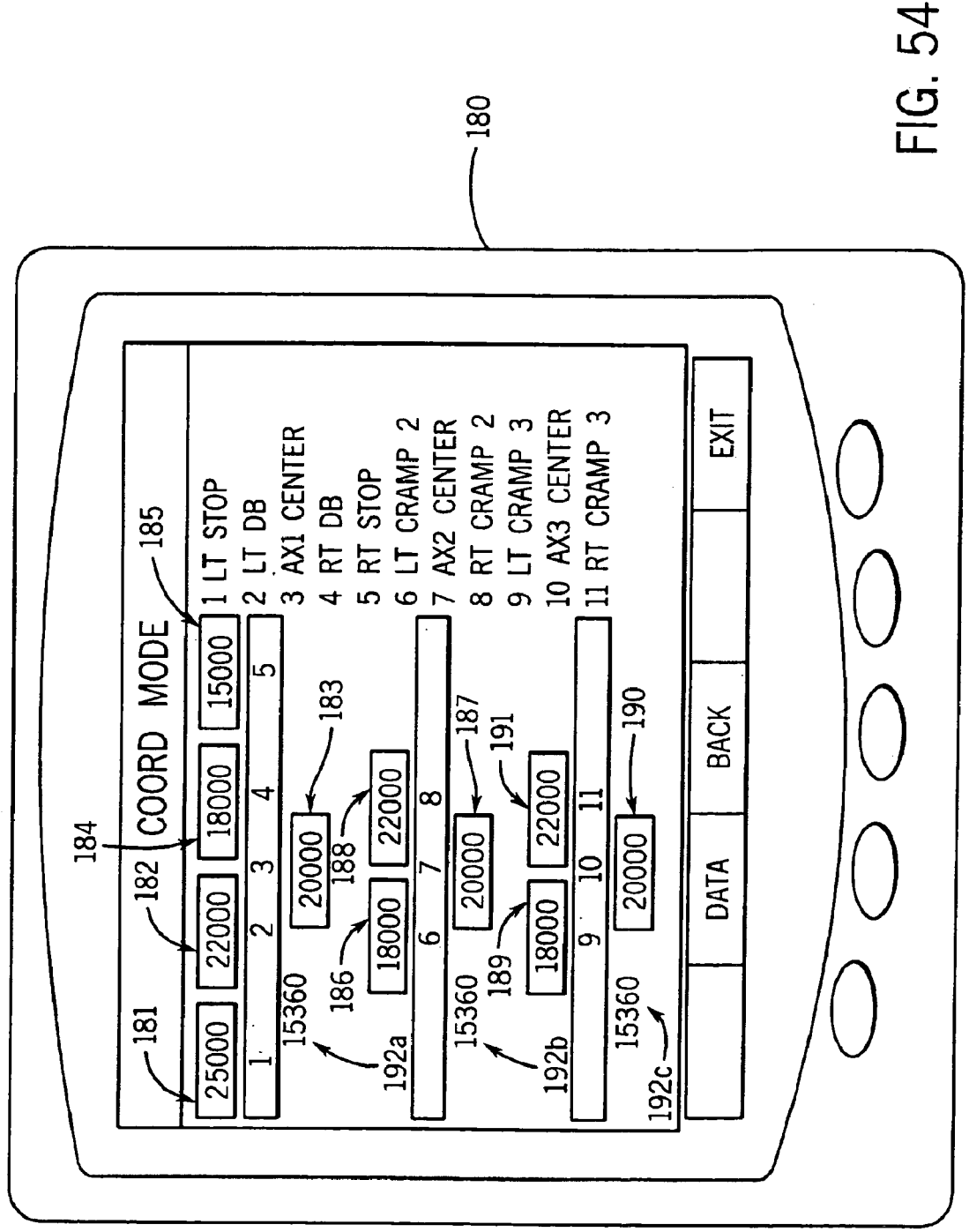

Referring now to FIGS. 52–54, a graphical user interface useable in connection with the control system 112 will be described in greater detail. FIGS. 52–54 are a series of screen shots that may be provided to an operator using the display 146 during operation of the control system 112. FIG. 52 is an axle status screen 150 that may be displayed after the control system 112 is first powered up and may be the "default" screen during normal operation of the control system 112. The screen 150 displays a chassis outline 152 or other representation of the vehicle 110 with the front of the chassis being located towards the top of the screen. The wheels of the chassis outline 152 turn in accordance with the wheels 128, 130 of the vehicle 110. Fewer or additional wheels may be displayed if the vehicle 110 has a different number of wheels than shown in FIG. 48. The screen 150 also includes axle lock status windows 153 which display the state of the lock actuators 140a and 140b. When the lock actuators 140a are disengaged, the windows read "UNLOCKED"; when the lock actuators are engaged the windows read "LOCKED." The upper window is the lock status for the lock actuator 140a and the lower window is the lock status for the lock actuator 140b. The information in the windows 153 may be displayed based upon the control signal provided to the lock actuators 140a and 140b, or preferably, based on the information received from the lock sensors 142a and 142b.

The screen 150 also includes a requested mode window 154 which displays the steering mode that the operator has selected. In FIG. 52, the coordinated mode is shown as being selected. The screen 150 also includes a current mode window 155 which displays the steering mode in which the control system 112 is actually operating. For example, as previously indicated, in an overspeed condition (when the vehicle is traveling at speeds above a predetermined level, such as 38 mph), the control system 112 operates in the front mode even though another mode may be selected. The screen 150 also includes a previous mode window 156 which displays the steering mode that the control system 112 will return to when the vehicle 110 slows down from an overspeed condition. The screen 150 also includes a message box 157 which displays special messages to the operator such as what conditions must be satisfied to change a requested mode to a current mode (e.g., "waiting for front to cross center"), error code details, and calibration instructions. The screen 150 also includes an error code window 158 which displays an error code number in the event of an error condition. Table III is an example of a list of error codes that may be displayed to the operator.

TABLE III

Error Code Chart

| ERROR CODE | PROBABLE CAUSE OF CODE |
|---|---|
| 0 | No errors currently on system (clear screen) |
| 10 | Bad CRC from EPROM |
| 11 | Fireground alarm feedback missing |
| 12 | No mode switches selected |
| 13 | More than one mode switch selected |
| 14 | # Axles and translators mismatched |
| 15 | Wheel base is not within range |
| 16 | Truck ID invalid |
| 17 | Encoder 1 out of range |
| 18 | Encoder 2 out of range |
| 19 | Encoder 3 out of range |
| 20 | Axle 2 moved too much with pwm ON |
| 21 | Axle 3 moved too much with pwm ON |
| 22 | Axle 2 moved too much with pwm OFF |
| 23 | Axle 3 moved too much with pwm OFF |
| 24 | Axle 2 encoder spike counter exceeded |

TABLE III-continued

Error Code Chart

| ERROR CODE | PROBABLE CAUSE OF CODE |
|---|---|
| 25 | Axle 3 encoder spike counter exceeded |
| 31 | Speed message not received |
| 32 | Display message not received |
| 33 | I/O module message not received |
| 34 | Axle 2 lock stuck |
| 35 | Axle 3 lock stuck |
| 36 | Both locks stuck |
| 41 | Axle 1 translator message not received |
| 42 | Axle 2 translator message not received |
| 43 | Axle 3 translator message not received |
| 44 | Encoder did not move during axle 2 right output |
| 45 | Encoder did not move during axle 2 left output |
| 46 | Encoder did not move during axle 3 right output |
| 47 | Encoder did not move during axle 3 left output |
| 48 | Axle 1 encoder disconnected |
| 49 | Axle 2 encoder disconnected |
| 50 | Axle 3 encoder disconnected |
| 51 | Axle 3 right exceeded 80% range |
| 52 | Axle 3 left exceeded 80% range |
| 53 | Axle 2 right exceeded 80% range |
| 54 | Axle 2 left exceeded 80% range |
| 61 | Error in calculating turn direction |
| 62 | Error in mode selection |
| 63 | Divide by zero in Coord mode |
| 64 | Hydraulic filter is clogged |
| 65 | Battery voltage is low |
| 71 | OUTPUT 1-Axle 2 left short to ground |
| 72 | OUTPUT 1-Axle 2 left short to battery |
| 73 | OUTPUT 1-Axle 2 left open load |
| 75 | OUTPUT 2-Axle 2 right short to ground |
| 76 | OUTPUT 2-Axle 2 right short to battery |
| 77 | OUTPUT 2-Axle 2 right open load |
| 79 | OUTPUT 3-Axle 3 left short to ground |
| 80 | OUTPUT 3-Axle 3 left short to battery |
| 81 | OUTPUT 3-Axle 3 left open load |
| 83 | OUTPUT 4-Axle 3 right short to ground |
| 84 | OUTPUT 4-Axle 3 right short to battery |
| 85 | OUTPUT 4-Axle 3 right open load |
| 87 | OUTPUT 5-Lock valve short to ground |
| 88 | OUTPUT 5-Lock valve short to battery |
| 89 | OUTPUT 5-Lock valve has open load |
| 127 | OUTPUT 15-Tire chain short to ground |
| 128 | OUTPUT 15-Tire chain short to battery |
| 129 | OUTPUT 15-Tire chain has open load |
| 135 | OUTPUT 17-Alarm power short to ground |
| 136 | OUTPUT 17-Alarm power short to battery |
| 137 | OUTPUT 17-Alarm power has open load |

The probable cause of the error code may, for example, be displayed in the message box 157. Preferably, the display 146 provides the operator with the error code and accompanying user-friendly message as soon as an error condition is detected.

Preferably, the control system 112a has built in diagnostic error code memory and recall functions which allow error codes provided to the operator to be stored in non-volatile memory. The display 146 preferably stores the last twenty error codes that have been registered. The error codes preferably remain in memory even if the vehicle power is disconnected for an extended period of time or the controller is removed from the vehicle.

It may be noted that the error codes in Table III may be generated through the use of intelligent devices and additional sensors. For example, the use of translators 136 which provide J1939 messaging rather than a hardwired sensor (e.g., potentiometer) facilitates identifying the source of a problem. It is possible to determine that a translator has become disconnected because it fails to provide J1939 messages, as opposed to a failing encoder which may produce a different result. Additionally, sensors such as the lock sensors 142 and the hydraulic pressure transducer 144 also facilitate diagnostics. Further, comparison of sensed values for consistency with each other and with expected values may be used to generate the error codes. For example, the steering angles provided by the steering sensors 118 and 120 may be compared with each other and with what is expected (e.g., based on PWM signals provided to the steering actuators 116, based on mechanical construction of the vehicle 110, and so on) to check for consistency with expected values. Also, the steering sensors 118 may be used to check for an off-tracking condition. Early diagnosis allows faulty devices to be repaired or replaced in a timely fashion.

As previously indicated, in the preferred embodiment, the display 146 includes a plurality of operator input devices. As shown in FIG. 52, the display 146 includes five pushbuttons 159–163. An enter/exit pushbutton 159 is used for entering and exiting the screen adjusting mode, and may for example be a different color than the other pushbuttons 160–163. A first screen adjusting pushbutton 160 is used to move forward to an input/output screen 165 (see FIG. 53), and is also used to increase contrast in the screen-adjusting mode. A second screen adjusting pushbutton 161 is used to move back to the input/output screen 165 or the axle status screen 150, and is also used for decreasing contrast in the screen-adjusting mode. A third screen adjusting pushbutton 162 is used to update the display data. The pushbutton 162 is only useable to update data when viewing the axle status screen 152. The pushbutton 162 can also be used to increase the screen back lighting in the screen-adjusting mode. A fourth screen adjusting pushbutton 163 is used to decrease the screen backlighting in the screen-adjusting mode.

Referring now to FIG. 53, FIG. 53 is an input/output screen 165 which shows the state of the input and output circuits from the interface module 114a and the interface module 115 (connected to the mode selector switches). The screen 165 is useful for troubleshooting and is not typically used during normal operation of the control system 112. The input/output screen 165 may be accessed using one of the pushbuttons 158–163.

The screen 165 comprises an interface module input section 166, an interface module output section 167, an I/O switch section 168, a steering valve threshold section 169. The input section 166 displays hydraulic filter input information 170 from a differential pressure switch (transducer 144) on a high-pressure filter. The hydraulic filter input is on when the hydraulic filter is clean and oil is flowing freely and is off when the filter is plugged and oil flow is restricted, or there is a break in continuity between the filter and the interface module 114a. The input section 166 also displays calibrate switch input information 171 from a calibrate switch input. The input normally reads "OFF" but changes to "ON" when the calibration switch is actuated. The input section 166 also displays alarm feedback input information 172. This input reads "OFF" when the crab alarm is off and reads "ON" when the crab alarm is sounding. The input section 166 also displays lock feedback information 173 and 174. The lock feedback information 173 reads "OFF" when the lock actuator 140a on the forward rear axle of a tandem rear axle truck is disengaged and reads "ON" when the lock actuator 140a is engaged. The lock feedback information 174 reads "OFF" when the lock actuator 140b on the rear most axle of a tandem rear axle truck is disengaged and reads "ON" when the lock actuator 140b is engaged. Preferably, the state of the lock actuators 140a and 140b is provided by the lock feedback sensors 142a and 142b.

The interface module output section 167 displays information 175 regarding steering hydraulic valves associated with the solenoids 138a–138d as well as information 176 regarding other outputs. The four steering valve outputs displays zero when the valve is off or not steering, and displays a non-zero number when the valve is steering. The low number varies depending on the learned threshold for that valve but may for example be in a range between 350 and 550. The number increases as the hydraulic effort required to make a turn increases. The number displayed at each valve changes rapidly and is used primarily as an indicator that the valve is on. When a number is displayed, this means voltage is being sent to the valve. The solenoid coil is energized, shifting the spool in the valve, causing the rear axle to turn. When making a right turn in coordinated mode, the left steering valves turn on so that the rear wheels 128 turn in the opposite direction of the front wheels 130 to reduce the turning radius. The axle 2 left valve is for the left valve on the forward rear axle (corresponding to the solenoid 138b). The axle 2 right valve is for the right valve on the forward rear axle (corresponding to the solenoid 138a). The axle 3 left valve is for the left valve on the rear most axle of the vehicle 110 (corresponding to the solenoid 138d). The axle 3 right valve is for the right valve on the rear most axle of the vehicle 110 (corresponding to the solenoid 138c).

The information 176 includes information regarding an axle lock power output, a tire chain power output (for an automatic tire chain actuator), and an alarm power output. The axle lock power output is an output to the electric over air lock valve(s). This output reads "ON" when the locks are unlocked and "OFF" when they are locked. The tire chain power output is an output that engages automatic tire chains. This output is "ON" when the tire chains are engaged and "OFF" when the tire chains are disengaged. The alarm power output is an output to the crab alarm. This output is "ON" when the crab alarm is on and is "OFF" when the crab alarm is off.

The I/O switch section 168 displays information 177 and 178 regarding the states of various operator input devices. For example, as previously indicated, mode selector switches and other switches may be connected to the interface module 115, and the I/O switch section 168 may be used to display information from the interface module 115. Such information may therefore include information 177 from a foot operated mode switch, a coordinated mode switch, a front switch, a crab switch, and/or possibly other mode selection switches that select specialized modes of operation pertinent to a particular type (e.g., "COORD_FG" in FIG. 53). Such information may also include information 178 from a tire chains switch.

The steering valve threshold section 169 displays information 179 regarding valve thresholds. Valve threshold numbers are set up during the calibration and learn cycle. These numbers represent the minimum electrical signal required to turn the rear axle. These numbers vary from left to right and axle to axle but usually are between 350 and 550 for a tandem aerial ladder fire truck. These numbers do not change during normal operation. If the system is recalibrated or relearned it is likely these numbers will be different after these cycles have been completed. If these numbers do not change after the Calibration or Learn Cycle, access the axle center screen and press the white pushbutton below the box labeled "DATA" and scroll back to the I/O screen. The axle 2 left threshold represents the threshold number of the left valve for the forward rear axle of a tandem or a single rear axle truck. The axle 2 right threshold represents the threshold number of the right valve for the forward rear axle of a tandem or a single rear axle truck. The axle 3 left threshold represents the threshold number of the left valve for the rear most axle of a tandem axle truck. The axle 3 right threshold represents the threshold number of the right valve for the rear most axle of a tandem axle truck. In FIG. 53, the steering valve threshold section 169 also displays other miscellaneous information, including software revision information, such as for control system software, display system software, and so on.

Referring now to FIG. 54, an encoder value screen 180 is shown. The encoder value screen 180 shows the calibrated center positions, full cramp positions, real time encoder values, and calibrated deadband values of each axle. The screen 180 is useful for troubleshooting and does not need to be used during normal operation of the control system 112.

The screen 180 displays information regarding encoder values for the front axle. This information includes #1 left turn stop information 181 which represents the calibrated left turn full cramp encoder value. The actual left turn encoder value could be greater than this value. This information also includes #2 left turn deadband information 182 which represents the left turn deadband. When the encoder position number is greater than this value the rear axles will begin to turn. This information also includes the #3 front axle calibrated center information which represents the encoders calibrated center position. This information also includes #4 right turn deadband information 184 which represents the right turn deadband. When the encoder position number is less than this value, the rear axles begin to turn. This information also includes #5 right turn stop information 185 which represents the calibrated right turn full cramp encoder value. The actual right turn encoder value could be greater than this value. This information also includes front axle encoder position information 192a which represents the actual encoder position. This number will continually change as the steering wheel is turned.

The screen 180 displays information regarding encoder values for the forward-rear axle or axle #2. Axle 2 is the forward rear axle on a tandem rear axle truck. In coordinated mode, a left turn of the rear wheels is when the front of the tires turn left. The left valve turns on when making a right turn in coordinated mode. The information displayed by the screen 180 includes #6 left turn cramp angle information 186 which represents the left turn full cramp encoder value. This information also includes #7 axle 2 calibrated center information 187 which represents the encoders calibrated center position value. This information also includes #8 right turn cramp angle information which represents the right turn full cramp encoder value. This information also includes axle 2 encoder position information 192b which represents the actual encoder position. This number will continually change as the rear axle moves.

The screen 180 displays information regarding encoder values for the rear-rear axle or axle #3. Axle 3 is the rear most axle on a tandem rear axle truck. In the coordinated mode, a left turn of the rear wheels is when the front of the tires turn left. The left valve turns on when making a right turn in coordinated mode. The information displayed by the screen 180 includes #9 left turn cramp angle information 189 which represents the left turn full cramp encoder value. This information also includes #10 axle 3 calibrated center information 190 which represents the encoders calibrated center position value. This information also includes #11 right turn cramp angle information 191 which represents the right turn full cramp encoder value. This information also includes axle 3 encoder position information 192c which represents the actual encoder position. This number will continually change as the rear axle moves.

The control system 112 can be calibrated to determine the straight-ahead and right and left stop positions for the front wheels 130 and rear wheels 128. The straight-ahead positions are typically used during steering to coordinate steering of the front wheels 130 and rear wheels 128. Before beginning the calibration procedure it is often desirable to align the front and rear wheels 130 and 128. This can be done using conventional aligning techniques and apparatus. Although desirable it is not necessary to align the vehicle 110 before calibrating the control system 112. Also, it is generally desirable, but not necessary, to perform the calibration procedure with vehicle 110 loaded to its normal operating weight. For example, if vehicle 110 is a cement truck then it should be loaded with the normal amount of cement/aggregate before it is calibrated.

Figure 55:
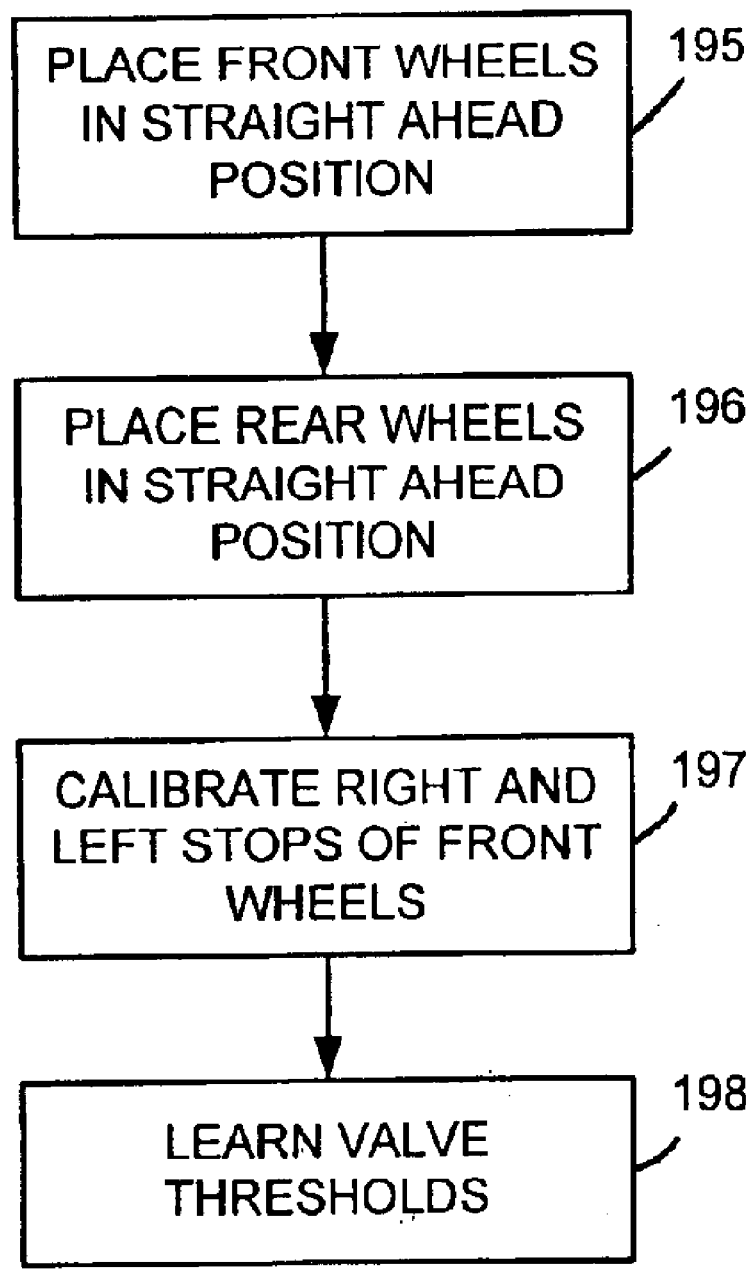
FIG. 55 is a flow chart showing a calibration operation for a vehicle having the control system of FIG. 48.

In one embodiment, vehicle 110 may be calibrated as shown in FIG. 55. At step 195, the front wheels 130 are positioned to be straight-ahead. In connection with step 195, it is generally desirable to place the front wheels 130 on a turntable or drive the vehicle 110 forward to unwind the tires. Alternatively, if vehicle 110 includes outriggers, vehicle 110 may be raised to allow the tires to be easily moved without winding them, or, alternatively, the tires may be moved while on the ground, raised to allow them to unwind, and then placed back down on the ground. In addition to graphical user interface 146, a handheld device (e.g. PDA, laptop, etc.) that is either wireless or cabled may be used to perform tasks such as ramp engine speed to provide increased hydraulic power to the outriggers. If a handheld device is used, the operator has the advantage of being outside the vehicle 110 to observe what is going on. Front wheels 130 can be placed in the straight-ahead position by placing a straight edge across the sidewall of one of the front tires. The straight edge should be in line with the vehicle frame. The distance from the frame to the straight edge may be measured at both the front and rear of the tire. If the two measurements are not the same, the vehicle's steering wheel may be adjusted to equal out the front and rear measurements.

Other methods may also be used to position the front wheels 130 straight-ahead. For example, commercially available aligning equipment (e.g. equipment available from Hunter Engineering Company, 11250 Hunter Drive, Bridgeton, Mo. 63044 or from Bee Line Company, P.O. Box 130, 2700 62nd St. Court, Bettendorf, Iowa 52722, or others) may be attached to the front wheels 130 and the steering wheel adjusted until the front wheels 130 are positioned straight-ahead. In a desirable embodiment, control system 112 is configured to interface with the aligning equipment. The aligning equipment may use a laser tracking system, digital camera system, or any other suitable system to align the front wheels 130. Control system 112 can read the output of the aligning equipment and automatically determine the straight ahead position of the front wheels 130. The information (the extent to which the front wheels are not facing straight ahead) could be fed into the control system 112 and displayed on the display. The display indicates to the operator what needs to be done to put the wheels in alignment. The control system 112 can essentially replace the computer or interface with the computer on commercial alignment systems. In addition to simply determining whether the wheels are positioned straight ahead, the control system 112 may be configured to interface with the aligning equipment to assist the operator of vehicle 110 in aligning the front or rear wheels 130, 128. For example, before calibrating the control system 112, the operator may connect the aligning equipment to the vehicle 110 and use the control system 112 to determine whether the wheels are aligned. Control system 112 displays any required adjustments (e.g. amount of toe in needed or number of turns of the tie rod necessary to achieve the proper alignment) to the operator. In a further embodiment, control system 112 is able to automatically align wheels 130, 128. For example, the tie rod may be hydraulically actuated and controlled by control system 112 so that it can be automatically adjusted when control system 112 determines wheels 130, 128 are out of alignment. In this manner, the operator may simply and easily align the wheels before starting the calibration procedure.

In another embodiment, the straight ahead position of front wheels 130 may be determined using a permanent mounted laser and target. The operator adjusts the wheels until the laser hit the target, at which point the operator can determine that the front wheels were positioned straight ahead. Of course, control system 112 may be used to move the laser until it hits the target. In this case, the control system 112 is able to read the input provided from the target to determine whether the laser is in the correct position. This configuration does not require the driver to leave the cab. In one embodiment, the target may be located in the wheel well and the laser located on or near the wheel hub.

After positioning the front wheels 130 straight ahead, control system 112 recognizes the position of encoder 134 as the straight-ahead position for the front wheels 130. This is typically done responsive to the operator pushing a button on the graphical user interface 146 to signify that the front wheels 130 are in the straight-ahead position. In an alternative embodiment, other ways may be used to notify the control system 112 that the front wheels 130 are in a straight-ahead position. For example, control system 112 may interface with aligning equipment to determine the straight-ahead position of the front wheels 130. In this case, control system 112 is able to automatically detect when the front wheels 130 are positioned straight-ahead using the data provided by the aligning equipment.

At step 196, the rear wheels 128 may be placed in a straight-ahead position in a manner similar to that of the front wheels 130. Before positioning rear wheels 128, it may be desirable to place them on a turntable or drive forward to unwind the tires. A straight edge may be placed across the sidewall of the right side tire and in line with the vehicle's frame. The distance from the straight edge to the frame at the front of the tire and the rear of the tire can then be measured. These measurements may need to take into account toe in of the tires. For example, for a typical vehicle 110 having one set of rear wheels 128, the tires may be toed in ¹⁄₁₆ of an inch. In this example, the distance from the straight edge at the front of the tire to the frame will be ¹⁄₁₆ of an inch less than the distance from the straight edge at the rear of the tire to the frame. If the measurements show that the rear wheels 128 are not in a straight ahead position, the rear wheels 128 may be adjusted using a button located on the vehicle near the rear wheels 128. In another embodiment, the rear wheels may be adjusted using a variety of devices such as the graphical user interface 146 or a handheld device (PDA or laptop) that is connected to communication network 132 either wirelessly or using a cable. After positioning the rear wheels 128 straight-ahead, control system 112 recognizes the position of encoder 134 as the straight-ahead position for rear wheels 128 in manner similar to that described above in connection with the front wheels 130. The method of determining the straight-ahead position of other sets of rear wheels may be done in a similar manner to that described.

At step 197, the right and left stop positions of the front wheels 130 may now be calibrated. Typically, this may be done by manually steering the front wheels 130 all the way to the right until the wheels stop and activating the calibration button to notify the control system 112 that the front wheels 130 are at their right wheel stop position. The front wheels 130 may then be manually steered all the way to the left until the wheels stop. Again the calibration button is depressed to notify the control system 112 that the front wheels 130 are at the left stop position. The control system 112 now knows the end points of the front wheels 130. Again other methods may be used to calibrate the right and left stop positions of the front wheels 130. For example, control system 112 may be configured to automatically move front wheels 130 to the right and left stop positions. Control system 112 could sense that the front wheels 130 have reached the stop position using a position sensor or pressure transducer measuring the increase in hydraulic pressure at the stop positions.

At step 198, control system 112 enters a learn process where it learns the valve thresholds necessary to operate the cylinders. Because the weight of the vehicle may influence the valve thresholds, it is generally desirable to perform the learn process with the vehicle at its normal operating weight. The valve thresholds generally represent the minimum electrical signal required to turn the wheels. In a further embodiment, control system 110 may also compensate for the temperature effects of the hydraulic fluid. For example, the hydraulic fluid may be cold and, thus, have a higher viscosity when vehicle 110 is started so that the valve threshold calibrated at start up may not be inaccurate after the vehicle 110 has been operating for while and the hydraulic fluid has heated up. One way to overcome this problem is to monitor the temperature of the hydraulic fluid. Using the hydraulic fluid temperature as an input, control system 112 can adjust the calibrated valve threshold for an increases or decreases in temperature of the hydraulic fluid. Also, control system 112 may include a weight sensor that could be used to likewise adjust the valve threshold as weight is added or removed from vehicle 110.

In another embodiment, the encoders 134 may be enclosed within protective covers or enclosures in order to protect the encoders 134 from damage (e.g., from rocks, shredded tires, road debris, or the tire falling on the encoder during wheel installation). Each enclosure may be fabricated to fit over one of the encoders 134 and is preferably strong enough to prevent damage to the encoder 134. The enclosure may be provided with a sealing mechanism to permit the enclosure to be filled with a moisture-repelling material such as grease. To this end, a threaded hole for a cord-grip style device to seal around the encoder wire along with a grease zerk to allow the cavity between the encoder 134 and enclosure to be filled with the grease may be provided.

Figure 56:
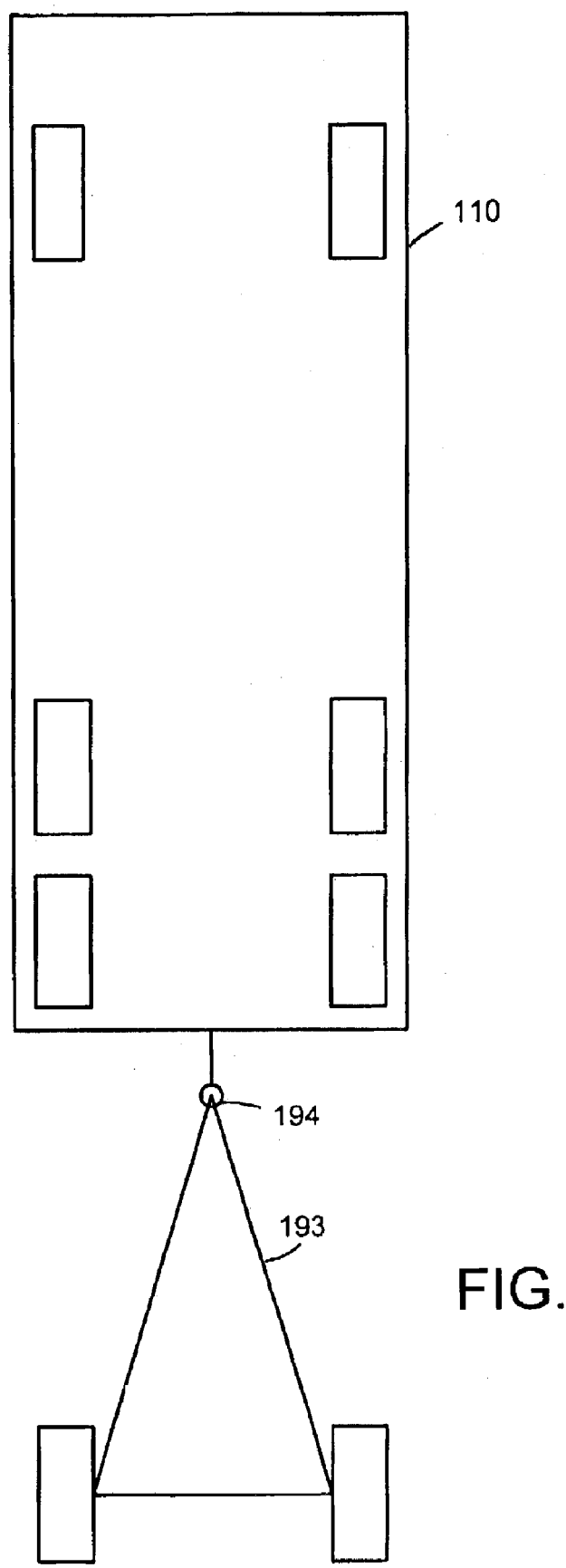
FIG. 56 is a schematic diagram of an alternative alignment mechanism for the steering control system of FIG. 48.

In another embodiment, and referring now to FIG. 56, an alignment trailer device may be provided comprising a one-axle trailer 193. The trailer 193 has an encoder 194 attached to a pivot point where a hitch ball would typically be located on a conventional trailer. Attached to the pivot point is a coupling (e.g., a square tube or similar piece) that is assembled into a receptacle on the vehicle 110. The encoder 194, which may be coupled to the interface module 114a, is calibrated such that the encoder 194 is "zeroed" when the length of the tube is perpendicular to the axle of the trailer 193. If the vehicle 110 is off tracking, the encoder 193 no longer outputs a zero reading. The steering control system 112 monitors the encoder 194 and computes an average reading. When the vehicle 110 makes a turn and the rear axles steer, a new set of center values will be used. Each center value change is small. The net effect is that as the truck is being test driven, the vehicle 110 tracks straighter with each turn, and at the end of the test drive the vehicle will track perfectly straight ahead. Such an arrangement may be used to reduce set-up time of the control system 112.

In another embodiment, the graphical user interface is configured such that portions of the screen become larger, perhaps even enlarging to fill the entire display 146. For example, if the vehicle 110 exceeds 38 mph in the coordinated mode of operation, the top half of the display 146 displays a forward rear lock indicator and the bottom half displays the rear lock indicator. The screen remains in this configuration for a predetermined period of time (e.g., between five and fifty seconds) seconds after the rear lock indicators indicate "LOCKED," after which time the screen returns to normal. This assists the operator in ascertaining whether the locks have locked. This arrangement would also be useful when speed is reduced below 38 mph. As another example, when a new mode is selected, the current mode and the previous mode portions of the display may become larger to make it easier for the operator to ascertain the mode in which the vehicle 110 is operating. Also, the error screen may be configured such that when reading codes, a menu comes up in connection with each error code that assists the operator in troubleshooting the problem associated with a particular code. The error screen may also be configured to offer additional information, e.g., to help the operator move the vehicle to the side of the road.

It may also be noted that the vehicle 110 may be implemented as an electric vehicle as described previously herein and/or be implemented to include the network-assisted monitoring, service and/or repair features described previously herein. For example, when diagnostic codes are generated as discussed in connection with Table III, this information may be reported to an off-board monitoring computer and possibly used to order replacement parts. The steering control features of the vehicle 110 may also be combined with the features of other types of vehicles described herein, such as the fire truck, airport rescue fire fighting vehicle, military vehicle, multipurpose modular vehicle, snow blower vehicle, concrete placement vehicle, refuse vehicle, ambulance, and so on.

Throughout the specification, numerous advantages of preferred embodiments have been identified. It will be understood of course that it is possible to employ the teachings herein so as to without necessarily achieving the same advantages. Additionally, although many features have been described in the context of a vehicle control system comprising multiple modules connected by a network, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown.

Many other changes and modifications may be made to the present invention without departing from the spirit thereof.

What is claimed is:

1. An electronic control system for a vehicle comprising:
a plurality of input devices, the plurality of input devices including a first input device that provides information pertaining to a steering angle of first vehicle wheel;

a plurality of output devices, the plurality of output devices including actuator capable of adjusting one or both of the steering angle of the first vehicle wheel and a steering angle of a second vehicle wheel;

a communication network; and a plurality of microprocessor based interface modules, the plurality of interface modules being interconnected to each other by way of the communication network, and the plurality of interface modules being coupled to the plurality of input devices to the plurality of output devices, the plurality of interface modules including one or more interface modules that is coupled to the first input device and to the actuator;

wherein the electronic control system is configured to control the steering angle of one or both of the first and second vehicle wheels as a function of the information from the first input device.

2. The electronic control system of claim 1, wherein the information pertaining to the steering angle of the first vehicle wheel includes a steering signal.

3. The electronic control system of claim 1, wherein the information pertaining to the steering angle of the first vehicle wheel is a digital signal.

4. The electronic control system of claim 1, wherein the electronic control system is configured to detect errors associated with the electronic control system.

5. The electronic control system of claim 4, further comprising:

a graphical user interface configured to display the detected errors;

wherein the electronic control system is configured to store and display a history of error codes.

6. The electronic control system of claim 1, wherein:

the actuator adjusts the steering angle of the second vehicle wheel; and the electronic control system is configured to control the steering angle of the second vehicle wheel as a function of the information pertaining to the steering angle of the first vehicle wheel.

7. The electronic control system of claim 6, wherein the electronic control system includes a plurality of modes for controlling the steering angle of the second vehicle wheel as a function of the information pertaining to the steering angle of the first vehicle wheel.

8. The electronic control system of claim 7, wherein the plurality of modes comprises:

a first mode in which the steering angle of the second vehicle wheel is fixed;

a second mode in which movement of the steering angle of the second vehicle wheel is generally opposite to movement of the steering angle of the first vehicle wheel; and a third mode in which movement of the steering angle of the second vehicle wheel is generally similar to movement of the steering angle of the first vehicle wheel.

9. The electronic control system of claim 7, further comprising a graphical user interface configured to display the past, present, and future modes of the electronic control system.

10. The electronic control system of claim 7, wherein:

the plurality of modes includes a first mode and a second mode; and the electronic control system is configured to receive input to change from a first mode to a second mode, and, in response to the input, the electronic control is configured to operate in the first mode until one or both the first and second vehicle wheel travels through a straight ahead position, at which time the electronic control unit changes to the second mode.

11. The electronic control system of claim 6, wherein the electronic control system includes a deadband of at least about 5 degrees.

12. The electronic control system of claim 6, wherein the electronic control system includes a deadband that varies as a function of the vehicle's speed.

13. The electronic control system of claim 6, wherein the first input device is a sensor that measures the steering angle of the first vehicle wheel.

14. The electronic control system of claim 13, wherein the sensor is an encoder.

15. The electronic control system of claim 14, wherein the information output by the encoder is converted to SAE J1939 protocol and communicated over the communication network to the plurality of interface modules.

16. The electronic control system of claim 6, wherein the electronic control system is configured to lock the second vehicle wheel in a straight-ahead position once the vehicle reaches a certain speed.

17. The electronic control system of claim 6, wherein:

the first input device provides information pertaining to a steering angle of a first set of vehicle wheels; and the actuator is capable of adjusting a steering angle of a second set of vehicle wheels.

18. The electronic control system of claim 6, further comprising:

a lock configured to lock the steering angle of the second vehicle wheel; and a graphical user interface configured to display the status of the lock.

19. The electronic control system of claim 1, wherein the electronic control system uses a locked position of the second vehicle wheel as a calibration pain for a straight ahead position of one or both the first and second vehicle wheels.

20. The electronic control system of claim 1, further comprising:

a graphical user interface which includes a representation of the vehicle including an image of the vehicle's wheels;

wherein the steering angle of the vehicle's wheels in the image changes as the steering angle of the vehicle's wheels changes.

21. The electronic control system of claim 1, further comprising a graphical user interface configured to display instructions related to calibrating the electronic control system.

22. The electronic control system of claim 1, wherein the actuator is a hydraulic actuator.

23. The electronic control system of claim 22, wherein the plurality of input devices includes a sensor that provides information pertaining to the status of a hydraulic filter.

24. The electronic control system of claim 22, wherein the plurality of input devices includes a sensor that provides information pertaining to the temperature of the hydraulic fluid.

25. The electronic control system of claim 1, wherein the electronic control system is configured to log data pertaining to the steering angle of one or both of the first and second vehicle wheels.

26. The electronic control system of claim 1, wherein the electronic control system is configured to determine the minimum electrical signal required to control the steering angle of the first or second vehicle wheels.

27. The electronic control system of claim 1, wherein a straight-ahead position of the first vehicle wheel can be any position on the first input device.

28. The electronic control system of claim 1, wherein the electronic control system uses a feedback control loop to control the steering angle of one or both of the first and second vehicle wheels.

29. The electronic control system of claim 28, wherein the feedback control loop is a proportional-integral-derivative control loop.

30. The electronic control system of claim 1, further comprising a vehicle wheel alignment system.

31. The electronic control system of claim 30, wherein the electronic control system receives input from the vehicle wheel alignment system and uses the input to determine the straight ahead position of one or both of the first and second vehicle wheels.

32. The electronic control system of claim 30, wherein the electronic control system receives input from the vehicle wheel alignment system and uses the input to align one or both of the first and second vehicle wheels.

33. The electronic control system of claim 1, wherein each of the plurality of interface modules includes an I/O status table, the I/O status table including I/O status information for the plurality of input devices and the plurality of output devices.

34. The electronic control system of claim 33, wherein each of the plurality of interface modules broadcasts I/O status information to each of the other interface modules, the I/O status information pertaining to 110 states of the respective input and output devices coupled to the interface modules.

35. The electronic control system of claim 34, further comprising a graphical user interface configured to display the I/O states of the respective input and output devices.

36. The electronic control system of claim 35; wherein the plurality of interface modules, the plurality of input devices, and the plurality of output devices are distributed throughout the vehicle.

37. The electronic control system of claim 36, further comprising:
  a power source; and
  a power transmission link;
  wherein the plurality of interface modules are coupled to the power source by way of the power transmission link; and
  wherein each respective interface module is locally disposed with respect to the respective input and output devices to which the respective interface module is coupled so as to permit distributed data collection from the plurality of input devices and distributed power distribution to the plurality of output devices.

38. An electronic control system for a vehicle comprising:
  a plurality of input devices, the plurality of input devices including a sensor that provides information pertaining to a steering angle of a first vehicle wheel;
  a plurality of output devices, the plurality of output devices including an actuator capable of adjusting a steering angle of a second vehicle wheel;
  a communication network; and
  a plurality of microprocessor based interface modules, the plurality of interface modules being interconnected to each other by way of the communication network, and the plurality of interface modules being coupled to the plurality of input devices an to the plurality of output devices, the plurality of interface modules including one or more interface modules that is coupled to the sensor and to the actuator;
  wherein the electronic control system controls the steering angle of the second vehicle wheel as a function of the steering angle of the first vehicle wheel.

39. An electronic control system for a vehicle comprising:
  a sensor that provides digital signals pertaining to a steering angle of a first vehicle wheel; and
  an actuator capable of adjusting one or both of the steering angle of the first vehicle wheel or a steering angle of a second vehicle wheel;
  wherein the electronic control system receives the digital signals from the sensor and controls the steering angle of one or both of the first and second vehicle wheels.

40. A vehicle having an electronic control system comprising:
  a first set of vehicle wheels having a first steering angle; and
  a second set of vehicle wheels having a second steering angle;
  wherein the electronic control system includes a plurality of modes for controlling the second steering angle as a function of the first steering angle, the plurality of modes including a first mode and a second mode;
  wherein the electronic control system is configured to receive input to change from a first mode to a second mode, and, in response to the input, the electronic control unit is configured to operate in the first mode until at least one of the sets of vehicle wheels travels through a straight-ahead position at which time the electronic control unit changes to the second mode.

41. A vehicle having an electronic control system comprising:
  a first set of vehicle wheels having a first steering angle;
  a second set of vehicle wheels having a second steering angle; and
  a lock configured to maintain the second set of vehicle wheels in a lock position;
  wherein the electronic control system controls the second steering angle as a function of the first steering angle; and
  wherein the locked position of the second set of vehicle wheels is input to the electronic control system as a calibration point for a straight-ahead position oft second set of vehicle wheels.

42. A vehicle having an electronic control system comprising:
  a first set of vehicle wheels having a first steering angle; and
  a second set of vehicle wheels having a second steering angle;
  wherein the electronic control system controls one or both of the first and second steering angles; and
  wherein the electronic control system is configured to log the steering angle of one or both of the first and second set of vehicle wheels.

43. An electronic control system for a vehicle comprising:
  a sensor that provides information relating to a steering angle of a first set of vehicle wheels;
  an actuator capable of adjusting a steering angle of second set of vehicle wheels; and
  a graphical user interface;

wherein the electronic control system controls the steering angle of the second set of vehicle wheels as a function of the steering angle of the first set of vehicle wheels; and wherein the graphical user interface displays calibration instructions for calibrating the straight-ahead position of the first and second sets of vehicle wheels.

44. A system comprising:

a vehicle which includes
  a first set of vehicle wheels having a first steering angle;
  a second set of vehicle wheels having a second steering angle; and
an electronic control system;
wherein the electronic control system controls the second steering angle as a function of the first steering angle;
a vehicle wheel alignment system;
wherein the electronic control system receives input from the vehicle wheel alignment system and uses the input to determine the straight-ahead position of the second set of vehicle wheels.

45. A vehicle having an electronic control system comprising:

a first set of vehicle wheels having a first steering angle;
a second set of vehicle wheels having a second steering angle;
a graphical user interface which includes a representation of the vehicle including an image of the first and second sets of vehicle wheels;
wherein the first and second steering angles in the image change as the first and second steering angles of the first and second sets of vehicle wheels change.

46. The electronic control system of claim 38, wherein the sensor is a digital sensor.

47. The electronic control system of claim 38, comprising:

a graphical user interface configured to display errors associated with th electronic control system;

wherein the electronic control system is configured to store and display history of the errors.

48. The electronic control system of claim 38, wherein the electronic control system includes a plurality of modes for controlling the steering angle of the second vehicle wheel as a function of the steering angle of the first vehicle wheel.

49. The electronic control system of claim 48, wherein the plurality of modes comprises:

a first mode in which the steering angle of the second vehicle wheel is fixed;

a second mode where the steering angle of the second vehicle wheel moves in the opposite direction as the steering angle of the first vehicle wheel; and a third mode where the steering angle of the second vehicle wheel moves in the same direction as the steering angle of the first vehicle wheel.

50. The electronic control system of claim 38, comprising a graphical user interface which includes a representation of the vehicle including an image of th vehicle's wheels, and wherein the steering angle of the vehicle's wheels in the image changes as the steering angle of the vehicle's wheels changes.

51. The electronic control system of claim 38, wherein each of th plurality of interface modules includes an I/O status table, the I/O status table including I/O status information for the plurality of input devices and the plurality of output device , and wherein each of the plurality of interface modules broadcasts I/O status information to each of the other interface modules, the I/O status information pertaining to the states oft respective input and output devices coupled to the interface modules.

52. The electronic control system of claim 39, wherein the actuator adjusts the steering angle of the second vehicle wheel, and the electronic control system uses the digital signals to control the steering angle of the second vehicle wheel as a function of the first vehicle wheel.

* * * * *

UNITED STATES PATENT AND TRADEMARK OFFICE
CERTIFICATE OF CORRECTION

PATENT NO. : 6,882,917 B2
DATED : April 19, 2005
INVENTOR(S) : Pillar et al.

It is certified that error appears in the above-identified patent and that said Letters Patent is hereby corrected as shown below:

Column 80,
Line 67, between "of" and "first," please insert -- a --.

Column 81,
Line 2, between "including" and "actuator," please insert -- an --.
Line 10, between "devices" and "to," please insert -- and --.
Line 67, between "control" and "is," please insert -- unit --.

Column 82,
Line 2, please replace "wheel" with -- wheels --.
Line 37, please replace "pain" with -- point --.

Column 83,
Line 32, please replace "110" with -- I/O --.
Line 38, please replace "35;" with -- 35, --.

Column 84,
Line 1, please replace "an" with -- and --.
Line 40, please replace "lock" with -- locked --.
Line 47, please replace "to" with -- into --.
Line 48, please replace "oft" with -- of the --.

Column 85,
Line 39, please replace "th" with -- the --.

UNITED STATES PATENT AND TRADEMARK OFFICE
CERTIFICATE OF CORRECTION

PATENT NO. : 6,882,917 B2
DATED : April 19, 2005
INVENTOR(S) : Pillar et al.

It is certified that error appears in the above-identified patent and that said Letters Patent is hereby corrected as shown below:

<u>Column 86,</u>
Line 2, between "display" and "history," please insert -- a --.
Lines 20 and 25, please replace "th" with -- the --.
Line 28, please replace "device," with -- devices, --.
Line 31, please replace "oft" with -- of the --.

Signed and Sealed this

Sixth Day of September, 2005

JON W. DUDAS
*Director of the United States Patent and Trademark Office*